United States Patent
Ishiyama

(10) Patent No.: US 6,421,629 B1
(45) Date of Patent: Jul. 16, 2002

(54) THREE-DIMENSIONAL SHAPE MEASUREMENT METHOD AND APPARATUS AND COMPUTER PROGRAM PRODUCT

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/559,378

(22) Filed: Apr. 27, 2000

(30) Foreign Application Priority Data

Apr. 30, 1999 (JP) .......................................... 11-123687
Mar. 23, 2000 (JP) ........................................ 2000-082414

(51) Int. Cl.[7] .......................................... G01B 11/255
(52) U.S. Cl. ....................................... 702/159; 702/159
(58) Field of Search .......................... 250/560; 356/216, 356/376; 382/154

(56) References Cited

U.S. PATENT DOCUMENTS

| | | | | |
|---|---|---|---|---|
| 4,794,262 A | * | 12/1988 | Sato et al. ................... | 250/560 |
| 5,424,836 A | * | 6/1995 | Weise et al. ................. | 356/376 |
| 5,436,727 A | * | 7/1995 | Yokoyama et al. .......... | 356/376 |
| 5,870,220 A | * | 2/1999 | Migdal et al. ............... | 359/216 |
| 5,872,631 A | * | 2/1999 | Slettemoen .................. | 356/376 |
| 6,128,086 A | * | 10/2000 | Fowler et al. ............... | 356/376 |
| 6,205,243 B1 | * | 3/2001 | Migdal et al. ............... | 382/154 |
| 6,222,937 B1 | * | 4/2001 | Cohen et al. ................ | 382/154 |

FOREIGN PATENT DOCUMENTS

JP    11-118443    4/1999

OTHER PUBLICATIONS

Lu, C, Inokuchi, S; "An Absolute Depth Range Measurement Of 3–D Objects Based On Modulation Moire Topography", Pattern Recognition, 2000, Proceedings, 15th International Conference On , 2000, vol. 1, pp 754–757.*

Hobson, C A, Yow, K C, Pearson, J D, "Filters And Signal Bandwidth For 3–D Shape Measurement Using Structured Light", Image Processing And Its Applications, 1997, Sixth International Conference Pub. No. 443, vol. 1, 1997, pp. 224–228.*

Okada, S, Miyauchi, H, Imade, M. Sumimoto, T, Yamamoto, H, "3–D Shape Measurement Based On A Adaptive Lighting–Pattern Projection Method", Industrial Eelctronics, Control And Instrumentation, 1991, Proceedings IECO, 1991, pp. 2362–2367.*

Seng Heng Boey, Alexander B F, Kim Chew Ng, "3–D Shape Measurement And 3–D Data Modification", Industrial Electronics Society, 1988, IECON '88, Proceedings, 14th Annual Conference Of, vol. 1, pp. 54–59.*

(List continued on next page.)

Primary Examiner—John S. Hilten
Assistant Examiner—Douglas N Washburn
(74) Attorney, Agent, or Firm—Foley & Lardner

(57) ABSTRACT

A control unit repeatedly photographs an image with cameras while phase shifting a sinusoidal light pattern from light projectors. A phase calculation unit receives image signals and outputs a phase signal from a set of images photographed with a sinusoidal light pattern of different phases. Absolute phase determining units receive two of the phase signals to determine the absolute phase value of the pixel positions. An absolute phase conversion unit receives the phase signal switched by a three-dimensional signal coordinate calculation control signal and the absolute phase signals to convert the phase value of the pixel positions into absolute phase. A three-dimensional coordinate unit receives the absolute phase conversion signal and the three-dimensional coordinate calculation control signal and outputs a three-dimensional coordinate signal. A three-dimensional coordinate synthesis unit receives three-dimensional coordinate signals and synthesizes shape information to output a synthesized three-dimensional coordinate signal.

54 Claims, 11 Drawing Sheets

OTHER PUBLICATIONS

Power, G J, Kefu Xue, "A Non–Linear Transform Technique For A Camera And 3–D Scanner", Aerospace And Electronics Conference, 1995, NAECON, Proceedings Of 1995 National Aerospace And Electronics Conference, vol. 1, pp. 843–850.*

Komatsubara et al., "Grating projection system for profiling with the aid of fringe scanning method", J. of Precision Engineering, vol. 55, No. 10, pp. 1817–1822, 1989.

Judge et al., "A review of phase unwrapping techniques in fringe analysis", Optics and Lasers in Engineering, vol. 21, pp. 199–239, 1994.

Komatsubara et al., "Grating projection system for profiling with the aid of fringe scanning method", $2^{nd}$ Report, Exploitation of Sinusoidal Grating, J. of Precision Engineering, vol. 58, No. 7, pp. 1173–1178, 1992.

Creath, "Comparison of phase–measurement algorithms", vol. 680, pp. 19–28, 1986.

* cited by examiner

THREE-DIMENSIONAL SHAPE MEASUREMENT METHOD AND APPARATUS AND COMPUTER PROGRAM PRODUCT

FIELD OF THE INVENTION

This invention relates generally to a three-dimensional shape measurement technique, and more particularly, to a method and apparatus for measuring a three-dimensional shape based on phase shifting method and to a computer program product for use with a three-dimensional shape measurement apparatus.

BACKGROUND OF THE INVENTION

Up to now, a variety of techniques for measuring a three-dimensional shape of an object have been proposed. A grating pattern projection method, introducing a striped scanning, as one of such techniques, is first explained based on reference (1) entitled: "Grating Projection System for Profiling with the Aid of Fringe Scanning Method" Journal of Precision Engineering (JSPE), vol. 55, No. 10, pp. 1817–1822, 1989.

FIG. 11 shows schematic diagram of a three-dimensional shape measurement device disclosed in the reference (1). Referring to FIG. 11, a light pattern having a sinusoidal luminance pattern is projected from a light source 101 on an object 100 through a sinusoidal grating 102 having a gray scale values printed thereon sinusoidally. A point 104 on the object 100 is scanned by a camera 103 which outputs an image data. If a coordinate value of the point 104 on an image taken by the camera 103 are denoted x and a luminance value on the coordinate x is denoted I(x), the luminance value I(x) is given by a following equation (1)

$$I(x) = a_0(x) + A(x)\cos(\phi + \alpha(x)) \quad (1)$$

where $a_0(x)$ is a bias component and $\phi$, $\alpha(x)$ denote the phase.

The image is captured by the camera 103, each time after shifting the grating 102, by a length equal to 1/N of the wavelength of a printed sinusoidal pattern N times, along an axis u, with the object 100 remaining stationary.

The image appears as if the sinusoidal light pattern projected on the object 100 is proceeding $2\pi/N$ radian each time. Assuming that the phase $\phi$ is shifted from 0 radian up to $2(N-1)\pi/N$ radian where N is a positive integer, with an increment of $2\pi/N$ radian each time, the luminance value $I_k(x)$ at a point x obtained for the kth shifting ($0 \leq k \leq N$) is given by a following equation (2)

$$I_k(x) = a_0(x) + A(x)\cos\left(\frac{2\pi k}{N} + \alpha(x)\right) \quad (2)$$

The phase $\alpha(x)$ is a phase value at a point x in an image photographed for k=0. The point 104 is present on a half line originating from the coordinate x on the camera screen to pass through a lens center. The Point 104 as viewed from the light source 101 is present on a plane of the sinusoidal grating 102 determined by a straight line with the phase $\alpha(x)$ and the light source 101. Therefore, if a point of intersection between the straight line and the plane is found, it may be seen that the three-dimensional coordinate value of the point of intersection is that of the point 104.

By introducing two new coefficients $\alpha_1(x)$ and $B_1(x)$, shown by a following equation (3), the above equation (2) can be rewritten to a following equation (4):

$$a_1(x) = A(x)\cos\alpha(x) \quad (3)$$
$$b_1(x) = -A(x)\sin\alpha(x)$$

$$I_k(x) = a_0(x) + a_1(x)\cos\frac{2\pi k}{N} + b_1(x)\sin\frac{2\pi k}{N} \quad (4)$$

$a_1(x)$ and $b_1(x)$ may be found by a following equation (5), using luminance values $I_0(x), \ldots I_{N-1}(x)$ at the point x obtained on Nth image-capture operations, whilst the phase $\alpha(x)$ may be found by a following equation (6)

$$a_1(x) = \frac{1}{N}\sum_{k=0}^{N-1} I_k \cos\left(\frac{2\pi k}{N}\right) \quad (5)$$

$$b_1(x) = \frac{1}{N}\sum_{k=0}^{N-1} I_k \sin\left(\frac{2\pi k}{N}\right)$$

$$\alpha(x) = \tan^{-1}\frac{-b_1(x)}{a_1(x)} \quad (6)$$

The phase value of the object 100 on the image data is obtained by executing the above-described phase calculations for each pixel on the image taken by the camera 103.

Meanwhile, $\alpha(x)$ obtained from the above equation (6) is unexceptionally wrapped (folded) between $-\pi$ and $\pi$, as may be seen from a fact that calculation is made using an arctangent function $\tan^{-1}()$. The result is that the phase $\alpha(x)$ as found exhibits indefiniteness corresponding to an integer number times $2\pi$, such that, in this state, a three-dimensional shape of the object 100 cannot be found.

By projecting a sinusoidal pattern composed of a period on the entire object 100, the Phase $\alpha(x)$ can be uniquely determined. Since a narrow phase value from $-\pi$ to $\pi$ is allocated at this time to the entire object 100, a high measurement accuracy cannot be realized.

For this reason, a method is adopted to improve a measurement accuracy at the cost of phase uniqueness in which a domain of an initial phase is enlarged and a sinusoidal pattern of plural periods is projected on the object 100. FIG. 12 shows a Phase image 105 which is an example of the phase as found in each pixel within an image date captured by the camera 103. In FIG. 12, a phase taking a value from $-\pi$ to $\pi$ is allocated to black to white.

If, for example, a plane is measured, as shown in FIG. 12, there is obtained non-continuous phase, so that it is necessary to determine a relative phase value within an image by suitable techniques to convert non-continuous phases into continuous values. Also, since an absolute phase value cannot be directly obtained, the absolute phase needs to be determined by some means or other.

One of conventional phase connection technique for converting the Phase wrapped to between $-\pi$ and $\pi$ into a continuous phase is described in, for example, reference (2) of T. R. Judge and P. J. Bryanston—Cross, entitled "A review of Phase Unwrapping Techniques in Fringe Analysis", Optics and Lasers in Engineering, Vol. 21, pp. 199–239, 1994. The phase fringe counting/scanning approach technique, which is the simplest one of the phase connection methods, is hereinafter explained based on the description on pp. 211–212 of the reference (2).

This technique is constituted by following steps:

(1) Noise is removed by applying a filter having a spatial spreading or an low-pass filter (LPF) exploiting Fast Fourier Transform (FFT) to an input image. From the noise-eliminated image, the phase is calculated using e.g., the equation (6).

(2) A threshold value processing is executed for phase difference between neighbouring pixels to find a non-continuous phase boundary (changes in value from π to −π).

(3) The image is scanned from row to row in a horizontal direction, and 2π is added or subtracted each time a non-continuous phase boundary is traversed to find a continuous phase value between neighboring pixels.

(4) Phase values, continuous from row to row are compared in a vertical direction, and further converted to phase values which are continuous throughout the entire image.

In general, the phase connection method, inclusive of the above-described technique, suffers a drawback that satisfactory results cannot be obtained unless the supposition holds that a surface of the object 100 is sufficiently smooth, no significant changes in values are contained in the measured phase values, and that noise is only small. For this reason, the phase connection processing can pose a significant problem in automatic measurement.

The phase connection processing simply converts the phase value, wrapped from −π to π, so that the phase value will be continuous in its entirety, without obtaining the phase value as the absolute value. Therefore, there is left indefiniteness equal to π multiplied by an integer number in the phase value.

In the above reference (1) entitled "Method for Projecting Grating Pattern Introducing Striped Scanning", there is stated the converting method from an absolute phase value to a three-dimensional coordinate value, however, there is not described the method of determining an absolute phase value.

By the same author as that of the reference (1), a method including the technique of determining the absolute phase value is described in a reference (3) entitled "Grating Projection System for Profiling with the Aid of Fringe Scanning Method, Second Report—Exploitation of Sinusoidal Grating", Journal of Precision Engineering, vol. 58, No. 7, pp. 1173–1178, 1992.

In the reference (3), automatic discrimination is rendered possible on an image by thickening one of the gratings by a factor of 1.5 as compared to the remaining gratings to remove indefiniteness from the phase value.

The method of finding three-dimensional coordinate values from the acquired absolute phase value is explained by referring to FIG. 13. A light pattern is projected from a light source 101, placed at a coordinate position $(X_0, Z_0)$ to the object 100 through a grating 102 placed at a separation of i in the optical axis direction $n^-$ where a symbol $^-$ denotes a vector. On the grating 102 is printed a sinusoidal wave at a pitch p such that the initial phase will be 0 on the optical axis $n^-$. It is assumed that the angle between the optical axis $n^-$ and the X-axis is θ.

It is also assumed that light having an absolute phase a is illuminated on a point (X, Y) which is the point 104, as has been viewed by a camera 103 having a focal length f. It is likewise assumed that the point 104 is projected on a coordinate X, on a screen 106 in the camera 103. An angle of view γ from the camera 103 to the point 104 may be found by a following equation (7);

$$\tan\gamma = \frac{x}{f} \quad (7)$$

A following equation (8) also holds.

$$\tan\gamma = \frac{X}{Z} \quad (8)$$

Moreover, it is assumed that the light pattern having an absolute value a is illuminated at an angle θ+β, with respect to the X-axis. The angle β can be obtained, by exploiting a grating period p and a distance I between the light source 101 and the grating 102, by a following equation (9):

$$\tan\beta = \frac{\alpha \cdot p}{2\pi l} \quad (9)$$

The angle of field θ+β from the light source 101 to the point 104, with the X-axis as a reference, is given by a following equation (10):

$$\tan(\theta + \beta) = \frac{Z - Z_0}{X - X_0} \quad (10)$$

With use of the above equations (7) to (10), the coordinate (X, Z) of the point 104 may be found by an equation (11) from the Position x on a screen 107 being imaged, absolute phase α and the constitution of device:

$$Z = f \cdot \frac{(2\pi l \tan\theta + \alpha p)X_0 - (2\pi l - \alpha p \tan\theta)Z_0}{(2\pi l \tan\theta + \alpha p)x - (2\pi l - \alpha p \tan\theta)f} \quad (11)$$

$$X = Z \cdot \frac{x}{f}$$

In another reference (4) (JP Patent Kokai A-11-118443), there is proposed a technique by a triangular wave which employs only summation, subtraction, multiplication and division instead of the arctangent function $\tan^{-1}(\ )$ which, while having high precision performance similar to the sinusoidal projection as in the reference (1), is high in calculational cost in phase calculation, as shown by the equation (6). Since this technique is basically the variation of the above reference (1), there are similarly required the phase connection method and the absolute phase determination. Similarly to the above technique of the reference (1), these can be executed by a technique similar to that of the above references (2) and (3).

For further details, the disclosure of the reference (1) to (4) mentioned hereinabove are incorporated herein by reference thereto.

SUMMARY OF THE DISCLOSURE

The conventional method described in the reference (1) and (4) (shape measuring apparatus), mainly suffers from following five drawbacks.

(1) Because of different optical axes of the light source 101 and the camera 103, there exists an area which can be viewed from the camera but which is not illuminated by a sinusoidal pattern, such that a three-dimensional shape cannot be measured in this area.

(2) There is an area that cannot be viewed from the camera 103 such that a three-dimensional shape cannot be measured in this area.

(3) An absolute value of a phase is difficult to find automatically such that Phase values different by an integer number factor of $2\pi$ cannot be discriminated. That is, an absolute three-dimensional shape cannot be obtained.

(4) It is difficult in general to automatically execute the technique of continuously connecting phase values that is wrapped from $-\pi$ to $\pi$.

(5) Due to various problems relating to light projectors, it is difficult to construct an apparatus in which sinusoidal and triangular waves can be handled in an ideal fashion as described in the above-cited references.

It is noted that above mentioned problem (3) is concerned with determination of an absolute phase. In determining the absolute phase, there is a following relationship of trade-off between an automatic processing and an absolute three-dimensional shape measurement.

(a) The sinusoidal fringe on the grating 102 is marked such as by changing its width to permit automatic detection.

(b) The position of the object 100 is determined by e.g., a manual operation so that a suitable point on the object for measurement 100 will be at a pre-set measurement position. The corresponding position is designated, such as by a manual operation and command, for the measured phase value, to determine the absolute phase.

(c) A suitable site on the surface of the object 100 is measured by e.g., a manual operation to get it reflected on a measured phase value.

(d) An absolute three-dimensional shape is given up. The offset of the phase value is automatically determined by a suitable technique.

The above method (a) is described in the reference (3). With this method, it is difficult to discriminate if the sinusoidal luminance distribution as observed with the camera 103 is really wide or if simply it looks as if it is wide due to the three-dimensional shape of the object 100 being measured.

The above (b) and (c) are methods which give up automatic processing to use a manual operation thus appreciably lowering the range of application.

The above (d) is automated in that a suitable offset is determined so that the phase value at a mid position of the image will be comprised within the range of $-\pi$ to $\pi$. This method gives up absolute three-dimensional shape measurement.

Referring to FIG. 14, the problem encountered when an absolute phase value is unknown. It is assumed that, by a process up to a phase calculation and a phase connection that phase values $\alpha$ and $\alpha+2\pi$ are obtained in a direction of a viewing line A111 and in the direction of a viewing line B112 from a camera 103, respectively, with phase values changing smoothly between two viewing lines.

A direction 113, along which the absolute phase $\alpha$ is projected, through a grating 102 from a light source 101, and directions 114, 115 and 116, along which absolute phases $\alpha+2\pi$, $\alpha+4\pi$ and $\alpha+6\pi$ are projected similarly, are extended, as shown in FIG. 14.

If an absolute phase values are not known from FIG. 14, an object surface as viewed by the camera 103 is not clear as to whether this object surface is an object surfaces A108, an object surface B109 or an object surface C110.

It is noted that appropriately setting a phase offset is synonymous with appropriately selecting one of the object surfaces A108, B109 or C110. As may be readily seen from FIG. 14, there are occasions where, as a result of the selection, measured values of the surface inclination or length give results different from real values. Since an article being measured is made up of a variety of surfaces, each of these surfaces is similarly transformed to give a generally distorted shape of the measured object. Although an automatic measurement is made possible by using this method, an absolute three-dimensional shape is not obtained, leading to only a narrow range of application.

The above-mentioned problems (1) and (2) are relevant to the problem of a dead angle. For solving the problems (1) and (2), necessary numbers of light sources and cameras are required to install, respectively.

However, the technique of the above-mentioned reference material (3) by itself is not sufficient to acquire an absolute three-dimensional shape automatically.

As a result, plural measured results of a three-dimensional shape, as obtained from plural light sources or camera sets, give independent distortions. Thus, if light sources or cameras are provided additionally, the results of automatic measurements cannot be unified or synthesized, such that some form of a manual operations is required.

The problem (4) is relevant to the problem of phase connection. As discussed in the above-mentioned reference (2), if it is desired for the conventional phase grating counting/scanning technique to output good results, it is presupposed that a clear boundary be obtained when the phase value skips from $-\pi$ to $\pi$.

However, in reality, it is a frequent occurrence that redundant boundaries are presented or necessary boundaries disappear under the effect of noise. Similar problems are encountered with other conventional techniques. For example, in the above-mentioned reference (2), it is stated that a low performance of phase connection processing is a problem remained to be solved in realising an automatic three-dimensional shape measurement.

As for the problem (5), which is related with the actual equipment structure, it is not easy to generate the waveform that can be theoretically handled easily in connection with machining accuracy. In the above-cited reference (1), it is stated that the phase value $\alpha$ as found by the equation (6) from a pattern corresponding to the spontaneously blurred Ronky grating is not vitally changed from the phase value as found from the correct sinusoidal pattern. However, deviation from e.g. a sinusoidal wave significantly affects the phase value $\alpha$, as calculated by the above equation (6), as stated in reference (5) by Katherine Creath, "Comparison of Phase-Measurement Algorithms", SPIE Vol. 680, Surface Characterization and Testing, pp. 19–28 (1986), the entire disclosure whereof is incorporated herein by reference thereto. If, for example, the hardware cost is to be reduced or measurement with higher precision is aimed at, such a technique needs to be realized which is able to compensate the deviation from a theoretical sinusoidal or triangular wave.

In view of the above-mentioned problems, it is an object of the present invention to combine one or more light sources and cameras in a three-dimensional shape measurement based on a phase shift method to provide a method and apparatus (1) to overcome the problem of a dead angle, (2) to realize a decision of absolute phase values, and (3) to enable an automatic execution of reliable phase connection processing.

It is another object of the present invention (4) to provide a method and apparatus less costly and which can assure measurement performance of higher precision.

According to a first aspect of the present invention, there is provided a method for measuring a three-dimensional shape comprising the steps of:

(a) projecting a light pattern having spatially striped luminance distribution on an object being measured, from light projection means, while phase-shifting the light pattern;

(b) scanning the object illuminated with the light pattern while phase-shifting the light pattern from at least two different directions by cameras to output first and second image data;

(c) deriving first and second initial phase images from a series of the first and second image data, respectively;

(d) finding a set of corresponding three-dimensional coordinate positions from an initial phase of a target pixel, in the first initial phase image, based, on a position of the light pattern projection and a first scanning position of the first image;

(e) finding a set of pixel positions corresponding to the set of three-dimensional coordinate positions in the second initial chase image based on a position of the light pattern projection and a second scanning position of the second image, having reference to initial phases of the respective pixel positions, comparing the initial phases to an initial phase of the target pixel in the first initial phase image, and verifying whether or not a corresponding pixel position having a same initial phase can be uniquely determined;

(f) finding a three-dimensional coordinate position based on the uniquely determined pixel position to determine an absolute value of an initial phase of a corresponding pixel in the first and second initial phase images;

(g) repeating the steps (d) to (f) for entire pixels of the first initial phase image;

(h) converting the first and second initial phase images into first and second absolute phase images in reference to the absolute value of an initial phase of the light pattern; and (i) finding a three-dimensional coordinate position of the object being measured in each pixel, based on the absolute phase in each pixel of the first and second absolute phase images, the projection position of the light pattern and the scanning positions of the first and second images.

According to a second aspect, in the method of the first step, the step (f) of finding the three-dimensional coordinate position from the initial phase image comprises sub-steps of:

(1) finding, based on the projecting position of the light pattern and on the first scanning position, a set of candidates of first three-dimensional coordinate positions, from the initial phase of the target pixel in the first initial phase picture;

(2) finding a set of pixel positions corresponding to a set of the first three-dimensional coordinate positions, in the second initial phase image, based on the second scanning position, comparing, in reference to an initial phase of each of the pixel positions, the resulting initial phase to the initial phase of the target pixel in the initial phase picture, to verify whether or not a position of a corresponding pixel having a same initial phase can be uniquely determined;

(3) finding a set of candidates of corresponding second three-dimensional coordinate positions from an initial phase of a uniquely determined pixel in the second initial phase image based on the projecting position of the light pattern and the second scanning position;

(4) finding a set of pixel positions corresponding to the set of second three-dimensional coordinate positions in the initial phase image based on the first scanning position, and comparing, in reference to the initial phase of the respective pixel positions in the second initial phase image, the initial phase to the initial phase of the uniquely determined pixel in the second initial phase image, to verify whether or not a position of the corresponding pixel having a same initial phase can be uniquely determined;

(5) finding a three-dimensional coordinate position from the pixel position uniquely determined in the steps (2), and (4) to determine an absolute value of the initial phase of a corresponding pixel in the first and second initial phase images, respectively; and (6) repeating the steps (1) to (5) for the entire pixels of the first initial phase image.

As a third aspect, the object being measured is scanned by cameras from three or more different directions.

In a fourth aspect, there is provided a method for measuring a three-dimensional shape comprising the steps of:

(a) projecting first and second light patterns, having spatially striped luminance distribution, by light projection means, from two different directions, while phase-shifting the light pattern;

(b) illuminating the first light pattern, while phase shifting the first light pattern, for scanning an object being measured by a first camera, illuminating the second light pattern, while phase shifting the second light pattern, for scanning the object being measured by a second camera;

(c) deriving first and second initial phase images from the first and second images captured by first and second cameras with the first and second light patterns being projected;

(d) finding a set of corresponding three-dimensional coordinate positions from the initial phase of the target pixel in the first initial phase image, based on the projection position of the first light pattern and the scanning position;

(e) having reference to a set of possible phase values, from a projection position of the second light patten and a corresponding set of three-dimensional coordinate position candidates, and comparing an initial phase of the target pixel in the second initial phase image to verify whether or not a same initial phase can be determined uniquely;

(f) determining absolute values of the initial phases of the first and second patterns from the uniquely determined three-dimensional coordinate positions;

(g) repeating the steps of from (d) to (f) for the entire pixels of the initial phase image;

(h) converting the first and second initial phase images into images of first and second absolute phases in reference to the absolute values of the initial phases of the light patterns, respectively; and (i) finding a three-dimensional coordinate position in each pixel of the object being measured, based on the absolute phase in each pixel of the first and second absolute phase images, projection positions of the two light patterns and the image photographing positions.

As a fifth aspect, in the method of the fourth aspect, the step (f) determining the absolute position of the initial phase from an initial phase image comprises sub-steps of:

(1) finding a first set of corresponding three-dimensional coordinate position candidates from the initial phase of the target pixel of the first initial phase image, based on the projection position of the first light pattern and the scanning position;

(2) having reference to a set of possible phase values, from an illumination position of the second light pattern and the first set of three-dimensional coordinate position candidates, and comparing the phase values with the initial value of the target pixel in the second initial phase image to verify whether or not the coincident initial phase can be determined uniquely;

(3) finding a second set of corresponding three-dimensional coordinate position candidates from the initial phases of the target pixel in the second initial phase image based on the projection position of the second light pattern and the scanning position;

(4) having reference to a set of possible phase values, from an illumination position of the first light pattern and the second set of three-dimensional coordinate position candidates, and comparing the phase values with the initial value of the target pixel in the first initial phase image to verify whether or not the coincident initial phase can be determined uniquely;

(5) determining absolute values of the initial phases of the two light patterns from the three-dimensional coordinate positions uniquely determined from the steps (2) and (4); and (6) repeating the steps (1) to (5) for the entire pixels of the first initial phase image.

As a sixth aspect, the method in the fourth and fifth aspect, further comprises the step of:

projecting a light pattern, having spatially striped luminance distribution, by light projection means, on the object being measured, from three or more different directions, while phase-shifting the light pattern.

As a seventh aspect, there is provided a method for measuring for measuring a three-dimensional shape comprising the steps of:

(a) projecting first and second light patterns, having spatially striped luminance distribution, by light projection means, from two different directions, on an object being measured, while phase-shifting the light patterns;

(b) illuminating the first light pattern, while phase shifting the first light pattern, to scan an image of the object by first and second cameras, followed by illuminating the second light pattern, while phase shifting the second light pattern, to scan the object by the first and second cameras from two different directions in a similar manner;

(c) deriving first and second initial phase images, respectively, from series of the first and second image data captured by the first and second cameras with the first light pattern from two directions;

(d) deriving third and fourth initial phase images from third and fourth images, respectively, captured by the first and second cameras with the second light pattern, from respective two directions;

(e) finding a first set of corresponding first three-dimensional coordinate position candidates, from the initial phase of the target pixel in the first initial phase image obtained from the first scanning position by the first light pattern, based on the projecting position of the first light pattern and the first scanning position;

(f) finding a set of corresponding pixel positions of the first set of the three-dimensional coordinate position candidates in a fourth initial phase image obtained from the second scanning position by the second light pattern, based on the second scanning position, to find a second set of three-dimensional coordinate position candidates from the initial phases of the set of corresponding pixels;

(g) comparing the sets of the first and second three-dimensional coordinate position candidates to verify whether or not overlapping coordinate points can be determined uniquely;

(h) determining absolute values of the initial phases of the first and second light patterns from the uniquely determined three-dimensional coordinate positions;

(i) repeating the steps of from (e) to (h) for the entire pixels of the first initial phase image;

(j) converting the first to fourth initial phase images to the first to fourth absolute phase images, in reference to the absolute values of the initial phases of the light patterns, respectively;

(k) finding a three-dimensional coordinate position of the objet being measured in each pixel based on the absolute phase in each pixel of the first to fourth absolute phase images, projecting positions of the first and second light patterns and on the first and second scanning positions.

As an eighth aspect, in the method of the seventh aspect, the step (h) of determining the absolute value of the initial phase from the initial phase image comprises sub-steps of:

(1) finding a first set of corresponding three-dimensional coordinate position candidates from the initial phase of the target pixel in the first initial phase image obtained from the first scanning position by the first light pattern, based on the projection position of the first light pattern and the first scanning position;

(2) finding a set of corresponding pixel positions of the set of three-dimensional coordinate position candidates in a fourth initial phase image obtained from the second scanning position by the second light pattern, based on the second scanning position, to find a set of second three-dimensional coordinate position candidates from the initial phase of the set of corresponding pixels;

(3) comparing the first and second sets of three-dimensional coordinate position candidates to verify whether or not an overlapping coordinate point can be determined uniquely;

(4) finding a third set of corresponding coordinate position candidates from the initial phase of a pixel corresponding to the uniquely determined three-dimensional coordinate position, based on the second scanning position;

(5) finding a set of corresponding pixel positions of the set of the third three-dimensional coordinate position candidates in the first initial phase image obtained from the second scanning positions, by the second light pattern, based on the first scanning position, to find a fourth set of the coordinate position candidates from the initial phase of the set of corresponding pixels;

(6) comparing the sets of the third and fourth three-dimensional coordinate position candidates to verify whether or not an overlapping coordinate point can be determined uniquely;

(7) determining absolute values of the initial phases of the first and second light patterns from the uniquely determined three-dimensional coordinate position; and (8) repeating the steps (1) to (7) for the entire pixels of the initial phase image.

As a ninth aspect, in the method of the seventh aspect, the step (h) of determining an absolute value of the initial phase from an initial phase image comprises sub-steps of:

(1) a step of finding a set of corresponding three-dimensional coordinate position candidates from the initial phase of the target pixel in the first initial phase image, based on the projection position of the first light pattern and on the first scanning position;

(2) finding a set of pixel positions corresponding to the set of three-dimensional coordinate positions, in the second initial phase image obtained from the second scanning position by the first light pattern, based on the second scanning position, and comparing, in reference to respective initial phases, the initial phases to the initial phase of the target pixel in the first initial phase image to verify whether or not the corresponding pixel position having the same initial phase can be uniquely determined;

(3) finding a three-dimensional coordinate position from the uniquely determined pixel position to determine the absolute value of the initial phase of the corresponding pixel in the initial phase image; and (4) repeating the steps (1) to (3) for the entire pixels of the initial phase image.

As a tenth aspect, in the method of the seventh aspect, the step (h) of determining an absolute value of the initial phase from an initial phase image comprises sub-steps of:

(1) finding a first set of corresponding three-dimensional coordinate position candidates from the initial phase of a target pixel in the first initial phase image, based on the projection position of the first light pattern and on the first scanning position;

(2) finding a set of pixel positions corresponding to the first set of three-dimensional coordinate positions, in the second initial phase image obtained. from the second scanning position by the first light pattern, based on the second scanning position, and comparing, in reference to respective initial phases, the initial phases to the initial phase of the target pixel in the first initial phase image to verify whether or not the corresponding pixel position having the same initial phase can be determined uniquely;

(3) finding a second set of corresponding three-dimensional coordinate position candidates from the initial phase of the uniquely determined pixel in the second initial phase image, based on the projection position of the first light pattern and the second scanning position;

(4) finding a set of pixel positions corresponding to the second set of three-dimensional coordinate positions, in the first initial phase image obtained from the first scanning position by the first light pattern, based on the first scanning position, and comparing, in reference to respective initial phases, the initial phases to the initial phase of the uniquely determined pixel in the second initial phase image to verify whether or not the corresponding pixel position having the same initial phase can be uniquely determined;

(5) finding a three-dimensional coordinate position from the pixel position uniquely determined by the two steps (2) and (4) to determine the absolute value of the initial phase of the corresponding pixel in the initial phase image; and (6) repeating the steps (1) to (5) for the entire pixels of the initial phase image.

As an eleventh aspect, in the method of the seventh aspect, the step (h) of determining an absolute value of the initial phase from an initial phase image comprises sub-steps of:

(1) finding a set of corresponding three-dimensional coordinate position candidates from the initial phase of a target pixel in the first initial phase image, based on the projection position of the first light pattern and on the first scanning position;

(2) having reference to a set of possible phase values, from the projection position of the second light pattern and the set of three-dimensional coordinate positions, and comparing the phase values to the initial phase of the target pixel in a third initial phase image obtained from the first scanning position by the second light pattern to verify whether or not a coincident initial phase can be uniquely determined;

(3) determining an absolute value of the initial phase of the corresponding pixel in the initial phase image from the uniquely determined three-dimensional coordinate positions; and (4) repeating the steps from (1) to (3) for the entire pixels of the first initial phase image to determine the absolute value of the initial phase.

As a twelfth aspect, in the method of the seventh aspect, the step (h) of determining an absolute value of the initial phase from an initial phase image comprises sub-steps of:

(1) a step of finding a first set of corresponding three-dimensional coordinate position candidates from the initial phase of a target pixel in the first initial phase image, based on the projection position of the first light pattern and on the first scanning position;

(2) having reference to a set of possible phase values, from the projection position of the second light pattern and the first set of three-dimensional coordinate position candidates, and comparing the phase values to the initial phase of the target pixel in a third initial Phase image obtained from the first scanning position with the second light pattern to verify whether or not a coincident initial phase can be determined uniquely;

(3) finding a second set of corresponding three-dimensional coordinate position candidates, from the initial phase of the target pixel in the third initial phase image, based on the projection position of the second light pattern and on the first scanning position;

(4) having reference to a set of possible phase values, from the projection position of the first light Pattern and the second set of three-dimensional coordinate position candidates, and comparing the phase values to the initial phase of the target pixel in the first initial phase image obtained from the first scanning position with the first light pattern to verify whether or not a coincident initial phase can be determined uniquely;

(5) determining an absolute value of the initial Phase of the corresponding pixel in the initial phase image from the three-dimensional coordinate positions uniquely determined by the steps (2) and (4); and (6) repeating the above steps (1) to (5) for the entire pixels of the first initial phase image.

As a thirteenth aspect, in the method of the seventh aspect, the step (h) of determining an absolute value of the initial phase from an initial phase image is a combination of a plurality of steps of determining the absolute value of the initial phase of any one of 7th to 12th aspect.

As a fourteenth aspect, the method of the seventh aspect further comprises the step of projecting a light pattern having spatially striped luminance distribution from at least three different directions, respectively, on the object under measurement while phase shifting the light pattern.

As a fifteenth aspect, the method of the 7th to 14th aspects comprises the step of imaging an object under measurement from three or more different directions.

As a 16th aspect, the projected light pattern is sinusoidal.

According to a 17th aspect, there is provided a three-dimensional measurement apparatus comprising:

(a) a light projection unit for projecting a light pattern having a spatially striped luminance distribution on an objet being measured, receiving a light projection control signal, while phase shifting the light pattern responsive to the light projection control signal;

(b) first and second cameras each receiving a camera control signal as an input and formulated for scanning an image of the object under measurement responsive to the camera control signal to output image signals as a first and second camera output signal, respectively;

(c) first and second image storage memories for storing the image data captured by the first and second cameras, responsive to the first and second camera control signals, to output image data as a first and second image signal, respectively,;

(d) a phase calculation unit receiving one of the first and second image signals selected by a switch by a Phase calculation control signal, and calculating an initial phase value from pixel to pixel from a series of images of the received image signals to output calculated phase values as a first and second phase signal, respectively;

(e) first and second phase storage memories receiving the first and second Phase signals for recording the phase values of the first and second Phase signals, respectively, to output the Phase values as first and second phase signals;

(f) an absolute Phase determination unit receiving the first and second Phase signals, finding a set of corresponding three-dimensional coordinate position candidates from an initial phase of a target pixel in the first phase signal, based on positions of the light projection unit and the first camera, finding a set of pixel positions corresponding to the set of three-dimensional coordinate Position candidates in the second phase signal, based on the second camera position, and comparing in reference to the respective initial phases, the initial phases with the initial phase of the target pixel in the first initial phase signal to verify whether or not a corresponding pixel position having the same initial phase can be uniquely determined, finding a three-dimensional coordinate position from the uniquely determined pixel position, repeating the processing for determining a absolute value of the initial phase of the target pixel in the first and second Phase signals for the entire pixels of the first Phase signal, and outputting a first absolute phase signal in association with the first phase signal and outputting a second absolute phase signal in association with the second phase signal;

(g) an absolute phase conversion unit receiving the first or second absolute Phase signal and the first or second phase signal, as switched by a three-dimensional coordinate calculation control signal, to perform the processing of determining absolute phase of a pixel in the first or second phase signals, the absolute phase of the pixel being not determined yet, so that a Phase difference from an absolute phase of an ambient pixel, the absolute phase of which has a l ready been set, will become smaller, repeating the processing for the entire pixels of the first or second phase signal switched by the three-dimensional coordinate calculation signal, and for outputting the results as a first or second absolute phase conversion signal, respectively;

(h) a three-dimensional coordinate conversion unit receiving the first or second absolute phase conversion signal, as switched by the three-dimensional coordinate calculation control signal, converting the input signal into three-dimensional coordinate values based on positions of the light projection unit and the first or second camera for outputting the three-dimensional coordinate values as the first or second three-dimensional coordinate values;

(i) first and second three-dimensional coordinate storage memories receiving the first or second three-dimensional coordinate values, respectively, for recording three-dimensional coordinate values corresponding to the first and second cameras, and for outputting the three-dimensional coordinate values as first or second three-dimensional coordinate values;

(j) a three-dimensional coordinate synthesis unit receiving the and second three-dimensional coordinate signals for complementing reciprocally lacking date by way of synthesizing data to output synthesized three-dimensional coordinate signals; and (k) a control unit outputting the light projection unit control signal, the first and second camera control signals, the phase calculation control signal and the three-dimensional coordinate calculation control signal; imaging a light pattern projected from the light projection unit while phase shifting the light pattern; and controlling input/output of Phase calculation and input/output of three-dimensional coordinate calculation.

As an 18th aspect, in the three-dimensional shape measurement apparatus of the $17^{th}$ aspect, the absolute phase determination unit comprises:

(1) first means for receiving the first and second phase signals and a target pixel position signal, as input, finding a first set of corresponding three-dimensional coordinate position candidates from an initial phase of the target pixel in the first phase signal, based on positions of the light projection unit and the first camera, finding a set of pixel positions corresponding to the first set of three-dimensional coordinate position candidates in the second phase signal, based on a position of the second camera, comparing, in reference to the respective initial phases, the initial phases with the initial phase of the target pixel in the first phase signal, to verify whether or not the position of the corresponding pixel having a coincident initial phase can be determined uniquely, and for outputting the pixel position and the initial phase of the pixel on the second Phase signal can be output as a uniquely determined pixel signal;

(2) second means for receiving the first and second phase signals and the uniquely determined pixel signal, finding a second set of corresponding three-dimensional coordinate position candidates from the pixel position and the initial phase of the uniquely determined pixel signal in the second phase signal, based on the position of the light projection unit and the position of the second camera, finding a set of pixel positions corresponding to the second set of three-dimensional coordinate positions in the first Phase signal, comparing in reference to the respective initial phases, the initial Phases to the initial phase of the uniquely determined pixel in the second Phase signal to verify whether or not the position of the corresponding pixel having the same initial phase can be determined uniquely;

for finding a three-dimensional coordinate position from the pixel position in case where the corresponding pixel position has been determined uniquely by the two verifying operations; and for determining an absolute value of the initial phases of the target pixels in the first and second phase signals and for outputting a first absolute phase signal and a second absolute phase signal in association with the first and second phase signals, respectively; and (3) third means for sequentially scanning the entire pixels of the first Phase signal to output a position signal of the target pixel.

As a 19th aspect, the apparatus further comprises: cameras for imaging (shooting or scanning) an object from three or more different directions.

According to a 20th aspect of the present invention, here is provided a three-dimensional shape measurement apparatus comprising:

(a) first and second light projection units (A, B) receiving first and second light projection unit control signals (A,B) and for projecting first and second light patterns having spatially striped luminance distribution to an object under measurement from two different directions while phase shifting the light patterns responsive to the first and second light projection unit control signals (A,B);

(b) a camera receiving a camera control signal as an input and formulated for scanning the object under measurement responsive to the camera control signal to output an image signal as a camera output signal;

(c) first and second image storage memories (A, B) receiving the camera output signal selected through a switch as by the camera output control signal for recording a string of images captured by the camera with the first and second light patterns (A,B) to output the images as first and second Phase signals (A,B);

(d) a phase calculation unit receiving the first or second imaging signals (A or B), switched by a phase calculation control signal, as input, and calculating initial phase values from pixel to pixel from the image string to output calculated initial phase values as a phase signal;

(e) first and second phase storage memories (A, B) receiving the phase signal, allotted by the phase calculation control signal, and recording phase values calculated from the first and second image signals, to output the phase values as first and second Phase signals (A, B)

(f) an absolute phase determination unit receiving the first and second phase signals (A,B), finding a set of corresponding three-dimensional coordinate position candidates from the initial phase of the target pixel in the first phase signal (A), based on the positions of the first light projection unit (A) and the camera, having reference to a set of possible phase values from the position of the second light projection unit (B) and the set of the three-dimensional coordinate position candidates, to verify whether or not the coincident initial phase can be determined uniquely, determining absolute value of the initial Phase of the first and second light patterns from the uniquely determined three-dimensional coordinate position, and repeating the above processing of determination of the absolute values of the initial phases of the two light patterns from the uniquely determined three-dimensional coordinate position for the entire pixels of the first phase signal, to output the first and second absolute phase signals (A,B) in association with the first phase signal (A) and with the second phase signal (B), respectively;

(g) an absolute phase conversion unit receiving the first or second absolute phase signal (A or B) and the first or second phase signal (A or B), as switched by a three-dimensional coordinate calculation control signal, as input, for determining an undetermined absolute phase of a pixel in the first or second Phase signal, such that an absolute phase difference from an ambient pixel, the absolute Phase of which has already been determined, will become smaller, and repeating this processing for the entire pixels of the first or second phase signal, to output the absolute phase as a first or second absolute phase conversion signal (A or B);

(h) a three-dimensional coordinate conversion unit receiving the first or second absolute Phase conversion signal (A or B), switched by the three-dimensional coordinate calculation control signal, for converting the signal into a three-dimensional coordinate value based on the first or second light projection unit and the camera position, to output the coordinate values as first or second three-dimensional coordinate signal (A or B);

(i) first and second coordinate storage memories (A,B) receiving the first or second three-dimensional coordinate signal (A or B) as input, for recording three-dimensional coordinate values corresponding to the first and second light projection unit and for outputting the coordinate values as first or second three-dimensional coordinate signal (A or B);

(j) a three-dimensional coordinate synthesis unit receiving the first and second three-dimensional coordinate signals (A,B) as input for complementing or interpolating reciprocally lacking data for synthesis to output a synthesized signal as a synthesized three-dimensional coordinate signal; and (k) a control unit outputting the first and second light projection unit control signals (A, B), camera control signal, camera output control signal, phase calculation control signal and the three-dimensional coordinate calculation control signal, imaging the object under measurement while switching the first and second light projection units under phase shifting, switching the camera output, controlling the input/output phase calculation and controlling the input/output of the three-dimensional coordinate calculation.

As a 21st aspect, in the apparatus of the 20th aspect, the absolute phase determining unit comprises:

(1) first means for receiving the first and second phase signals and with a target pixel position signal, as input, finding a first set of corresponding three-dimensional coordinate Position candidates from the initial phase of the target pixel in the first Phase signal, based on the positions of the first light projection unit and the camera, having reference to a set of possible phase values from the light projection unit and the set of first three-dimensional coordinate position candidates, comparing the phase values with the initial phase of the target pixel in the second phase signal, and verifying whether or not the coincident initial phase can be determined uniquely to output the pixel position of the pixel on the second Phase signal as a uniquely determined pixel signal;

(2) second means for receiving the first and second phase signals and with the uniquely determined pixel signal, as input, finding a second set of corresponding three-dimensional coordinate position candidates from the initial Phase of the target pixel in the second phase signal, based on the positions of the second light projection unit and the camera, having reference to a set of possible phase values from the light projection unit and the set of second three-dimensional coordinate position candidates, comparing the Phase values with the initial phase of the target pixel in the first phase signal, verifying whether or not the coincident initial phase can be determined uniquely, determining an absolute value of the initial phase of the two light patterns from the uniquely determined three-dimensional coordinate positions in case where the initial phases have been determined uniquely, and outputting a first absolute phase signal and a second absolute phase signal in association with the first and second phase signals, respectively; and (3) third means for sequentially scanning the entire pixels of the first phase signal to output a target pixel position signal.

As a 21-bis aspect, the apparatus of the 20th or 21st aspect further comprises: a plurality of light projection units for projecting a light pattern having spatially striped luminance distribution on an object under measurement, from three or more different directions, while phase shifting the light pattern.

According to a 22nd aspect of the present invention, there is provided a three-dimensional shape measurement apparatus comprising:

(a) first and second light projection units A, B receiving first and second light projection means control signals A, B for projecting first and second light patterns having spatially striped luminance distribution onto an object under measurement while phase shifting the light patterns in keeping with the first and second light projection unit control signals A, B;

(b) first and second cameras A, B receiving first and second camera control signals A, B, scanning an object under measurement from two different directions in keeping with the first and second camera control signals and for outputting images of the object as first and second camera output signals A, B;

(c) first to fourth image storage memories receiving first and second camera output signals A and B, changed over by a camera output control signal, recording string of images captured by the first and second cameras with first and second light patterns, by a combination of the first light projection unit with the first camera, a combination of the second light projection unit with the first camera, a combination of the first light projection unit with the second camera and a combination of the second light projection unit with the second camera, and outputting images as first to fourth image signals A-A, A-B, B-A and B-B;

(d) phase calculating units receiving the first to fourth image signals A-A, A-B, B-A and B-B, changed over by a phase calculation control signal, to compute initial Phase values from the image string from pixel to pixel to output calculated initial phases as a phase signal;

(e) first to fourth phase storage memories receiving the phase signals changed over by the Phase calculation control signal to record phase values calculated from the first to fourth image signals A-A, A-B, B-A and B-B to output calculated Phase values as the first to fourth image signals A-A, A-B, B-A and B-B;

(f) an absolute phase determination unit receiving the first and fourth phase signals A-A and B-B as input; finding a first set of corresponding three-dimensional coordinate position candidates from an initial phase of a target pixel in the phase signal A-A obtained from the position of the first camera A by a light pattern of the first light projection unit A based on the position of the first light projection unit and the first camera A, finding a set of corresponding pixel Positions of the first three-dimensional coordinate position candidates in the phase signal B-B obtained from a position of the second camera B by the light pattern of the second light Projection unit B based on the position of the second camera B, finding a set of second three-dimensional coordinate position candidates from the initial phase of the set of the corresponding pixels, comparing the set of the first three-dimensional coordinate position candidates and the set of the second coordinate position candidates, to verify whether or not an overlapping coordinate points can be uniquely determined, determining absolute values of the initial Phases of the first and second light patterns from the uniquely determined three-dimensional coordinate positions, and repeating the above steps for the entire pixels of the phase signal A-A to output an absolute phase signal A-A in association with the phase signal A-A and to output an absolute phase signal B-B in association with the phase signal B-B;

(g) an absolute phase conversion unit receiving the absolute Phase signals A-A or B-B and with the phase signal A-A or B-B, changed over by a three-dimensional coordinate calculation control signal, as input, determining the absolute phase of pixels, the absolute phase of which in the phase signals is indeterminate, so that an absolute phase difference from the absolute value of ambient pixels, the absolute phase of which has already been determined, repeating the above steps for the entire pixels of the phase signal A-A or B-B and outputting the resulting absolute phases as absolute phase conversion signals A-A or B-B;

(h) a three-dimensional coordinate conversion unit receiving the absolute phase conversion signals A-A or B-B as input signal, changed over by three-dimensional coordinate calculation control signal, and converting the input signal into three-dimensional coordinate value based on the positions of the light projection unit A and the camera A or the light projection unit B and the camera B;

(i) first and second three-dimensional coordinate storage memories A-A, B-B receiving the three-dimensional coordinate signal A-A or B-B as input for recording three-dimensional coordinate values associated with the light projection unit A and the camera A or with the light projection unit B and the camera B. to output a three-dimensional coordinate signal A-A or B-B;

(j) a three-dimensional coordinate synthesis unit receiving the first and second three-dimensional coordinate signals A-A, B-B as input for complementing/interpolating lacking data for synthesis to produce and output the resulting signal as a synthesized three-dimensional coordinate signal; and (k) a light projection unit/camera control unit for outputting the first and second light projection unit control signals, the first and second camera control signals, Phase calculation control signal and the three-dimensional coordinate calculation control signal for imaging a light pattern while phase shifting the light pattern to control the inputting/outputting of the Phase calculation and three-dimensional coordinate calculation.

According to a further aspect (22-bis), there is provided a three-dimensional shape measurement apparatus comprising:

(a) first and second light projection units A, B receiving first and second light projection unit control signals A, B for projecting a light pattern having spatially striped luminance distribution from two different directions on an object under measurement while Phase shifting the light pattern responsive to the first and second light projection unit control signals;

(b) first and second cameras A, B receiving first and second camera control signals A, B as input, scanning an image of an object under measurement from two different directions responsive to the first and second camera control signals and outputting the resulting signals as first and second camera output signals A, B;

(c) first to fourth image storage memories receiving the first and second camera output signals, as switched by a camera output control signal, recording a string of images captured by first and second cameras with two light patterns, by a combination of the first light projection unit with the first camera, a combination of the second light project ion unit with the first camera, a combination of the first light projection unit with the second camera and a combination of the second light projection unit with the second camera, and outputting the images as first to fourth image signals A-A, A-B, B-A and B-B;

(d) a phase calculating unit receiving the first to fourth image signals A-A, A-B, B-A and B-B, changed over by a phase calculation control signal, to compute initial phase values from the image string from pixel to pixel to output calculated initial values as a phase signal;

(e) first to fourth phase storage memories receiving the phase signals as switched over by the Phase calculation control signal to record Phase values calculated from the first to fourth image signals A-A, A-B, B-A and B-B to output the calculated phase values as the first to fourth phase signals A-A, A-B, B-A and B-B;

(f) an absolute phase conversion unit which comprises:

(f1) a first absolute phase determination unit receiving the phase signals A-A and B-A as input, determining the absolute phase value as to a pixel position, the absolute phase of which can be determined, to output the absolute phase values as absolute phase signals A-A (A-A/B-A) and absolute phase values B-A (A-A/B-A);

(f2) a second absolute phase determination unit receiving the phase signals A-B and B-B as input, determining the absolute phase value as to a pixel position, the absolute phase of which can be determined, to output the absolute phase values as absolute phase signals A-B (A-B/B-B) and absolute Phase values B-B (A-B/B-B);

(f3) a third absolute phase determination unit receiving the phase signals A-A and A-B as input, determining the absolute phase value as to a pixel position, the absolute phase of which can be determined, to output the absolute phase values as absolute phase signals A-A (A-A/A-B) and absolute phase values A-B (A-A/A-B);

(f4) a fourth absolute phase determination unit receiving the Phase signals B-A and B-B as input, determining the absolute phase value as to a pixel position, the absolute phase of which can be determined, to output the absolute phase values as absolute phase signals B-A (B-A/B-B) and absolute phase values B-B (B-A/B-B);

(f5) a fifth absolute phase determination unit receiving the phase signals A-A and B-B as input, to output an absolute phase determining pixel and its absolute phase on an image A (light pattern A) as an absolute Phase signal A-A(A-A/B-B) for a pixel position, and to output the absolute Phase determining pixel and the absolute phase on an image B (light Pattern B) as an absolute phase signal B-B(A-A/B-B), which respect to pixels the absolute phase of which can be determined; and (f6) a sixth absolute Phase determination unit receiving the Phase signals A-B and B-A as input, to output an absolute phase determining pixel and its absolute phase on an image A (light pattern B) as an absolute phase signal A-B(A-B/B-A) for a pixel position and to output an absolute phase determining pixel and an absolute phase on an image B (light pattern A) as an absolute phase signal B-A(A-B/B-A), with respect to pixels the absolute phase of which can be determined (f7) the absolute phase conversion unit receiving phase signals and the absolute Phase signal, both changed over by the three-dimensional coordinate calculation control signal as input, the absolute phase conversion unit converting a phase value of a pixel position in the phase signal, the absolute phase of which in the phase signal has not been acquired into an absolute phase, in reference to the absolute phase signal;

(f8) the absolute phase conversion unit receiving an input signal formulated by:

a set of a phase signal A-A and absolute phase signals A-A(A-A/B-A), A-A(A-A/A-B) and A-A(A-A/B-B), a set of a phase signal A-B and absolute phase signals A-B(A-A/A-B), A-B(A-B/B-A) and A-B(A-A/B-B), a set of a phase signal B-A and absolute phase signals B-A (A-A/B-A), B-A(A-B/B-A) and B-A(B-A/B-B), and/or a set of a phase signal B-B and absolute phase signals B-B(A-A/B-B), B-B(A-B/B-B) and B-B(B-A/B-B), the absolute phase conversion unit verifying a pixel, for which the absolute phase has been acquired, by a logical product of the entire absolute phase signals and outputting as an absolute phase conversion signal;

(g) a three-dimensional coordinate conversion unit receiving the absolute phase conversion signal and the three-dimensional coordinate calculation control signal as input, (i) the three-dimensional coordinate conversion unit converting the absolute phase, if the absolute phase is one found from the phase signal A-A, into a three-dimensional coordinate value by parameters corresponding to a relative position between the first light projection unit A and the first camera A and to an internal structure, to output the three-dimensional coordinate value as a three-dimensional coordinate signal;

(ii) the three-dimensional coordinate conversion unit converting the absolute phase, if the absolute phase is one found from the phase signal A-B, into a three-dimensional coordinate value by parameters corresponding to a relative position between the second light projection unit and the first camera A and to the internal structure to output the three-dimensional coordinate value as a three-dimensional coordinate signal;

(iii) the three-dimensional coordinate conversion unit converting the absolute phase, if the absolute phase is one found from the phase signal B-A, into a three-dimensional coordinate value by parameters corresponding to the relative position between the second light projection unit and the second camera B and to the internal structure, to output the three-dimensional coordinate value as a three-dimensional coordinate signal; and (iv) the three-dimensional coordinate conversion unit converting the absolute phase, if the absolute phase is one found from the phase signal B-B, into a three-dimensional coordinate value by parameters corresponding to the relative position between the second light projection unit and the second camera B and to the internal structure, to output the three-dimensional coordinate value as a three-dimensional coordinate signal;

(h) a first three-dimensional coordinate storage memory for storing three-dimensional shape information by a set of the first light projection unit A and the first camera, obtained by the three-dimensional coordinate conversion unit, for outputting a three-dimensional coordinate signal A-A;

(i) a second three-dimensional coordinate storage memory for storing three-dimensional shape information by a set of the second light project ion means A and the first camera, obtained by the three-dimensional coordinate conversion unit, for outputting a three-dimensional coordinate signal A-B;

a third three-dimensional coordinate storage memory for storing three-dimensional shape information by a set of the second light projection unit B and the first camera A, obtained by the three-dimensional coordinate conversion unit, for outputting a three-dimensional coordinate signal B-A;

(k) a fourth three-dimensional coordinate storage memory for storing three-dimensional shape information by a set of the second light project ion means B and the second camera B, obtained by the three-dimensional coordinate conversion unit, for outputting a three-dimensional coordinate signal B-B;

(l) a three-dimensional coordinate synthesis unit receiving the three-dimensional coordinate signals A-A, A-B, B-A and B-B as input for synthesizing four shape information to output synthesized information as a synthesized three-dimensional coordinate signal; and (m) a control unit for outputting the first and second light projection unit control signals, first and second camera control signals, phase calculation control signals and the three-dimensional coordinate calculation control signals to image, scan a light pattern while phase shifting the light pattern and for controlling the inputting/outputting of the phase calculation and of the three-dimensional coordinate calculation.

According to a still further aspect (22-tris), in the apparatus of the 22-bis aspect, the first and second absolute phase determination units perform a same processing as that of the absolute phase determination unit of the 17th aspect which is decision of the absolute phase in a set of one light project ion unit and two cameras;

and wherein
the third and fourth absolute phase determination units perform a same processing as that of the absolute phase determination units of the 20th aspect which is decision of the absolute phase in a set of two light projection unit and one camera.

As the 23rd aspect, in the apparatus of the 22nd aspect, the absolute phase. determining determination unit (f) comprises first, second and third absolute phase determination means;

(1) the first absolute phase determination means receiving the phase signals A-A and B-B and a target pixel position signal, as input, finding a first set of corresponding three-dimensional coordinate position candidates from an initial phase of a target pixel in the phase signals A-A obtained from the position of the first camera A by the light pattern of the first light projection unit A, based on the positions of the first light projection unit A and the first camera A, finding a set of corresponding pixel positions of the first set of three-dimensional coordinate position candidates in the phase signal B-B obtained from the position of the second camera B, by a light pattern of the second light projection unit B, based on the position of the second camera B, finding a second set of three-dimensional coordinate position candidates from an initial phase of the set of the corresponding pixel positions, comparing the sets of the first and second three-dimensional coordinate position candidates to verify whether or not as overlapping coordinate point can be determined uniquely; and outputting the pixel position and the initial phase on the phase signal B-B as a uniquely determined pixel signal;

(2) with the second absolute phase determination means, the second absolute phase receiving the phase signals A-A and B-B and the uniquely determined pixel signals as input, finding a third set of corresponding three-dimensional coordinate position candidates from the initial phase of a pixel corresponding to the uniquely determined three dimensional coordinate position by the light pattern of the second light projection unit B based on the position of the second camera B, finding a set of corresponding pixel positions of the third set of three-dimensional coordinate position candidates on the phase signal A-A obtained from the position of the first camera A by the light pattern of the first light projecting unit A, finding a fourth set of three-dimensional coordinate Position candidates from the initial phase of the set of corresponding pixels, comparing the third and fourth sets of three-dimensional coordinate position candidates to verify whether or not overlapping coordinate points can be determined uniquely; and determining, if the overlapping coordinate points have been determined uniquely by the above two verification operations, absolute value of the initial phase of two light patterns from the uniquely determined three-dimensional coordinate position;

the second absolute phase determination means outputting the absolute phase signals A-A and B-B in association with the phase signals A-A and B-B, respectively; and (3) the third absolute phase determination means sequentially scanning the entire pixels of the phase signal A-A to output a target pixel position signal.

As a 24th aspect, in apparatus of the 22nd aspect. the absolute Phase determination unit (f) receiving the phase signals A-A and B-A as input finds a set of corresponding three-dimensional coordinate position candidates from the initial phase of the target pixel in the Phase signal A-A, based on the position of the first light projection unit A and the first camera A, finds a set of corresponding pixel positions corresponding to the set of three-dimensional coordinate positions in the phase signal B-A obtained from the position of the second camera B from the light pattern of the first light projection unit A, based on the position of the second camera B, refers to the respective initial phases, compares the initial phase with the initial phase of the target pixel in the phase signal A-A to verify whether or not the corresponding pixel position having the same initial phase can be determined uniquely. finds a three-dimensional coordinate position by the uniquely determined pixel position and determines an absolute value of the initial phase of the target pixel; the above steps are repeated for the entire pixels of the phase signals A-A; the absolute phase determining unit outputting the absolute phase signals B-A and B-A in association with the phase signals A-A and B-B.

As a 25th aspect in the apparatus of the 22nd aspect the absolute phase determination unit (f) comprises:

(1) first means for receiving the Phase signals A-A and B-A and with a target pixel position signal as input, finds a first set of corresponding three-dimensional coordinate position candidates from the initial phase of the target pixel in the phase signal A-A, based on the position of the first light projection unit A and the first camera A, finds a set of corresponding pixel positions corresponding to the first set of three-dimensional coordinate positions in the Phase signal B-A obtained from the position of the second camera B from the light pattern of the first light projection unit A based on the position of the second camera B, refers to the respective initial phases, and compares the respective initial Phases of the target pixel in the phase signal A-A, to verify whether or not the corresponding pixel position having the same initial Phase can be uniquely determined to output the pixel position of the pixel on the phase signal B-A and the initial phase as a uniquely determined pixel signal;

(2) second means for receiving the phase signal A-A and B-A and with the uniquely determined pixel signal as input, finding a second set of corresponding three-dimensional coordinate position candidates from the initial phase of the target pixel in the Phase signal B-A, finding a set of corresponding pixel positions corresponding to the second set of three-dimensional coordinate positions in the phase signal A-A obtained from the position of the second camera A from the light pattern of the first light projection unit A based on the position of the first camera A, referring to the respective initial phases, comparing the respective initial Phases with the initial Phase of the uniquely determined pixel in the chase signal B-A, to verify whether or not the corresponding pixel position having the same initial phase can be determined uniquely, and for finding a three-dimensional coordinate position from corresponding the pixel position if such pixel position has been determined uniquely, and for determining the absolute value of the initial phase of the target pixel in the phase signals A-A and B-A to output absolute phase signals A-A and B-A in association with the phase signals A-A and B-A; and (3) third means for sequentially scanning the entire pixels of the phase signal A-A to output a target pixel position signal.

As a 25th aspect, in the apparatus of the 22nd aspect, the absolute phase determination unit (f) receiving the phase signals A-A and A-B finds a set of corresponding three-dimensional coordinate position candidates from the initial phase of the target pixel in the phase signal A-A, based on the position of the first light projection unit A and the first camera A, refers to a set of possible phase values from the position of the second light projection unit B and the set of three-dimensional coordinate position candidates, compares the phase values to the initial phase of the target pixel in the phase signal A-B obtained from the position of the first camera A by the light pattern of the second light projection unit B to verify whether or not the coincident initial phase can be determined uniquely, and determines an absolute value of the initial phase of the target pixel from the uniquely determined three-dimensional coordinate position; the absolute phase determining unit repeating the above steps for the entire pixels of the phase signals A-A to output an absolute phase signal A-A and A-B in association with the phase signal A-A and A-B.

As a 26th aspect of the present invention, in the apparatus of the 22nd aspect, the absolute phase determination unit (f) comprises;

(1) first means for receiving the phase signals A-A and A-B and a target pixel position signal to find a first set of corresponding three-dimensional coordinate position candidates from the initial phase of the target pixel in the phase signal A-A, based on the positions of the first light projection means A and the first camera A, referring to a set of possible phase values from the position of the second light projection unit B and the first set of three-dimensional coordinate position candidates, and comparing the phase values to the initial phase of the target pixel in the phase signal A-B obtained from the position of the first camera A by the light pattern of the second light projection unit B to verify whether or not the coincident initial phase can be determined uniquely to output the pixel position and the initial phase of the pixel on the phase signal A-B and the initial phase as a uniquely determined pixel signal;

(2) second means for receiving the phase signals A-A and A-B and the uniquely determined pixel signal to find a second set of corresponding three-dimensional coordinate position candidates from the initial phase of the target pixel in the phase signal A-B, based on the position of the second light projection means B and the first camera A, referring to a set of possible phase values from the position of the second light projection unit A and the second set of three-dimensional coordinate position candidates, comparing the phase values to the initial phase of the target pixel in the phase signal A-A obtained from the position of the first camera A by the light pattern of the first light projection unit A to verify whether or not the coincident initial phase can be determined uniquely; determining absolute value of the initial phase of the two light patterns from the three-dimensional coordinate position uniquely determined by the two verifying operations, to output the absolute phase signals A-A and A-B in association with the phase signals A-A and A-B, respectively; and (3) third means for sequentially scanning the entire pixels of the phase signal A-A to output a target pixel position signal.

As a 27th aspect, in the apparatus of the 22nd aspect, the absolute phase determination unit (f) comprises a combination of two or more of the absolute value determination units of the initial phase selected from those shown in aspects 23rd to 28th.

In a twenty-eighth aspect of the present invention, according to the seventh to fifteenth aspects, the projected light pattern is triangular in shape.

In a twenty-ninth aspect of the present invention, according to the first to fifteenth and twenty-eighth aspects, the absolute phase values are measured in each of the three-dimensional coordinate positions, the absolute phase positions of which are previously known, and the absolute phase values are measured beforehand, which are used in calculating the corresponding three-dimensional coordinate positions from the initial phases.

In the present invention, the step of projecting a light pattern having spatially striped luminance distribution can be performed from three or more different directions, while shifting the phases. Also, in the present invention a camera or cameras may be used for imaging an object from three or more different directions.

In the three-dimensional shape measurement apparatus, the projected light pattern is sinusoidal or triangular in shape.

In the three-dimensional shape measurement apparatus, the absolute phase values are measured in each of the three-dimensional coordinate positions, the absolute coordinate positions of which are known from the outset. The absolute phase values so measured are used in calculating the three-dimensional coordinate positions from the initial phases.

According to a still further aspect, there is provided a computer program product which performs the operation as mentioned in the foregoing aspects.

Still other objects and advantages of the present invention will become readily apparent to those skilled in the art from the following detailed description, wherein only the preferred embodiments of the present invention are shown and described, simply by way of illustration of the best mode contemplated by carrying out the invention. As will be realized, the invention is capable of other and different embodiments, and its several details are capable of modifications i n various obvious respects, all without departing from the invention. Accordingly, the drawing and description are to be regarded as illustrative in nature, and not restrictive.

PREFERRED EMBODIMENTS OF THE INVENTION

Figure 1:
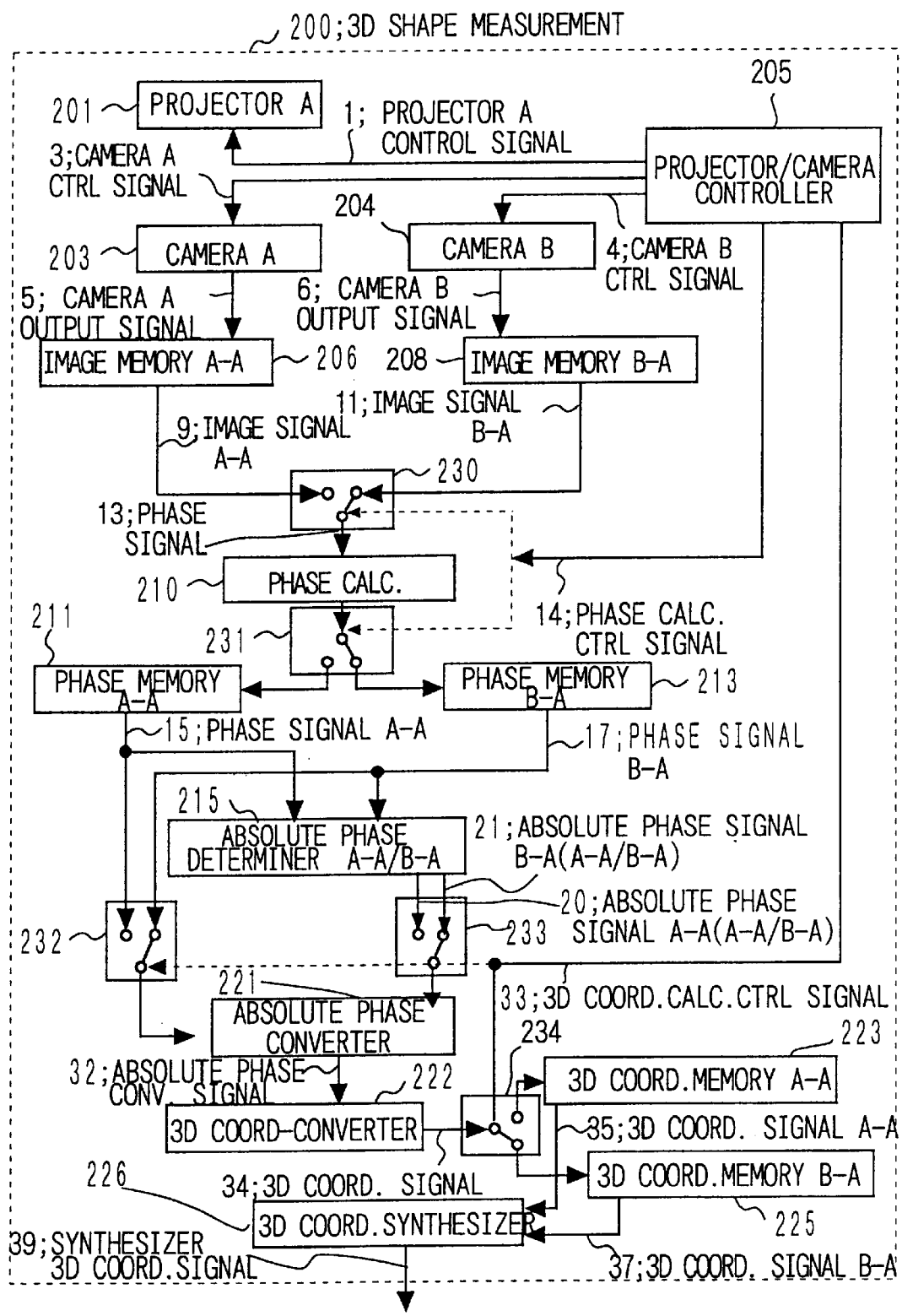
FIG. 1 is a block diagram showing an arrangement of a first embodiment of the present invention.

An equipment of the present invention is now explained. A three-dimensional shape measurement apparatus according to a preferred first equipment of the present invention includes light projection unit (projector) A 201, cameras A and B 203, 204, first and second image storage memories (image memories) 206, 208, phase calculation unit 210, and first and second phase storage memories (phase memories) 211, 213. The light projection unit A 201 is fed with light projection unit control signal 1 as an input to project a light pattern having a fringe-like luminance pattern onto an article being measured in keeping with the control signal 1 while phase-shifting the light pattern.

The first and second cameras A and B 203, 204 are fed with first and second camera control signals 3, 4 as inputs and scan an objet being measured from two different directions in keeping with the control signals to output first and second camera output signals (digital image data) 5, 6.

The first and second image storage memories 206, 208 are respectively fed with the first and second camera output signals 5, 6 as inputs to record image date to output the recorded images to output the recorded images as first and second image signals A-A, B-A 9, 11 as appropriate. The phase calculation unit 210 is fed with the first and second image signals 9, 11 and computes initial phase values from the image queue from pixel to pixel to output a phase signal 13. The first and second phase storage memories 211, 213 are fed with the phase signal 13 distributed by a phase calculation control signal 14 via switch 231 and records phase values calculated from the first and second image signals 9, 11 to output first and second phase signals A-A and B-A 15, 17.

The three-dimensional (3D) shape measurement apparatus also includes absolute phase determining unit (determiner) 215, absolute phase conversion unit (converter) 221, a three-dimensional coordinate conversion unit 222, first and second three-dimensional coordinate storage memories (coord. memories) 223, 225, three-dimensional coordinate synthesis unit (synthesizer) 226, and light projection means/camera control unit (controller) 205. The absolute phase determination unit (determiner) 215 is fed with first and second phase signals 15, 17, performs a sequence of operations of finding a corresponding set of three-dimensional position coordinates, from the initial phase of a target pixel in the first phase signal 15, based on the positions of the light projection unit 201 and the first camera 203, finding a set of pixel positions corresponding to the set of the three-dimensional positions in the second phase signal 17, based on the position of the second camera 204, comparing the initial phases to the initial phase of the target pixel in the first initial phase signal, checking whether or not the corresponding pixel position having the same initial phase can be uniquely determined, finding the three-dimensional coordinate position from the uniquely determined pixel positions and determining the absolute value of the initial phase of the corresponding pixel, repeating the above-mentioned sequence of operations for the entire pixels of the first phase signal 15 and outputting a first absolute phase signal 20 and a second absolute phase signal 21 in association with the first phase signal 15 and the second phase signal B, respectively. The absolute phase conversion unit (converter) 221 is fed with the first absolute phase signal 20 or the second absolute phase signal 21 selected by a three-dimensional coordinate calculation control signal 33 via switch 233 and then fed with first and second phase signals 15, 17 selected via switch 232 and repeatedly performs an operation of determining the absolute phase of a pixel, the absolute phase of which in the first or second phase signal is not determined, so that its difference from neighboring pixels the absolute phases of which are already determined, for the entire pixels of the first and second phase signals, to output the resulting signals as first and second absolute phase conversion signals, respectively. The three-dimensional coordinate conversion unit (3D coord.-converter) 222 is fed with the first and second absolute phase conversion signals A or B as input signals and converts the first and second absolute phase conversion signals A or B into three-dimensional coordinate values, based on the positions of the light projection unit and the first or second camera A or B, to output coordinate values as a first or second three-dimensional coordinate signal 34. The first and second three-dimensional coordinate storage memories 223, 225 are fed with the first or second three-dimensional coordinate signals 34 and record three-dimensional coordinate values corresponding to the respective first and second cameras A and B to output the resulting coordinate values incidentally as first or second three-dimensional coordinate signal 35, 37. The three-dimensional coordinate synthesis unit 226 is fed with the first or second three-dimensional coordinate signals 35, 37 and complement lacking (missing) data by way of synthesis to output resulting synthesized three-dimensional coordinate signals. The light projection unit/camera control unit 205 performs control to output light project ion control signals, control signals for the first and second cameras, phase calculation control signal and three-dimensional coordinate calculation control signals to scan an object under measurement with light patterns being projected while shifting its phase, while performing input/output of phase calculation and input/output of three-dimensional coordinate calculation.

The absolute phase determination unit 215 includes first absolute phase determination unit, second absolute phase determination unit and third absolute phase determination unit. The first absolute phase determination unit is fed with the first and second phase signals and the target pixel position signal, as inputs, finds the corresponding first set of the three-dimensional coordinate position coordinates from the initial phase of the target pixel in the first phase signal, based on the positions of the first light projection unit and the first camera, finds a set of pixel positions corresponding to the first three-dimensional coordinate position set in the second phase signal, refers to the respective initial phases, compares the respective initial phases to the initial phase of the target pixel in the first phase signal and checks (verifies) whether or not the corresponding pixel position having the same initial phase can be uniquely determined to output the pixel position and the initial phase on the second phase signal of the pixel as uniquely determined pixel signals. The second absolute phase determination unit is fed with the first and second phase signals and with the uniquely determined pixel signals, as inputs, finds a corresponding second three-dimensional coordinate position coordinates from the pixel position and the initial phase in the uniquely determined pixel signals in the uniquely determined pixel signals in the second phase signal B, finds the pixel positions corresponding to the second three-dimensional coordinate position set in the first phase signal, based on the first camera position, refers to the respective phases, compares the initial phases to the initial phase of the uniquely determined pixels in the second phase signal, checks (verifies) whether or not the corresponding pixel position having the same initial phase can be determined uniquely, finds the three-dimensional coordinate position from the pixel position if the corresponding pixel position having the same initial phase can be uniquely determined by the above two check (verification) operations and determines absolute value of the corresponding pixel in the first and second phase signals to output the first and second absolute phase signals in association with the first and second absolute phase signals, respectively. The third absolute phase determination unit sequentially scans the entire pixels of the first phase signal to output target pixel position signals.

Figure 5:
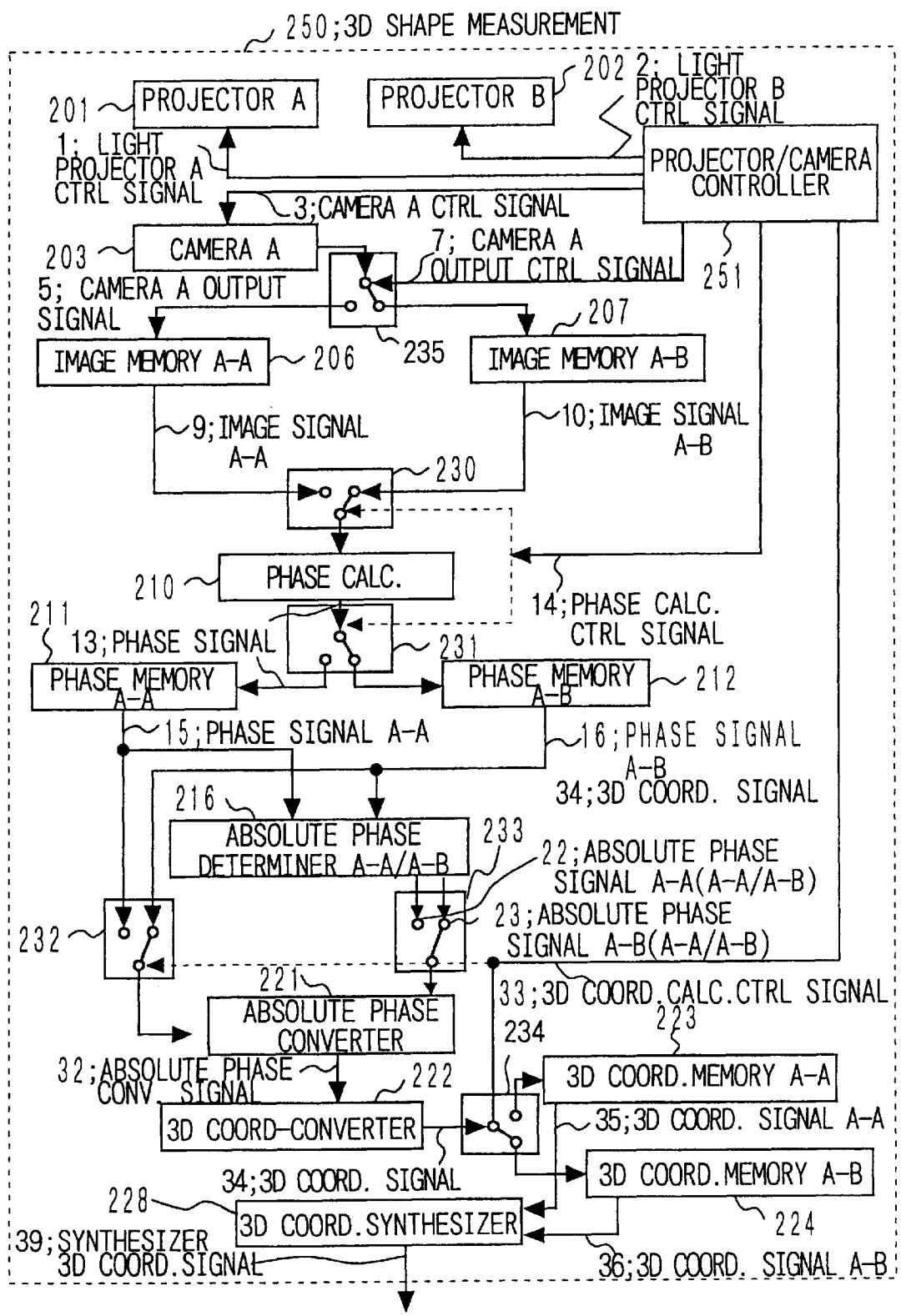
FIG. 5 is a block diagram showing an arrangement of a second embodiment of the present invention.

Referring to FIG. 5, a preferred second embodiment of the present invention includes first and second light projection means (projectors) A and B 201, 202, a camera A 203, first and second image storage memories 206, 207, phase calculation unit 210, first and second phase storage memories 211, 212, absolute phase determination unit (determiner) 216, absolute phase conversion unit (converter) 221, three-dimensional coordinate conversion unit (converter) 222, first and second three-dimensional coordinate storage memories 223, 224, three-dimensional coordinate synthesizing unit (synthesizer) 226 and light projection unit/camera control unit (projector/camera controller) 205. The first and second light projection unit A and B 201, 202 are fed with first and second light projection unit control signals 1, 2 to project a light pattern having fringe-like spatial luminance distribution from two different directions on an article being measured, while shifting the phase in keeping with the control signals 1, 2. The camera A 203 is fed with a camera control signal as an input to image an article being measured in keeping with the control signal 3 to output the imaged (scanned) article as a camera output signal. The first and second image storage memories 206, 207 are fed with the camera output signal, selected through switch 235 by the camera control signal 7 and records images with the first and second light patterns A and B to output first and second image signals A-A, A-B (9, 10). The phase calculation unit 210 is fed with the first and second image signals 9, 10, selected (switched, or changed over) by the phase calculation control signal through a switch 230, and calculates initial phase values from a string of images, from pixel to pixel, to output a calculated initial phase value as a phase signal. The first and second storage memories 211, 212 are fed with the above phase signal, changed over by the phase calculation control signal through a switch 231 and records phase values calculated from the first and second image signals to output recorded signals incidentally as the first and second phase signals A-A, A-B (13, 14). The absolute phase determination unit 216 is fed with the first and second phase signals 15, 16, as inputs, and perform a sequence of operations of finding a corresponding three-dimensional coordinate position coordinate set from the initial phase of a target pixel in the first phase signal 15, having reference to a set of phase values that can be assumed, from the positions of the second light projection unit and the three-dimensional coordinate position candidate set, comparing the phase value set to the initial phase of the target pixel in the second phase signal 15, checking (verifying) whether or not the initial phase which is coincident can be uniquely determined and determining an absolute value of the initial phase of two light patterns from the uniquely determined three-dimensional coordinate position, repeating the above sequence of operations for the entire pixels of the first phase signal, and outputs a first absolute phase signal 22 and a second absolute phase signal 23 in association with the first phase signal and the second phase signal, respectively. The absolute phase conversion unit 221 is fed with the first or second absolute phase signals 22, 23, switched by the three-dimensional coordinate calculation control signals 22, 23 through a switch 232 and with the first or second phase signals, selected through the switch 232, as inputs, and repeatedly performs the sequence of operations of determining the absolute phase so that the difference from the absolute phase of the neighboring pixels having the already determined absolute phase of the absolute phase of the pixels in the first or second phase signals which are as yet not determined, for the entire pixels of the first or second phase signals, and outputting the result as the first or second absolute phase conversion signal. The three-dimensional coordinate conversion unit 222 is fed with the first or second absolute phase conversion signal changed over by the three-dimensional coordinate calculation control signal through a switch 234 and converts the input signals to three-dimensional coordinate values, based on the positions of the first and second light projection unit 201, 202 and the position of the camera 203 to output the converted signals as the first or second three-dimensional coordinate signals 34. The first and second three-dimensional coordinate storage memories 223, 224 are fed with the first and second three-dimensional coordinate signals as input to record three-dimensional coordinate values corresponding to the first and second light projection unit 201, 202 to output the recorded signals incidentally as first or second three-dimensional coordinate signals. The three-dimensional coordinate synthesis unit 226 is fed with the first and second three-dimensional coordinate signals as input to complement (interpolate) lacking data for synthesis to output the result of synthesis as synthesized three-dimensional coordinate signals. The light project ion unit/camera control unit 251 outputs first and second light projection unit control signals, camera control signals, phase calculation control signals, and the three-dimensional coordinate calculation control signals, and performs imaging while shifting the phase by switching between the first and second light projection unit. The light projection unit/camera control unit 251 also performs input/output control of phase calculation and input/output control of the three-dimensional coordinate calculation.

In the second embodiment of the present invention, the absolute phase determination unit 216 includes first absolute phase determination unit, a second absolute phase determination unit and third absolute phase determination unit. The first absolute phase determination unit is fed with the first and second phase signals A, B and a target pixel position signal as inputs, finds a corresponding first set of three-dimensional coordinate position candidates, from the initial phase of the target pixel in the first phase signal A, based on the position of the camera and the first light projection unit A, refers to a set of possible phase values, from the first three-dimensional coordinate position candidates and the light projection unit B, compares the phase values to the initial phase of the target pixel in the second phase signal B, verifies whether or not the coincident initial phase can be uniquely determined and outputs the pixel position on the second phase signal B of the pixel and the initial phase as uniquely determined pixel signal. The second phase determination unit is fed with the first and second phase signals A, B and the uniquely determined pixel signal as inputs, finds a corresponding second set of three-dimensional coordinate position candidates, from the initial phase in the uniquely determined pixel signals in the second phase signal B, based on the position of the camera and the second light project ion unit B, refers to a set of possible phase values, from the set of the second three-dimensional coordinate position candidates and the first light projection unit A, compares the phase values to the initial phase of the target pixel in the first phase signal A, verifies whether or not the coincident initial phase is uniquely determined, decides absolute values of the initial phases of the two light patterns, from the unique three-dimensional coordinate position, if the coincident initial phase has been determined uniquely by the above two verification operation, and outputs a first absolute phase signal A in association with the first phase signal A and a second absolute phase signal B in association with the second phase signal B. The third absolute phase determination unit sequentially scans the entire pixels of the first phase signal A to output a target pixel position signal.

There are provided light projection units for projecting a light pattern having spatially fringed luminance distribution of an object being measured, with phase shifting, from three different directions.

Figure 8:
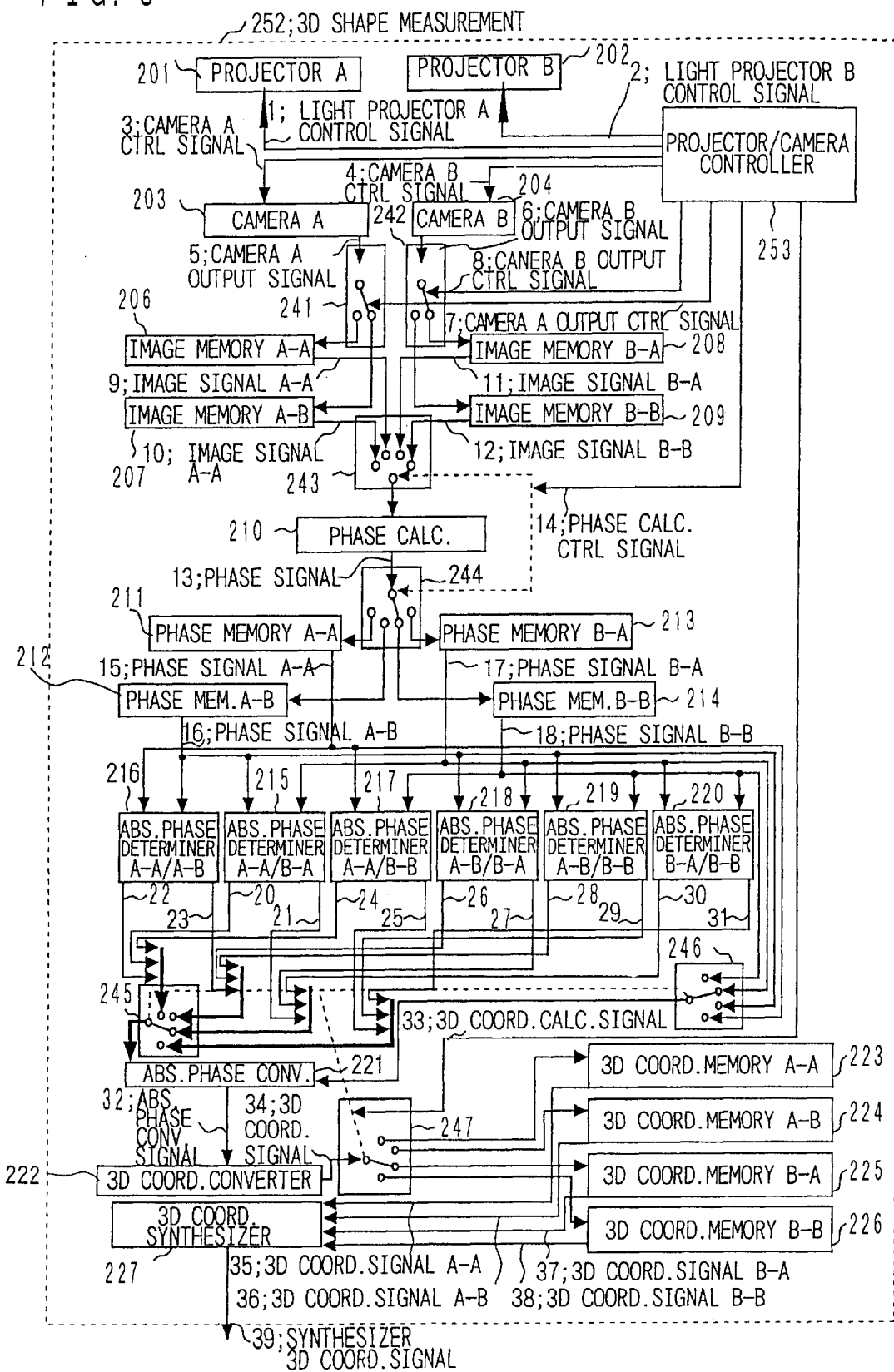
FIG. 8 is a block diagram showing an arrangement of a third embodiment of the present invention.

In a third embodiment of the present invention, shown in FIG. 8, there is provided a three-dimensional shape measurement apparatus comprising:

first and second light projection unit A, B (201, 202) receiving first and second light projection unit control signals for projecting the light pattern having spatially striped luminance distribution from two different directions on an object under measurement while phase shifting the light pattern responsive to the first and second light projection unit control signals;

first and second cameras A, B (203, 204) receiving first and second camera control signals A, B as input, scanning an object under measurement from two different directions responsive to the first and second camera control signals and outputting the resulting image signals as first and second camera output signals A, B (7, 8);

first to fourth image storage memories (206–209) receiving the first and second camera output signals, selected (changed over) through a switch (243) by a camera output control signal (14), recording images, captured by first and second cameras with two light patterns being projected, by a combination of the first light projection unit with the first camera, a combination of the second light projection unit with the first camera, a combination of the first light projection unit with the second camera and a combination of the second light projection unit with the second camera, and outputting the image as first to fourth image signals A-A, A-B, B-A and B-B;

a phase calculation unit (210) receiving the first to fourth image signals A-A, A-B, B-A and B-B, selected through a switch (244) by a phase calculation control signal (14), to calculate initial phase values from the image string from pixel to pixel to output the calculated initial phases as a phase signal;

first to fourth phase storage memories (211–214) receiving the phase signals selected by the phase calculation control signal to record phase values calculated from the first to fourth image signals A-A, A-B, B-A and B-B to output calculated phase values as first to fourth image signals A-A, A-B, B-A and B-B;

a first absolute phase determination unit (215) receiving the phase signals A-A and B-A as input, determining an absolute phase value as to a pixel position, the absolute phase of which can be determined, to output the absolute phase values as absolute phase signals A-A (A-A/B-A) and absolute phase values B-A (A-A/B-A);

a second absolute phase determination unit (219) receiving the phase signals A-B and B-B as input, determining an absolute phase value as to a pixel position, the absolute phase of which can be determined, to output the absolute phase values as absolute phase signals A-B (A-B/B-B) and absolute phase values B-B (A-B/B-B);

a third absolute phase determination unit (216) receiving the phase signals A-A and A-B as input, determining an absolute phase value as to a pixel position, the absolute phase of which can be determined, to output the absolute phase values as absolute phase signals A-A (A-A/A-B) and absolute phase values A-B (A-A/A-B); a fourth absolute phase determination unit (220) receiving the phase signals B-A and B-B as input, determining an absolute phase value as to a pixel position, the absolute phase of which can be determined, to output the absolute phase values as absolute phase signals B-A (B-A/B-B) and absolute phase values B-B (B-A/B-B);

a fifth absolute phase determination unit (217) receiving the phase signals A-A and B-B as input, to output the absolute phase determining pixel and the absolute phase on an image A (light pattern A) as an absolute phase signal A-A (A-A/B-B) for a pixel position, the absolute phase of which can be determined; and to output the absolute phase determining pixel and the absolute phase on an image B (light pattern B) as an absolute phase signal B-B (A-A/B-B); and a sixth absolute phase determination unit (218) receiving the phase signals A-B and B-A as input, to output the absolute phase determining pixel and the absolute phase on an image A (light pattern A) as an absolute phase signal A-B (A-B/B-A) for the pixel position the absolute phase of which can be determined and to output the absolute phase determining pixel and the absolute phase on an image B (light pattern A) as an absolute phase signal B-A (A-B/B-A);

In the present embodiment, the absolute phase conversion unit receiving phase signals selected through a switch (245) by the three-dimensional coordinate calculation control signal (33) and the absolute phase signal as input, the absolute phase conversion unit converting the phase value of the pixel position in the phase signal, the absolute phase of which in the phase signal has not been acquired, in reference to the absolute phase signal;

the absolute phase conversion unit is made up of any one of the following sets:

a set of a phase signal A-A and absolute phase signals A-A (A-A/B-A), A-A (A-A/A-B) and A-A (A-A/B-B), a set of a phase signal A-B and absolute phase signals A-B (A-A/A-B), A-B (A-B/B-A) and A-B (A-B/B-B), a set of a phase signal B-A and absolute phase signals B-A (A-A/A-B), B-A (A-B/B-A) and B-A (B-A/B-B), and a set of a phase signal B-B and absolute phase signals B-B (A-A/B-B), B-B (A-B/B-B) and B-B (B-A/B-B), the absolute phase conversion unit (221) outputting a pixel for which the absolute phase has been acquired is verified from a logical product of the entire absolute phase signals and output as an absolute phase conversion signal;

a three-dimensional coordinate conversion unit (222) receiving the absolute phase conversion signal and with the three-dimensional coordinate calculation control signal as input, the three-dimensional coordinate conversion unit converting the absolute phase, if the absolute phase is one obtained from the phase signal A-A, into a three-dimensional coordinate value by parameters corresponding to the relative position between the first light projection unit A and the first camera A and to the internal structure, to output a three-dimensional coordinate value as a three-dimensional coordinate signal; the three-dimensional coordinate conversion unit converting the absolute phase, if the absolute phase is one obtained from the phase signal A-B, into a three-dimensional coordinate value by parameters corresponding to the relative position between the second light project ion unit and the first camera A and to the internal structure, to output a three-dimensional coordinate value as a three-dimensional coordinate signal;

the three-dimensional coordinate conversion unit (222) converting the absolute phase, if the absolute phase is one found from the phase signal B-A, into a three-dimensional coordinate value by parameters corresponding to the relative position between the first light projection unit and the second camera B and to the internal structure to output a three-dimensional coordinate value as a three-dimensional coordinate signal;

the three-dimensional coordinate conversion unit (222) converting the absolute phase, if the absolute phase is one found from the phase signal B-B, into a three-dimensional coordinate value by parameters corresponding to the relative position between the second light projection means and the second camera B and to the internal structure to output the three-dimensional coordinate value as the three-dimensional coordinate signal;

a first three-dimensional coordinate storage memory (223) for storing the three-dimensional shape information by a set of the first light projection unit A and the first camera, obtained by the three-dimensional coordinate conversion unit, for outputting the three-dimensional coordinate signal A-A;

a second three-dimensional coordinate storage memory (224) for storing the three-dimensional shape information by a set of the second light projection unit A and the first camera, obtained by the three-dimensional coordinate conversion unit, for outputting the three-dimensional coordinate signal A-B;

a third three-dimensional coordinate storage memory (225) for storing the three-dimensional shape information by a set of the second light projection unit B and the first camera A, obtained by the three-dimensional coordinate conversion means, for outputting the three-dimensional coordinate signal B-A;

a fourth three-dimensional coordinate storage memory (226) for storing the three-dimensional shape information by a set of the second light projection unit B and the second camera B, obtained by the three-dimensional coordinate conversion unit, for outputting the three-dimensional coordinate signal B-B;

a three-dimensional coordinate synthesis unit (227) receiving the three-dimensional coordinate signals A-A, A-B, B-A and B-B as input for synthesizing four shape information to output the synthesized information as a synthesized three-dimensional coordinate signal; and a control unit (253) for outputting the first and second light projection unit control signals (1, 2), first and second camera control signals (3, 4), phase calculation control signals and the three-dimensional coordinate calculation control signals to image (scan) a light pattern while phase shifting the light pattern and for controlling the inputting/outputting of the phase calculation and of the three-dimensional coordinate calculation.

In the third aspect of the present invention, the absolute phase determination unit includes first, second and third absolute phase determiners;

the first absolute phase determiner being fed with the phase signals A-A and B-B and target pixel position signal, as input, finding a first set of corresponding three-dimensional coordinate position candidates from the initial phase of the target pixel in the phase signal A-A obtained from the position of the first camera A by the light pattern of the first light projection unit A, based on the positions of the first light projection unit A and the first camera A, finding a set of corresponding pixel positions of the first set of three-dimensional coordinate position candidates in the phase signal B-B obtained from the position of the second camera B, by the light pattern of the second light projection unit B, based on the position of the second camera B, finding a second set of three-dimensional coordinate position candidates from the initial phase of the set of the corresponding pixel positions, comparing the sets of the first and second three-dimensional coordinate position candidates to verify whether or not an overlapping coordinate point can be determined uniquely; and outputting the pixel position and the initial phase on the phase signal B-B as uniquely determined pixel signals;

the second absolute phase determiner being fed with the phase signals A-A and B-B and with the uniquely determined pixel signals as input, finding a third set of corresponding three-dimensional coordinate position candidates from the initial phase, of a pixel corresponding to a uniquely determined three-dimensional coordinate position, by the light pattern of the second light projection unit B based on the position of the second camera B, finding a third set of corresponding pixel positions in the phase signal A-A obtained from the first camera A by the light pattern of the first light projecting unit A based on the position of the first camera A, finding a fourth set of three-dimensional coordinate position candidates from the initial phase of the set of corresponding pixels, comparing the third and fourth sets of three-dimensional coordinate position candidates to verify whether or not an overlapping coordinate point can be determined uniquely; and determining, if the overlapping coordinate point has been determined uniquely by the above two decision operations, an absolute value of the initial phase of two light patterns from the uniquely determined three-dimensional coordinate position;

the second absolute phase determiner outputting the absolute phase signals A-A and B-B in association with the phase signals A-A and B-B, respectively; and the third absolute phase determiner sequentially scanning the entire pixels of the phase signal A-A pixel by pixel to output a target pixel position signal.

The absolute phase determiner is fed with the phase signals A-A and B-A as input, finds a set of corresponding three-dimensional coordinate position candidates from the initial phase of the target pixel in the phase signal A-A, based on the position of the first light projection unit A and the first camera A, finds a set of corresponding pixel positions corresponding to the set of three-dimensional coordinate positions in the phase signal B-A obtained from the position of the second camera B from the light pattern of the first light projection unit A, based on the position of the second camera B, refers to the respective initial phases, compares the initial phase with the initial phase of the target pixel in the phase signal A-A to verify whether or not the corresponding pixel position having the same initial phase can be determined uniquely, finds the three-dimensional coordinate position by the uniquely determined pixel position, and determines the absolute value of the initial phase of the target pixel; the above steps are repeated for the entire pixels of the phase signals A-A; the absolute phase determination unit outputting the absolute phase signals A-A and B-B in association with the phase signals A-A and B-B.

The absolute phase determination unit includes a first absolute phase determiner fed with the phase signals A-A and B-A and with a target pixel position signal as input, finds a first set of corresponding three-dimensional coordinate position candidates from the initial phase of the target pixel in the phase signal A-A, based on the position of the first light projection unit A and the first camera A, finds a set of corresponding pixel positions corresponding to the first set of three-dimensional coordinate positions in the phase signal B-A obtained from the position of the second camera B from the light pattern of the first light projection unit A based on the position of the second camera B, refers to the i r respective initial phases, and compares the respective initial phases of the target pixel in the phase signal A-A, to verify whether or not the corresponding pixel position having the same initial phase can be uniquely determined to output the pixel position of the pixel on the phase signal B-A and the initial phase as the uniquely determined pixel signal;

a second absolute phase determiner receiving the phase signal A-A and B-A and with the uniquely determined pixel signal as input, finding a second set of corresponding three-dimensional coordinate position candidates from the initial phase of the target pixel in the phase signal B-A, finding a second set of corresponding pixel positions corresponding to the second set of three-dimensional coordinate positions in the phase signal A-A obtained from the position of the first camera A from the light pattern of the first light projection unit A based on the position of the first camera A, referring to their respective initial phases, comparing the respective initial phases with the initial phase of the uniquely determined pixel in the phase signal B-A to verify whether or not the corresponding pixel position having the same initial phase can be determined uniquely, finding a three-dimensional coordinate position from corresponding the pixel position if such Pixel position has been determined uniquely,. and for determining the absolute value of the initial phase of the target pixel in the phase signals A-A and B-A to output the absolute Phase signals A-A and B-B in association with the phase signals A-A and B-B, respectively; and a third absolute phase determiner for sequentially scanning the entire pixels of the phase signal A-A to output a target pixel position signal.

The absolute phase determiner is fed with the phase signals A-A and A-B to find a set of corresponding three-dimensional coordinate position candidates from the initial phase of the target Pixel in the phase signal A-A, based on the position of the first light projection unit A and the first camera A, refers to a set of possible phase values from the position of the second light projection unit B and the set of three-dimensional coordinate position candidates, compares the phase values to the initial phase of the target pixel in the phase signal A-B obtained from the position of the first camera A by the light pattern of the second light projection unit B to verify whether or not the coincident initial phase can be determined uniquely, and determines the absolute value of the initial phase of the target pixel from the uniquely determined three-dimensional coordinate Position; the absolute Phase determiner repeating the above steps for the entire pixels of the Phase signals A-A to output the absolute phase signals A-A and A-B in association with the phase signals A-A and A-B, respectively.

The absolute phase determination unit includes first, second and third absolute phase determiners: the first absolute phase determination receiving the phase signals A-A and A-B and a target pixel position signal to find a first set of corresponding three-dimensional coordinate position candidates from the initial Phase of the target pixel in the phase signal A-A, based on the positions of the first light projection unit A and the first camera A, referring to a set of possible phase values from the position of the second light projection unit B and the first set of three-dimensional coordinate position candidates, and comparing the phase values to the initial phase of the target pixel in the Phase signal A-B obtained from the position of the first camera A by the light pattern of the second light projection unit B, to verify whether or not the coincident initial Phase can be determined uniquely to output the pixel position and the initial phase of the pixel on the phase signal A-B and the initial phase as uniquely determined pixel signal;

the second absolute Phase determiner receiving the phase signals A-A and A-B and the uniquely determined pixel signal as input, to find a second set of corresponding three-dimensional coordinate position candidates from the initial phase of the target pixel in the phase signal A-B, based on the position of the second light projection unit B and the first camera A, referring to a set of possible phase values from the position of the second light projection unit A and the second set of three-dimensional coordinate position candidates, comparing the phase values to the initial phase of the target pixel in the phase signal A-A obtained from the position of the first camera A by the light pattern of the first light projection unit A, to verify whether or not the coincident initial phase can be determined uniquely, determining the absolute value of the initial phase of the two light patterns from the three-dimensional coordinate position uniquely determined by the two verifying operations, to output the absolute phase signals A-A and A-B in association with the phase signals A-A and A-B, respectively, and third absolute phase determiner for sequentially scanning the entire pixels of the phase signal A-A to output a target Pixel Position signal.

There is Provided means for projecting a spatially striped luminance distribution on an object under measurement from three or more different directions while phase shifting the light pattern. There may be provided a camera for imaging (scanning) an object under measurement from three or more different directions. The projected light pattern may be sinusoidal. The projected light pattern may also be of a triangular wave in shape.

According to a first mode of embodiments, a method for measuring a three-dimensional shape comprises the steps of:

(a) projecting a light pattern having spatially striped luminance distribution on an object being measured from a light projection unit, while phase-shifting the light pattern;

(b) imaging (scanning) the object illuminated by the light pattern while phase-shifting the light pattern from two different directions by cameras(imaging means);

(c) deriving first and second initial phase images from the first and second image strings taken by cameras from the two directions, respectively;

(d) finding a set of coordinates of corresponding three-dimensional coordinate positions from an initial Phase of a target pixel, in the first initial phase image, based on a position of the light pattern projection and a first scanning position;

(e) finding a set of pixel positions corresponding to the set of three-dimensional coordinate positions in the second initial Phase image based on a position of the light pattern projection and a second scanning Position, having reference to initial phases of the respective pixel positions, comparing the initial Phases to an initial phase of the target pixel in the first initial phase image and verifying whether or not a corresponding pixel position having a same initial phase can be uniquely determined, it being noted that, if the corresponding pixel Position having the same initial Phase can not be determined uniquely, the processing proceeds to step (g)

(f) finding a three-dimensional coordinate position, if uniquely determinable, it is based on the uniquely determined pixel position to determine an absolute value of an initial phase of a corresponding pixel in the first and second initial phase images;

(g) verifying whether or not the steps (d) to (f) have been carried out for the entire pixels of the first initial phase images, it being noted that, if there is any non-processed pixel, processing reverts to step (d);

(h) converting the first and second initial phase images into first and second. absolute phase images in reference to the absolute value of the initial phase of the light pattern; and (i) finding a three-dimensional coordinate position of the object being measured in each pixel based on the absolute Phase in each pixel of the first and second absolute Phase images, the projection position of the light pattern, and the scanning positions of the first and second images.

It is noted that the above steps are executed by a program executed on a computer controlling the respective light projection units and scanner (imaging means) by inputting data from the imaging means. The present invention is carried out by reading the program read-in from a medium, e.g., FD or CD-ROM carrying the program by the computer. The medium may be static, dynamic or a communication system whatever can carry or transmit the program and, may include a carrier wave, too.

In the method of the present invention, the step (f) of finding the three-dimensional coordinate position from the initial phase image includes the following sub-steps of (f-1) to (f-6)

(f-1) finding, based on the projecting position of the light pattern and on the first scanning posit ion a set of candidates of first three-dimensional coordinate positions, from the initial phase of the target pixel in the first initial phase picture;

(f-2) finding a set of pixel positions corresponding to a set of the first three-dimensional coordinate positions, in the second initial phase image, based on the second scanning position, in reference to an initial phase of each of the pixel positions, comparing the resulting initial phase to the initial phase of the target pixel in the initial phase image and verifying whether or not a position of a corresponding pixel having a same initial phase can be uniquely determined;

(f-3) finding a set of candidates of corresponding second three-dimensional coordinate positions from an initial phase of a uniquely determined pixel in the second initial phase image based on the projecting position of the light pattern and the second scanning position;

(f-4) finding a set of pixel positions corresponding to the set of second three-dimensional coordinate positions in the initial phase image based on the first scanning position, in reference to the initial phase of the respective pixel positions in the second initial phase image, and comparing the initial phase to the initial Phase of the uniquely determined pixel in the second initial phase image, to verify whether or not a position of the corresponding pixel having a same initial phase can be uniquely determined;

(f-5) finding a three-dimensional coordinate position from the pixel Position uniquely determined in the steps (f-2), (f-4) to determine an absolute value of the initial phase of a corresponding pixel in the first and second initial phase image; and (f-6) determining whether or not the steps (f-1) to (f-5) have been executed on all the pixels of the first initial phase image, followed by returning when there is any unexecuted pixel; i.e., repeating the steps (f-1) to (f-5) for the entire pixels of the first initial phase image.

A method for measuring for measuring a three-dimensional shape according to a second mode of the present invention includes the steps of:

(a) projecting first and second light patterns, having spatially striped luminance distribution, by light projection means, from two different directions, while phase-shifting the light pattern;

(b) illuminating the first light pattern, while phase shifting the first light pattern, for imaging (scanning) an object being measured by a scanner (imaging means), followed by illuminating the second light pattern, while phase shifting the second light pattern, for imaging (scanning) the object being measured;

(c) deriving first and second initial phase images from the first and second image strings imaged by the first and second light patterns;

(d) finding a set of corresponding three-dimensional coordinate positions from the initial phase of a target pixel in the first initial Phase image, based on the projection position of the first light pattern and the scanning position;

(e) having reference to a set of possible phase values, from the illuminated position of the second light Patten and a corresponding set of three-dimensional coordinate position candidates, and comparing an initial phase of the target pixel in the second initial phase image to verify whether or not a same initial phase can be determined uniquely;

(f) determining the absolute values of the initial phases of the first and second light patterns from the uniquely determined three-dimensional coordinate positions;

(g) repeating the steps of from (d) to (f) for the entire pixels of the first initial phase image;

(h) converting the first and second initial Phase images into images of first and second absolute phases in reference to the absolute value of the initial phase of the light pattern; and (i) finding a three-dimensional coordinate position in each pixel of the object being measured, based on the absolute Phase in each pixel of the first and second absolute phase images, projection positions of the two light patterns and the image scanning positions.

The step (f) determining the absolute position of the initial Phase from an initial phase image includes sub-steps of:

(f-1) finding a first set of corresponding three-dimensional coordinate position candidates from the initial Phase of the target pixel of the first initial phase image, based on the project ion position of the first light pattern and the scanning position;

(f-2) having reference to a set of possible Phase values, from an illumination position of the second light pattern and the first set of three-dimensional coordinate position candidates, and comparing the phase values with the initial value of the target pixel in the second initial phase image to verify whether or not the coincident initial phase can be determined uniquely;

(f-3) finding a second set of corresponding three-dimensional coordinate position candidates from the initial Phase of the target pixel in the second initial phase image based on the project ion position of the second light pattern and the scanning position;

(f-4) having reference to a set of possible phase values, from an illumination position of the first light pattern and the second set of three-dimensional coordinate position candidates, and comparing the phase values with the initial value of the target pixel in the first initial phase image to verify whether or not a coincident initial phase can be determined uniquely;

(f-5) determining absolute values of the initial phases of the two light patterns from the three-dimensional coordinate positions uniquely determined from the steps (f-2) and (f-4); and (f-6) repeating the steps (f-1) to (f-5) for the entire pixels of the first initial Phase image.

The processing of the above-mentioned respective steps is executed, on inputting image data from imaging means (e.g., scanning camera with CCD array), by a program configured to control the imaging means and light projection means. The present invention can be carried out on reading out a program from a FD or a CD-ROM, having the program recorded thereon, or from a communication medium (e.g., network or telecommunication sysytem), and executing the read-out program on the computer.

A method for measuring a three-dimensional shape, according to the third embodying mode of the present invention, includes the steps of:

(a) projecting first and second light patterns, having spatially striped luminance distribution, by light projection means (projector), from two different directions, on an object being measured, while phase-shifting the light patterns;

(b) illuminating the first light pattern, while phase shifting the first light pattern, for imaging (scanning) the object by first and second imaging means (scanner), followed by projecting the second light pattern, while phase shifting the second light pattern, for imaging the object by the first and second imaging means from two different directions in a similar manner;

(c) deriving first and second initial phase images from each of the first and second image strings scanned by the first light pattern from two directions, respectively;

(d) deriving third and fourth initial phase images from third and fourth image strings, scanned by the first and second imaging means with the second light pattern, from respective two directions;

(e) finding a first set of corresponding first three-dimensional coordinate position candidates, from the initial phase of the target pixel in the first initial phase image obtained from the first scanning position by the first light pattern, based on the projecting position of the first light pattern and the first scanning position;

(f) finding a set of corresponding pixel positions of the first set of the three-dimensional coordinate Position candidates in a fourth initial phase image obtained from the second scanning position by the second light pattern, based on the second scanning position, to find a second set of three-dimensional coordinate position candidates from the initial Phase of the set of corresponding pixels;

(g) comparing the first and second sets of three-dimensional coordinate position candidates to verify whether or not an overlapping coordinate point can be determined uniquely;

(h) determining absolute values of the initial phases of the first and second light patterns from the uniquely determined three-dimensional coordinate position;

(i) repeating the steps of from (e) to (h) for the entire pixels of the first initial phase image; and (j) converting the first to fourth initial phase images to the first to fourth absolute phase images, in reference to the absolute value of the initial phase of the light pattern;

(k) finding a three-dimensional coordinate position of the objet under measurement in each pixel based on the absolute phase in each pixel of the first to fourth absolute Phase images, projecting Position of the first and second light Patterns and on the first and second scanning positions.

The step (h) of determining the absolute value of the initial Phase from the initial phase image includes the following sub-steps of (h-1) to (h-5):

(h-1) finding a first set of corresponding three-dimensional coordinate position candidates from the initial phase of the target pixel in the first initial phase image obtained from the first scanning position by the first light Pattern, based on the projection position of the first light pattern and the first scanning position;

(h-2) finding a set of corresponding pixel positions of the first set of three-dimensional coordinate position candidates in an initial phase image obtained from the second scanning position by the second light pattern, based on the second scanning position, to find a second set of three-dimensional coordinate position candidates from the initial phase of the set of corresponding pixels;

(h-3) comparing the first and second sets of three-dimensional coordinate position candidates to verify whether or not an overlapping coordinate point can be determined uniquely;

(h-4) finding a third set of corresponding coordinate position candidates from the initial phase of pixels corresponding to the uniquely determined three-dimensional coordinate positions, based on the second scanning position;

(h-5) finding a set of corresponding pixel positions of the third set of three-dimensional coordinate position candidates in the first initial Phase image obtained from the second scanning posit ions, by the second light pattern, based on the first scanning position, to find a fourth set of the coordinate position candidates from the initial phase of the set of corresponding pixels;

(h-6) comparing the third and fourth sets of three-dimensional coordinate position candidates: to verify whether or not an overlapping coordinate point can be determined uniquely;

(h-7) determining absolute values of the initial Phases of the first and second light patterns from the uniquely determined three-dimensional coordinate position; and (h-8) repeating the steps (h-1) to (h-7) for the entire pixels of the initial phase image.

The step (h) of determining an absolute value of the initial phase from an initial phase image includes sub-steps of:

(h-1) a step of finding a set of corresponding three-dimensional coordinate position candidates from the initial phase of the target pixel in the first initial phase image, based on the projection position of the first light pattern and on the first scanning position;

(h-2) finding a set of pixel positions corresponding to the set of three-dimensional coordinate positions, in the second initial phase image obtained from the second scanning position by the first light pattern, based on the second scanning position, having reference to respective initial phases, comparing the initial phases to the initial phase of the target pixel in the first initial phase image, and verifying whether or not the corresponding pixel position having the same initial phase can be uniquely determined;

(h-3) finding a three-dimensional coordinate position from the uniquely determined pixel position to determine an absolute value of the initial phase of the corresponding pixel in the initial Phase image; and (h-4) repeating the steps (h-1) to (h-3) for the entire pixels of the first initial phase image.

Alternatively, the step (h) of determining an absolute value of the initial phase from an initial phase image may also include sub-steps of:

(h-1) finding a first set of corresponding three-dimensional coordinate position candidates from the initial phase of a target pixel in the first initial phase image, based on the projection position of the first light pattern and on the first scanning position;

(h-2) finding a set of pixel positions corresponding to the first set of three-dimensional coordinate positions, in the second initial phase image obtained from the second scanning position by the first light pattern, based on the second scanning position, having reference to respective initial phases, comparing the initial phases. to the initial phase of the target pixel in the first initial phase image, and verifying whether or not the corresponding pixel position having the same initial phase can be determined uniquely;

(h-3) finding a second set of corresponding three-dimensional coordinate position candidates from the initial Phase of the uniquely determined pixel in the second initial phase image, based on the projection position of the first light pattern and the second scanning position;

(h-4) finding a set of pixel positions corresponding to the second set of three-dimensional coordinate positions, in the first initial phase image obtained from the first scanning position by the first light pattern, based on the first scanning position, having reference to respective initial phases, comparing the initial phases to the initial phase of the uniquely determined pixel in the second initial phase image, and verifying whether or not the corresponding pixel position having the same initial phase can be uniquely determined;

(h-5) finding a three-dimensional coordinate position from the pixel Position uniquely determined by the steps (h-3, h-4) to determine an absolute value of the initial phase of the corresponding pixel in the initial phase image; and (h-6) repeating the steps (h-2) to (h-5) for the entire pixels of the initial Phase image.

The step (h) of determining an absolute value of the initial phase from an initial phase image may include sub-steps of:

(h-1) finding a set of corresponding three-dimensional coordinate position candidates from the initial phase of a target pixel in the first initial phase image, based on the projection position of the first light pattern and on the first scanning position;

(h-2) having reference to a set of possible phase values from the projection position of the second light pattern and the set of three-dimensional coordinate position candidates, comparing the phase values to the initial phase of a target pixel in a third initial phase image obtained from the first scanning position by the second light pattern, and verifying whether or not a coincident initial phase can be uniquely determined;

(h-3) determining an absolute value of the initial phase of the corresponding pixel in the initial Phase image from the uniquely determined three-dimensional coordinate position; and (h-4) repeating the steps from (h-1) to (h-3) for the entire pixels of the first initial phase image to determine the absolute value of the initial phase.

Further, the step (h) of determining an absolute value of the initial phase from an initial phase image may include sub-steps of:

(h-1) a step of finding a first set of corresponding three-dimensional coordinate position candidates from an initial Phase of a target pixel in a first initial phase image, based on the projection position of the first light pattern and the first scanning position;

(h-2) having reference to a set of possible phase values, from the projection position of the second light pattern and the first set of three-dimensional coordinate position candidates, comparing the phase values to the initial phase of the target pixel in a third initial phase image obtained from the first scanning position by the second light pattern, and verifying whether or not a coincident initial phase can be determined uniquely;

(h-3) finding a second set of corresponding three-dimensional coordinate Position candidates, from the initial Phase of the target pixel in the third initial phase image, based on the projection position of the second light pattern and the first scanning position; and (h-4) having reference to a set of possible phase values, from the projection position of the first light Pattern and the second set of three-dimensional coordinate position candidates, comparing the phase values to the initial phase of the target pixel in the first initial Phase image obtained from the first scanning position by the first light pattern, and verifying whether or not a coincident initial phase can be determined uniquely;

(h-5) determining an absolute value of the initial phase of the corresponding pixel in the initial phase image from the three-dimensional coordinate positions uniquely determined by the steps (h-3) and (h-4); and (h-6) repeating the above steps (h-1) to (h-5) for the entire pixels of the first initial phase image.

The processing of the above-mentioned respective steps can be executed, on inputting image data from imaging means (scanner), by a program configured to control the imaging means and light projection means (projector). The present invention can be carried out on reading out a program from a FD or a CD-ROM, having the program recorded thereon, or from a communication medium, and executing the read-out program on a computer.

DETAILED DESCRIPTION OF PREFERRED EMBODIMENTS

Figure 2:
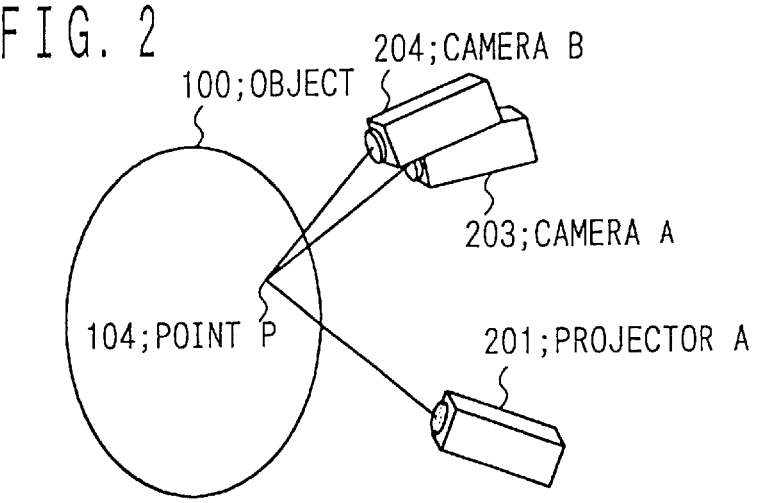
FIG. 2 illustrates a manner of measurement in the first embodiment of the present invention.

Referring to the drawings, a preferred embodiment of the present invention is explained in detail. FIG. 1 shows, in a block diagram, a structure of a three-dimensional shape measurement apparatus according to a first equipment of the present invention and FIG. 2 illustrates the light projection in a preferred embodiment of the present invention and the state of an object and a camera.

A light projector A 201, projecting a light pattern having a spatially sinusoidal luminance distribution, has a light projector A control signal 1 as an input, and shifts the phase value of the sinusoidal light pattern by $2\pi/4$ each time in keeping with the control signal 1. A camera A 203 and a camera B 204 capture images in keeping with a camera A control signal 3 and a camera B control signal 4, respectively, to output a camera A output signal 5 and a camera B output signal 6, respectively.

A light projector/camera controller 205 outputs a light projector A control signal 1, camera A control signal 3 and the camera B control signal 4 and shifts the phase value of the sinusoidal light pattern, projected from the light projector A 201, by $2\pi/4$ each time to take (scan) an image by the camera A 203 and by the camera B 204. The light projector/camera controller 205 repeats this processing four times.

The light projector/camera controller 205 also outputs a phase calculation control signal 14 to control the phase calculation while switching between the images of the cameras A 203 and B 204. The light projector/camera controller 205 also controls a three-dimensional shape while outputting a three-dimensional(3D) coordinate calculation control signal 33.

An image memory A-A 206 receives a camera A output signal 5 and sequentially records images taken by a sinusoidal light pattern of different phases sent from the camera A 203 to output an image signal A-A 9.

Similarly, an image memory B-A 208 receives a camera B output signal 6 and sequentially records images taken by a sinusoidal light pattern of a different phase sent from the camera B 204 to output an image signal B-A 11.

A phase calculator 210 receives an image signal A-A 9 or an image signal B-A 11, controlled by the phase calculation control signal 14 and calculates phase values in accordance with the above equation (6), from pixel to pixel, from a set of images taken by the sinusoidal light pattern of a different phase, to output a calculated phase value as a phase signal 13.

A phase memory A-A 211 receives the Phase signal 13, control led by the phase calculation control signal 14 and records a phase value calculated from the image signal A-A 9 to output the recorded Phase value as a Phase signal A-A 15.

Similarly, a phase memory B-A 213 receives the phase signal 13, controlled by the phase calculation control signal 14, and records a phase value calculated from the image signal B-A 11 to output the recorded phase value as a phase signal B-A 17.

An absolute phase determination unit (determiner) A-A/B-A 215 is fed with the phase signal A-A 15 and the phase signal B-A 17 as inputs to determine an absolute phase value as to the pixel positions, as far as the absolute phases thereof can be determined, to output an absolute phase signal A-A(A-A/B-A) 20 and an absolute Phase signal B-A(A-A/B-A) 21.

Figure 3A:
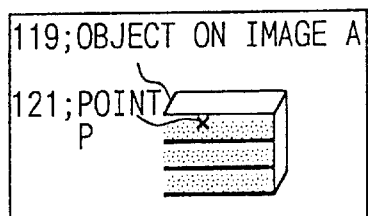
FIGS. 3(a)–3(c) illustrate an absolute phase determining method in the first embodiment of the present invention.
Figure 3B:
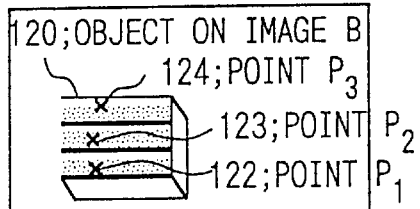
Figure 3C:
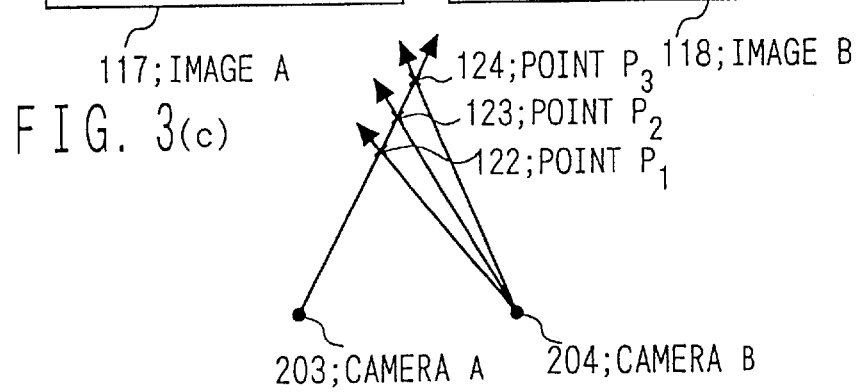

FIG. 3(*a*, *b*) illustrates a method for determining an absolute phase. It is assumed that an object has been imaged on an image A117 and an image B118, taken (scanned) by the camera A203 and the camera B204, respectively, as an object on the image A and as an object 120 on the image B.

A phase value of a Point P121 as a sole point in the object 119 on the image A is assumed to be $\alpha p$. Referring to FIG. 3(*c*), spatial Positions corresponding to $\alpha p$ when a phase of the sinusoidal light pattern projected from the light projector A201 is wrapped in a phase range of from $-\pi$ to $\pi$ are points $P_1$ 122, $P_2$ 123 and $P_3$ 124. If, on checking the phase value $\alpha_4$ in pixel positions of these points $\pi(i=1, 2, 3)$ on the image B, there is a sole point which falls in a range of $\alpha p \pm \epsilon$, the point P in the three-dimensional space can be determined uniquely. This permits determination of three-dimensional coordinate positions of the Point P and hence the absolute phase being projected to be determined. Meanwhile, $\epsilon$ is a pre-set threshold value.

Since a phase value to be processed is wrapped in the phase range of from $-\pi$ to $\pi$, the above-mentioned Phase coincidence verifying processing is somewhat more complex. Corresponding Processes are summarized below:

(1) If $\alpha_p - \epsilon \geq -\pi$ and
  (1-1) if $\alpha_p + \epsilon < \pi$:
    phase values are verified to be coincident if, as for the phase value a i of a point Pi, $\alpha_p - \epsilon \leq \alpha_i$ and $\alpha_i \leq \alpha_p + \epsilon$, is true, and are verified not to be coincident if otherwise;
  (1-2) if $\alpha_p + \epsilon \geq \pi$
    phase values are verified to be coincident if, as for the phase value a i of a point Pi, $\alpha_i \leq \alpha_p + \epsilon - 2\pi$ or $\alpha_p - \epsilon \leq \alpha_i$ is true, and are verified not to be coincident if otherwise;

(2) if other than (1) above;
  (2-1) if $\alpha_p + \epsilon < \pi$
    phase values are verified to be coincident if, as for the phase value $\alpha i$ of a point, $\alpha_i \leq \alpha_p + \epsilon$ or $\alpha_p - \epsilon + 2\pi \leq \alpha_i$ is true, the phase values are verified to be coincident, and are verified not to be coincident if otherwise;
  (2-2) if $\alpha_p + \epsilon \geq \pi$, which is a condition not possible with the present invent ion because E then is set to be an excessively large value, all phase values are verified to be coincident.

By repeating the absolute phase determining processes for the entire points on the image A117, absolute phases of the plural pixels can be determined on the image A110 and on the image B118.

The pixel, an absolute phase of which has been determined on an image A117 and the absolute Phase are outputted as an absolute phase signal A-A(A-A/B-A) 20 on the image A117, and as an absolute phase signal B-A(A-A/B-A) 21 on an image B118. This enables decision of an absolute phase, that is, measurement of an absolute three-dimensional shape, which was not possible in the conventional method if automatic processing is to be used.

An absolute phase converter unit 221 is fed with the phase signal A-A 15 or B-A 17 and the absolute phase signals A-A(A-A/B-A) 20 or B-A(A-A/B-A) 21 by switching, respectively, by a three-dimensional coordinate calculation control signal 33, to refer to an absolute phase signal to convert a phase value of a pixel in Phase signal, the absolute phase of which has not been determined, into an absolute phase, to output a resulting signal as an absolute phase conversion signal 32.

Figure 4A:
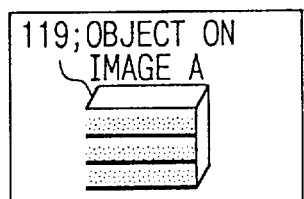
FIGS. 4(a) and 4(b) illustrate a method for finding absolute values of the entire phase values based on the absolute phase values obtained in the first embodiment of the present invention.
Figure 4B:
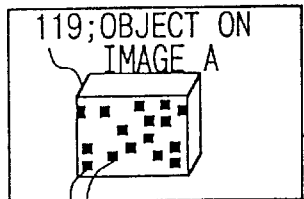

FIGS. 4(*a*)–4(*b*) illustrate an absolute phase image, with FIG. 4(*a*) and FIG. 4(*b*) showing the image A117 and an absolute phase image A125, respectively. A set of pixels on the absolute phase image A125, absolute phases of which have already been obtained on the absolute phase image A125, are denoted by a symbol ■, and are represented as a set of pixels with the determined absolute phases 126 obtained by the absolute phase determiner A-A/B-A 215.

A pixel contacting with each pixel of the set of pixels with the determined absolute phases 126 and the absolute phases of which have not been determined is first considered, and an integer number multiple of $2\pi$ is added to or subtracted from so as to provide a phase difference of $2\pi$ or less with the absolute phase of the pixels with the determined absolute Phases. This procedure is repeated for entire indeterminate phase values to calculate absolute phases of pixels, absolute phase values of which have not yet been determined.

In an area that can be found from both the camera A 203 and the camera B204, pixels, absolute Phase values of which have already been determined, may safely be expected to occur substantially evenly, so that an automatic phase connection processing, hitherto thought to be difficult, can be executed in a stable manner.

A three-dimensional coordinate converter unit (3D COORD-CONVERTER) 222 is fed with the absolute Phase conversion signal 32 and with the three-dimensional coordinate calculation control signal 33 as. input, and converts the input signals into three-dimensional coordinate values, by parameters corresponding to the relative position and/or internal structure of the light projector A201 and the camera A203 if an absolute phase is one found from the phase signal A-A 15, to output a converted signal as a three-dimensional coordinate signal. Similarly, a three-dimensional coordinate converter unit 222 converts the input signals into three-dimensional coordinate values, by parameters corresponding to the relative position and/or internal structure of the light projector A201 and the camera B204, to output a converted signal as a three-dimensional coordinate signal, if the absolute phase is one found from the phase signal B-A 17.

A three-dimensional coordinate memory (3D COORD-MEMORY) A-A 223 stores a three-dimensional shape (configuration) information by the set of the light projector A201 and the camera A203, obtained by the three-dimensional coordinate converter unit 222, to incidentally output a corresponding information as a three-dimensional coordinate signal A-A 35.

The three-dimensional coordinate memory B-A 225 similarly stores a three-dimensional information by the set of the light projector A201 and the camera B204, to incidentally output a corresponding information as a three-dimensional coordinate signal B-A 37.

The three-dimensional coordinate synthesis unit 226 is fed with the three-dimensional coordinate signals A-A 35 and B-A 37 to synthesized two shape informations to output a resulting synthesized three-dimensional TO coordinate signal 39. This gives results of measurement of the three-dimensional shape with a reduced dead angle.

With the light projector A201 employed in the present embodiment, a light pattern with a spatially sinusoidal luminance distribution can be projected. Any suitable sinusoidal light pattern, the phase value of which can be shifted at a certain step (or pitch), may be used. For example, the reference (1) utilizes a liquid crystal grating (The relevant disclosure thereof being incorporated herein by reference thereto). According to the present invent ion, the sinusoidal pattern need not be strictly sinusoidal, as stated in this reference. The light pattern may also be triangular (e.g., saw teeth) in shape within the scope of the present invention.

The cameras A203, B204 are configured to capture (shoot or scan) an image by respective control signals.

It is, however, possible to use a camera outputting image signals at all times, such as an ordinary video camera, and to realize a picture sampling (retrieving) timing by image capturing means.

In the foregoing description, a phase shifting step is $2\pi/4$, the number of times of imaging (shooting) is four and the phase calculation method is the above equation (6). It is however possible to use a variety of different number of times of imaging, amounts (step) of Phase shifting or phase calculation methods, as described in the reference (5). (the relevant disclosure thereof being incorporated herein by reference thereto) It is only sufficient if the phase values can be calculated independently in the cameras A203 and B204, even if the number of times of imaging differs between the two cameras.

Although it has been stated that the Phase calculation unit 210 simply carries out Phase calculations, it is also possible to calculate the amplitude A(x) of the sinusoidal wave in the equation (1) to output only a phase value having a larger amplitude than a pre-set threshold value, that is a phase value of higher reliability. The amplitude A(x) can be found easily from an equation (12):

$$A(x) = \sqrt{[a_1(x)]^2 + [b_1(x)]^2} \qquad (12)$$

In the absolute phase determining unit 215, it is verified whether or not, of the points $P_1$, $P_2$ and $P_3$ on an image B118 geometrically corresponding to a point P on the image A117, such a point having a coincident phase value can be determined uniquely. However, the role of the image A 117 and the image B 118 may be reversed. In addition, the processing for determining the absolute phase can be executed more reliably by combining uniqueness verification of both the image A117 and the image B 118.

Figure 13:
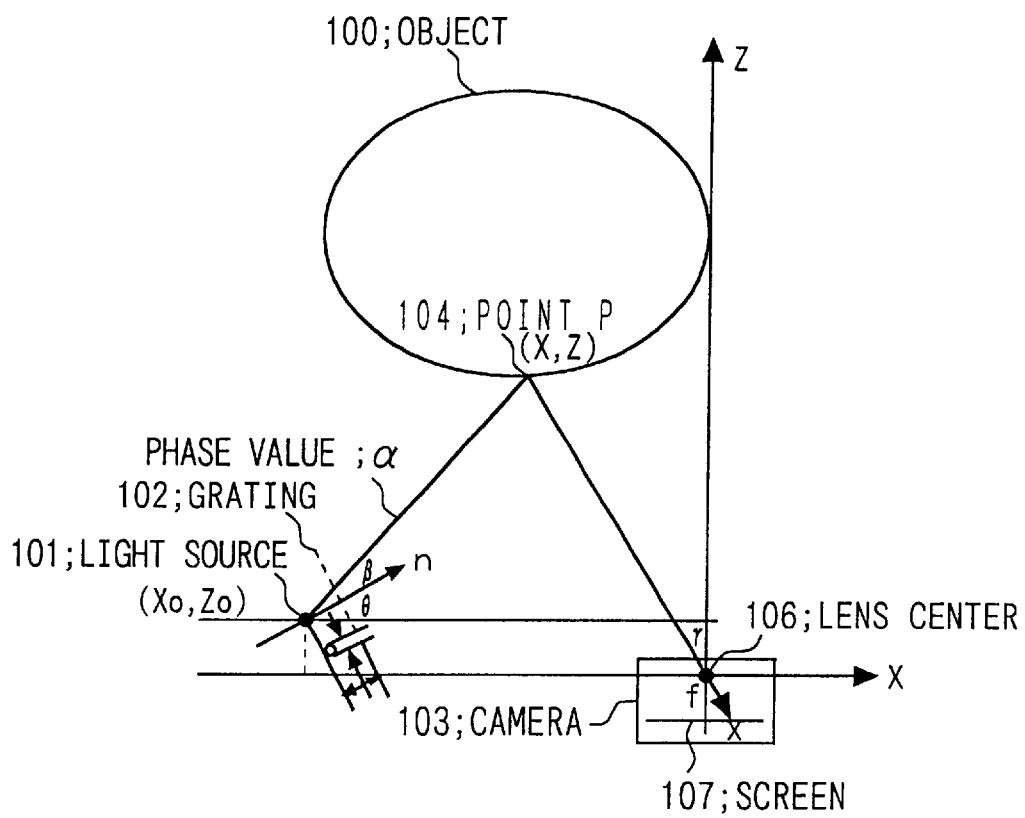
FIG. 13 illustrates conversion from an absolute phase value to a three-dimensional coordinate.
Figure 14:
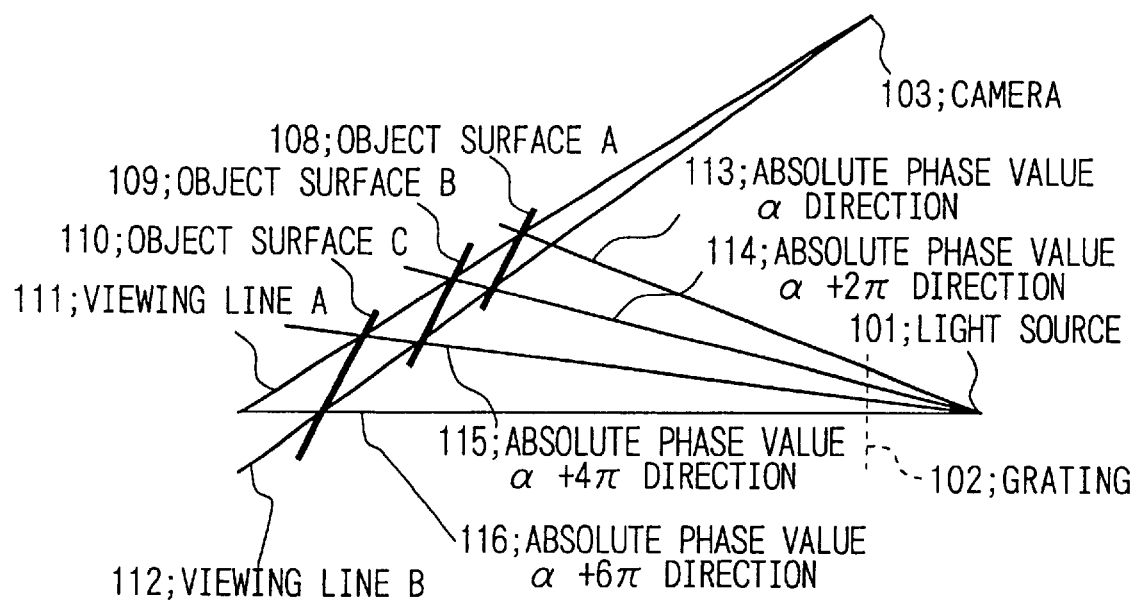
FIG. 14 illustrates problems encountered when the absolute phase value is indefinite.

For finding the points P1, P2 and P3 in the absolute phase determination unit A-A/B-A 215, it was possible to use the equation (11), as explained previously with reference to FIG. 13. However, if a projected light pattern is offset from the sinusoidal wave, or if high precision measurement, in which minute deviation itself poses a problem, is required, it is possible to construct the present invention in such a manner as to correct the deviation from the equation (9) defining a relationship between an ideal phase and grating period.

FIGS. 15(a) and 15(b) illustrate a method for correcting the deviation employing a calibration plate. Referring to FIG. 15a, a planar plate is Put at a calibration position A 144, three-dimensional coordinate positions of which are known from the outset. A light pattern is projected from the light projector A201, as the light pattern is phase-shifted, and images are shot (or scanned) by the cameras A203 and B204. The respective phase values are calculated from the set of the shot images. If deviation from e.g., a sinusoidal wave is not large, conversion from the phase values as found into the absolute Phase values is realized simply by addition or subtraction of integer number multiples of $2\pi$, so that difference from the absolute phase value that may be expected from the equation (9) will be minimized. These absolute-phase values are stored as an absolute phase value table as the calibrating position A144. In a similar manner, Phase values are calculated at the calibrating positions B145, C146 and D147 and tabulated.

Figure 16:
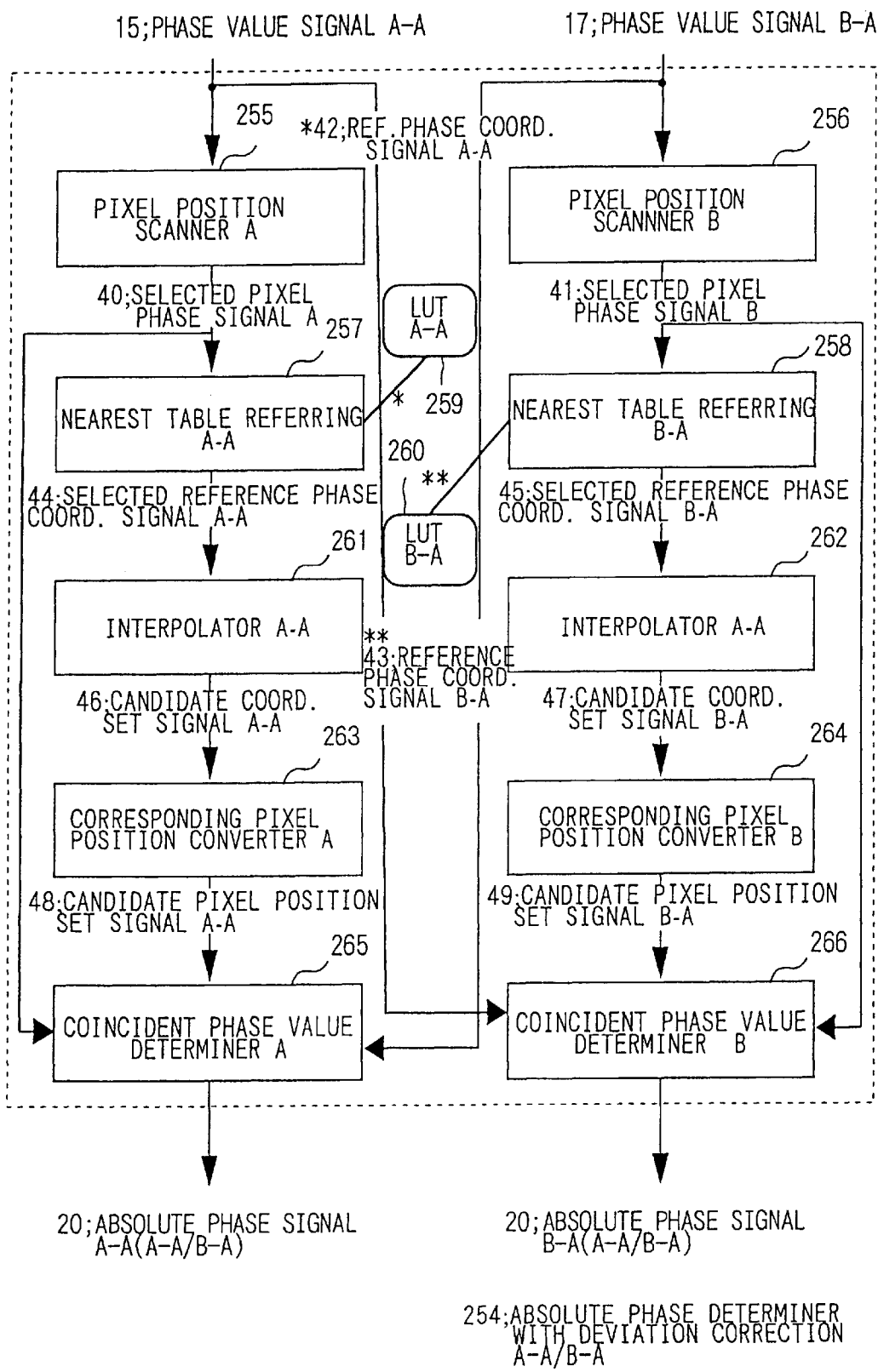
FIG. 16 illustrates an embodiment of the present invention and specifically is a block diagram showing the structure of an absolute phase determining unit with deviation correction configured to correct the deviation from a theoretical value of the light pattern in reference to the measured phase value to find an absolute phase.

Now, referring to FIG. 16, absolute phase determining unit means with deviation correction A-A/B-A 254 is explained.

A pixel position scanning unit (scanner) A255 is fed with a phase value signal A-A 15 as an input. On this phase value signal A-A 15, pixels on the image are sequentially selected and a phase value on a selected pixel position is output as a selected pixel phase signal A40. It is assumed that, in LUT(look up table) A-A 259, there is stored an absolute Phase value table that may be used as a reference when a light pattern projected by the light projector A201 is observed through the camera A203. A nearest table referencing means A-A 257 is fed with the selected pixel phase signal A 40 and with a reference phase coordinate signal A-A 42, achieved on referring to the LUT A-A 259, as inputs, to extract the corresponding table, which is output as a selected reference phase coordinate signal A-A 44.

An operation of this nearest table referencing unit A-A 257 is hereinafter explained in detail by referring to FIG. 15b.

It is assumed that a selected pixel position is the point P121 in FIGS. 3(a) and 3(b), with a phase value at this point P121 being αp.

Absolute phase values at points RPA, RPB, RPC and RPD, that are points of intersection of a viewing line direction P148 from the camera A203 to the point P121 with respective calibration positions A144, B145, C146 and D147, are compared to one another. This comparison is merely a comparison with the phase value at the same pixel position where the point P121 is observed on a phase image obtained on measuring the phase values with a planar plate being put at each calibrating position. It is assumed that an absolute phase value at the point RPA is αRPA and that at the point RPB is αRPB. If, when integer number multiples of $2\pi$ are added to or subtracted from the phase value αp as measured in the viewing line direct ion P148, resulting values fall within a range between αRPA and αRPB, candidate points P1 122 of three-dimensional coordinate point is assumed to be on a line interconnecting the points RPA and RPB. At this time, the three-dimensional coordinate positions and the phase values of the points RPA and RPB are arranged as sets and output as a selected reference phase coordinate signal A-A 44. In the similar manner, the selected reference phase coordinate signals can be found for the points P2 123 and P3 124.

An interpolator unit A-A 261 is fed with selected reference phase coordinate signal A-A 44 to compute three-dimensional coordinate positions at the points P1 122, P1 123 and P3 124 to output these coordinate positions as candidate coordinate set signals A-A 46. If phase value adjusted so as to fall between the phase values αRPA and αRPB is α'P, coordinate position of the point P1 122 is found by a following equation (14):

$$\vec{P}_1 = \frac{(\alpha R_{PB} - \alpha_P) \cdot \vec{R}_{PA} + (\alpha_P - \alpha R_{PA}) \cdot \vec{R}_{PB}}{\alpha R_{PB} - \alpha R_{PA}} \quad (14)$$

In the similar manner, coordinate positions for points P2 123 and P3 124 are found.

A corresponding pixel position conversion unit (convertor) A263 is fed with candidate coordinate set signals A-A 46 as input to find at which coordinate points the points P1 122, P1 123 and P3 124 are found in the camera B204 to output a candidate pixel position set signal A-A 48.

A coincident phase value discriminating means (determiner) A265 is fed with the selected pixel phase signal A40, phase value signal B-A 17 and the candidate pixel position set signal A-A 48 to compare the phase value αP to a phase value of a position of a corresponding pixel in the phase image obtained from the camera B204, to verify whether or not the two signals are coincident. If the point found to be coincident can be determined uniquely, its three-dimensional coordinate position can be determined uniquely to determine its absolute phase value. This absolute phase value is output as an absolute phase value signal A-A(A-A/B-A) 20. For the phase value signal B-A 17, an absolute phase can be determined in the similar manner and output as an absolute phase value signal B-A (A-A/B-A) 21.

Interval between the calibrating positions A144, B145, C146 and D147 need only to be set so as to be sufficiently narrow that there appears no pixel of the coincident phase on wrapping the absolute phase value in a phase range of from −π to π and so as to be sufficiently wide to achieve desired precision by the interpolation by the equation (14).

In a similar manner, deviation from the theoretical value can be corrected for the three-dimensional coordinate conversion unit A-A 222.

Figure 17:
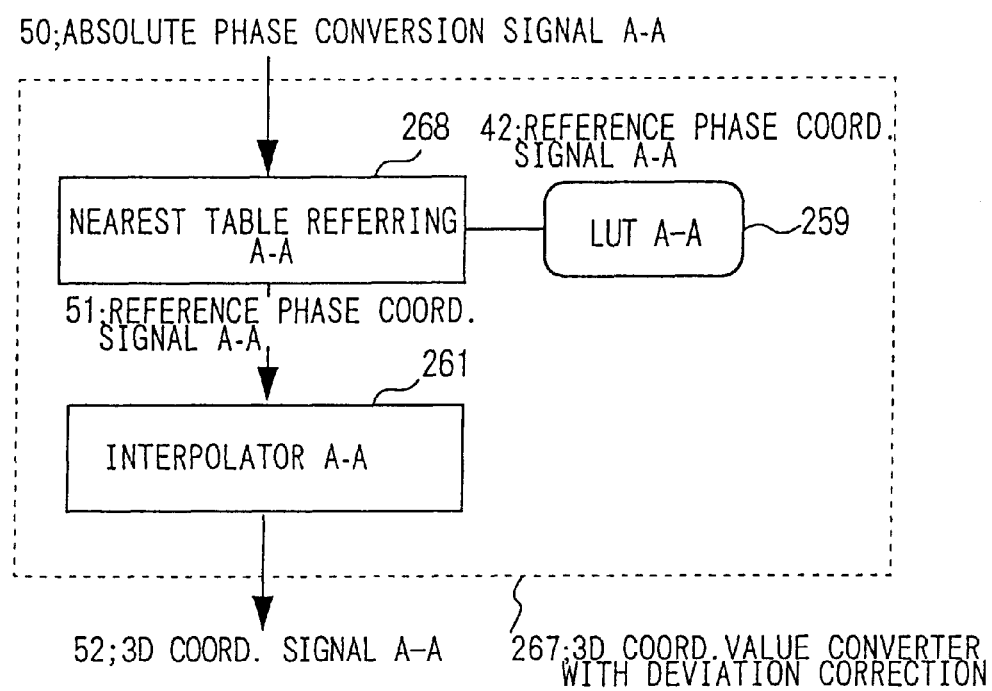
FIG. 17 illustrates an embodiment of the present invention and specifically is a block diagram showing the structure of a three-dimensional coordinate converting unit with deviation correction configured to correct the deviation from a theoretical value of the light pattern in reference to the measured phase value to find a three-dimensional coordinate position.

Referring to FIG. 17, this three-dimensional coordinate conversion unit with deviation correction A-A 267 is hereinafter explained. Meanwhile, it is assumed that, in the LUT A-A 259, there is stored an absolute phase value table usable as a reference in finding the light pattern projected by the light projector A201 by the camera A203.

A nearest table reference unit A-A 268 is fed with an absolute phase conversion signal A-A 50 and with a reference phase coordinate signal A-A 42, obtained on referring to the LUT A-A 259 as inputs to extract a corresponding table which is output as a reference phase coordinate signal A-A 51. Since the absolute phase conversion signal A-A 50 is a signal already converted to an absolute phase signal, three-dimensional coordinate positions and absolute phase values of the corresponding pixel in forward and backward reference planes required for interpolation may be obtained and output as a reference phase coordinate signal A-A 51, simply by comparing with the phase value on the reference plane, without necessity of considering an offset of integer number multiples of 2π, as contrasted with the case of the aforementioned three-dimensional coordinate conversion unit with deviation correction A-A/B-A 254.

An Interpolator unit A-A 261 receives the reference phase coordinate signal A-A 51 and calculates a three dimensional coordinate position based on the equation (14) to an output three-dimensional coordinate signal A-A 252.

The above-mentioned absolute phase conversion unit 221 repeats the conversion to the absolute phase focused on the pixel, the absolute phase of which has been determined. It is however possible to introduce the presence of pixels, the absolute phases of which have already been set, into a variety of techniques described in the above-mentioned reference (2). (the relevant disclosure thereof being incorporated herein with reference thereto) Such a method in which the phase lattice calculation/scanning technique as explained in the present specification is applied between pixels, the absolute phase of which has already been obtained, may be used without departing from the scope of the invention.

Although two cameras are used in the present embodiment, three or more cameras may also be used.

Figure 6:
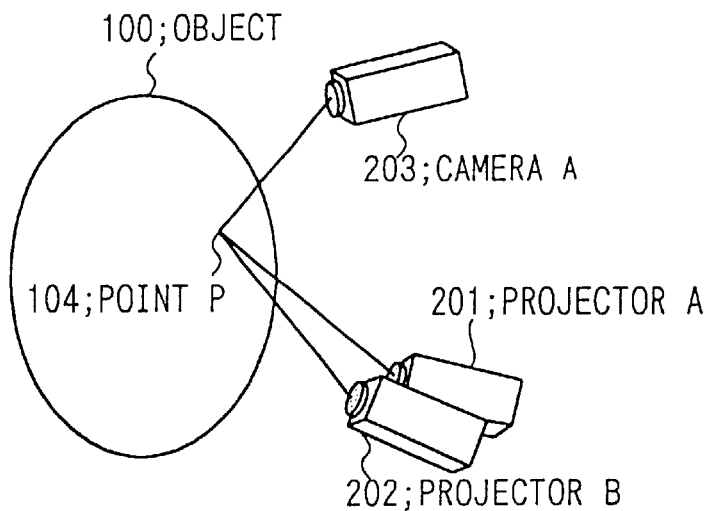
FIG. 6 illustrates a manner of measurement in the second embodiment of the present invention.

FIG. 5 is a block diagram showing a structure of a second embodiment of a three-dimensional shape measurement apparatus according to the present invention. FIG. 6 illustrates a relation of light projection, object and states of the cameras in the second embodiment of the present invention. A light projector A201 and a light projector B202 are respectively fed with control signal 1 for the light projector A and the control signal 2 for the light projector B as input to shift the phase value of the sinusoidal wave by 2π/4 in accordance with these control signals.

A camera A203 is fed with a camera A control signal 3 and captures an image in keeping with the signal to output a camera A output signal 5. A light projector/camera control unit (controller) 251 repeats processing of outputting the control signal 1 for the light projector A, control signal 2 for the light projector B and the camera A control signal 3, projecting a sinusoidal light pattern from the light projector A201, and shooting (or scanning) an image by the camera A203 four times while phase values thereof by 2π/4 each time. The light projector/camera control unit 251 also repeats the processing of projecting a sinusoidal light pattern from the light projector B202 and shooting the image by the camera A203 four times while phase shifting the light pattern by 2π/4 each time.

The light projector/camera control unit 251 simultaneously outputs a camera A-output control signal 7 to change over the output address of camera A. The light projector/camera control unit 25 also outputs a phase calculation control signal 14, controls the phase calculation by switching images of the cameras A203 and B204 and outputs a three-dimensional coordinate calculation control signal 33 to control the three-dimensional shape to be calculated.

An image memory A-A 206 is fed with a camera A output signal 5 and sequentially records images taken by the sinusoidal light pattern of different phases projected by the light projector A201 to output a resulting signal as image signal A-A 9.

An image memory A-A 207 is fed with a camera A output signal 5 and sequentially records images taken by the sinusoidal light pattern of different phases projected by the light projector B202 to output a resulting signal as image signal A-B 10.

A phase calculating unit 210 is fed with the image signal A-A 9 or the image signal A-B 10, as switched by a phase calculation control signal 14, to calculate phase values from pixel to pixel, based on the above equation (6), from the set of images taken by the sinusoidal light pattern of different phases, to output a resulting phase value as a phase signal 13.

A phase storage memory A-A 211 is fed with the phase signal 13, controlled by a phase calculation control signal 14, records phase values calculated from the image signal A-A 9, and outputs a resulting phase signal A-A 15. Similarly, a phase storage memory A-A 212 is fed with the phase signal 13, controlled by the phase calculation control signal 14, records phase values calculated from the image signal A-B 10, and outputs a resulting phase signal A-B 16.

An absolute phase determination unit A-A/A-B 216 is fed with the phase signal A-A 15 and A-B 16, as inputs, and determines an absolute phase value for pixel positions, the absolute phases of which can be determined, to output a resulting absolute phase signal A-A(A-A/A-B) 22 and absolute phase signal A-B(A-A/A-B) 23.

Figures 7A, 7B:
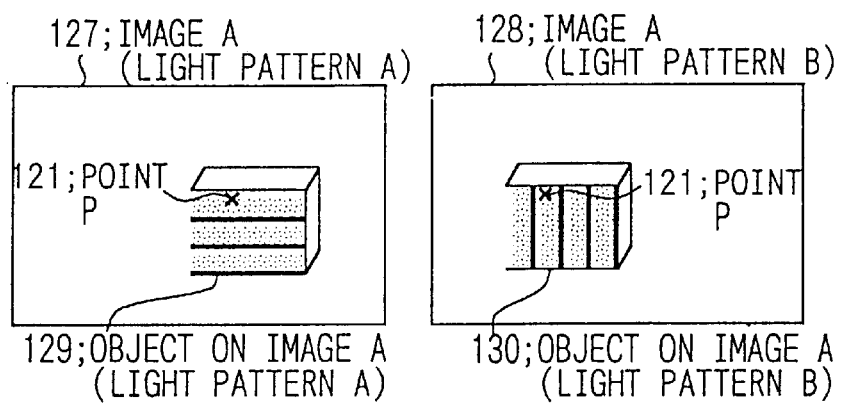
FIGS. 7(a)–7(c) illustrate an absolute phase determining method in the second embodiment of the present invention.
Figure 7C:
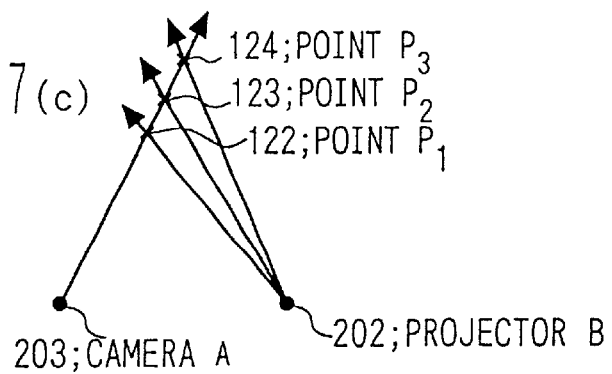

FIGS. 7(a)–7(c) illustrate a method of determining the absolute phase. In an image A (light pattern) 127 taken by projecting the sinusoidal light pattern by the light projector A201 and in an image B (light pattern B) 128, taken by projecting the light by the light projector B202, the same object is imaged as an object 129 on the image A (light pattern A)/an object 130 on the image A (light pattern B). A phase value of a point in the object 129 on the image A (light pattern A), that is a point P121, is assumed to be αp.

As shown in FIG. 7(c), spatial positions, on which a phase of sinusoidal light pattern projected from the light projector A201, (upon being wrapped to a phase range of from $-\pi$ to $\pi$), corresponds to αp, are points $P_1$122, $P_2$123 and $P_3$124. Thus, it is seen that, if a point $P_i$ is viewed from the light projector B202, the phase projected on each phase is $\alpha p_i$, where i=1,2,3. If phases $\alpha p_i$ of these points $P_i$ are compared to the phase value αp of the point P121 of the object 130 on the image A (light pattern B), and there is a sole point which falls within the range of $\alpha p_i \pm \epsilon$, the point P in the three-dimensional space can be determined uniquely.

It is possible in this manner to determine a three-dimensional coordinate position of a point P and further an absolute phase projected from the respective light projector A201, B201. Meanwhile, $\epsilon$ is a pre-set threshold value.

Since a phase value to be processed is wrapped in a phase range of from $-\pi$ to $\pi$, the above-mentioned phase coincidence verifying processing is somewhat more complex in practice. The verifying processing is similar to that by the absolute phase determination unit A-A/B-A 215 in the first embodiment described above.

By repeating the above processing for determining the absolute phase as described above, it is possible to determine absolute phases of plural pixels on each of the image A (light pattern) 127 and on the image B (light pattern B) 128.

A set (pair) of a pixel, an absolute phase of which has been determined on the image A (light pattern A) 127, and its absolute phase, is output as an absolute phase signal A-A (A-A/A-B) 22, while being output as an absolute phase signal A-B(A-A/A-B) 23 for the image B (light pattern B) 128. By so doing, it becomes possible to determine the absolute phase, that is to make the absolute three-dimensional shape measurement, hitherto thought to be difficult in the conventional system if automatic processing is to be used.

An absolute phase conversion unit 221 switches to between the phase signals A-A 15, A-B 16 and between the absolute phase signals A-A(A-A/A-B) 22, A-B(A-A/A-B) 23 by the three-dimensional coordinate calculation control signal 33, in reference to the absolute phase signal, and converts the phase value of the pixel, the absolute phase of which in the phase signal has not been obtained, into an absolute phase, as in the above-described first embodiment, to output a resulting signal as an absolute phase conversion signal 32.

In an area that can be found from both the light projectors A201 and B202, pixels, absolute phase values of which have already been determined can be expected to occur substantially evenly, so that stable execution of the automatic phase connection processing, hitherto thought to be difficult, can be executed in a stable manner.

A three-dimensional coordinate conversion unit (3D COORD-CONVERTER) 222 is fed with the absolute phase conversion signal 32 and with a three-dimensional coordinate calculation control signal 33 as inputs, converts the input signals into three-dimensional coordinate values, by parameters consistent with relative positions or internal structures of the light projector A201 and the camera A203, if an absolute phase is one found from the phase signal A-A 15, and outputs a converted signal as a three-dimensional coordinate signal 34. Similarly, a three-dimensional coordinate conversion unit 222, converts input signals into three-dimensional coordinate values, by parameters consistent with relative position or internal structure of the light projector B202 and the camera A203 if the absolute phase is one found from the phase signal A-B 16, to output the converted signal as a three-dimensional coordinate signal 34.

A three-dimensional coordinate storage memory (3D COORD. MEMORY) A-A 223 stores a three-dimensional shape information by a set of the light projector A201 and the camera A203, obtained by the three-dimensional coordinate conversion unit 222, to incidentally output an information as three-dimensional coordinate signal A-A 35. A three-dimensional coordinate storage memory A-B 224 similarly stores a three-dimensional shape information by the set of the light projector B202 and the camera A203, to incidentally output the information as three-dimensional coordinate signal A-B 36.

A three-dimensional coordinate synthesizer unit 228 is fed with the three-dimensional coordinate signals A-A 35 and A-B 36 to synthesize two shape informations to output a resulting synthesized three-dimensional coordinate signal 39. This gives the results of measurement of the three-dimensional shape with a reduced dead angle.

Structures of the light projector A201, B202 or the camera A203 can be modified as in the first embodiment described above.

In the foregoing description, a quantity (step) of phase shifting is $2\pi/4$, the number of times of imaging is four and the phase calculation method is the above equation (6).

However, according to the present invention it is only sufficient if the phase value can be calculated likewise in the first embodiment. Also, according to the present invention, an amplitude A(x) of the sinusoidal wave can be calculated in the phase calculation unit 210 to output only a phase value with a higher amplitude than a pre-set threshold value, that is a phase value of higher reliability.

In the absolute phase determination unit A-A/A-B 216, it is verified whether or not, of the points $P_1$, $P_2$ and $P_3$ on an image A (light pattern A) 127 geometrically corresponding to a phase value of the image A (light pattern B) 128, such a point having a coincident phase value can be determined uniquely. However, a role of the image A127 (light Pattern A) and the image A (light pattern B) 128 may be reversed. In addition, the processing for determining the absolute phase can be executed more reliably by combining a uniqueness verification process of both the image A (light pattern A) 127 and the image A (light pattern B) 128.

The absolute phase conversion (converter) unit 221 can be modified in structure, as in the first embodiment, described above, without departing from the scope of the invention. Although two projectors are used in the present embodiment, three or more projectors may also be used.

Figure 15:
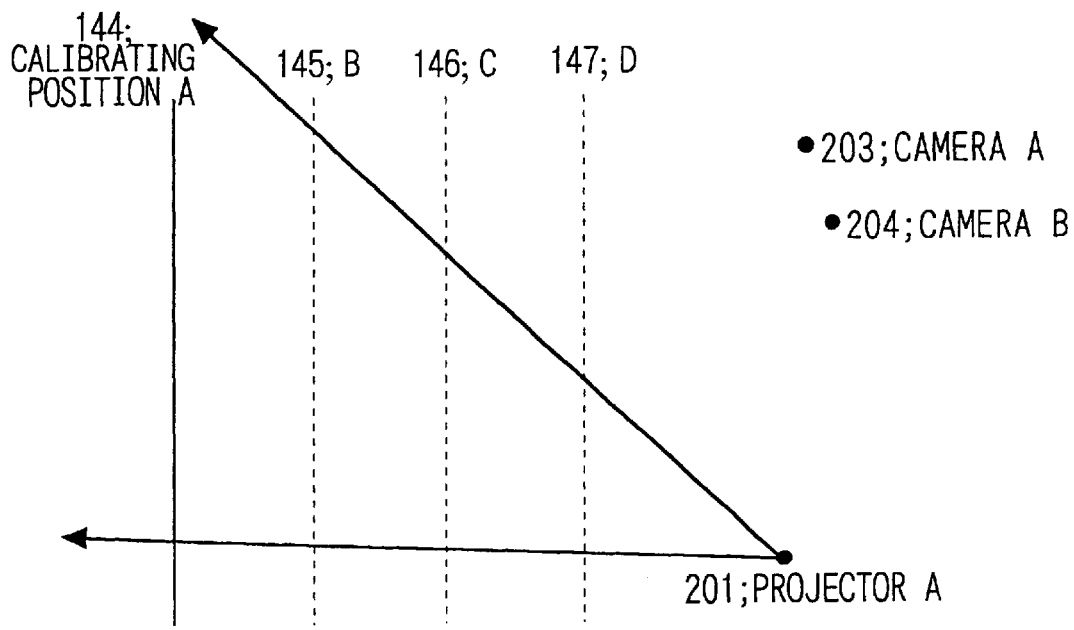
FIGS. 15(a) and 15(b) an embodiment of the present invention and specifically a technique of having reference to a measured phase value for correcting the deviation from a theoretical value of the light pattern.
Figure 15:
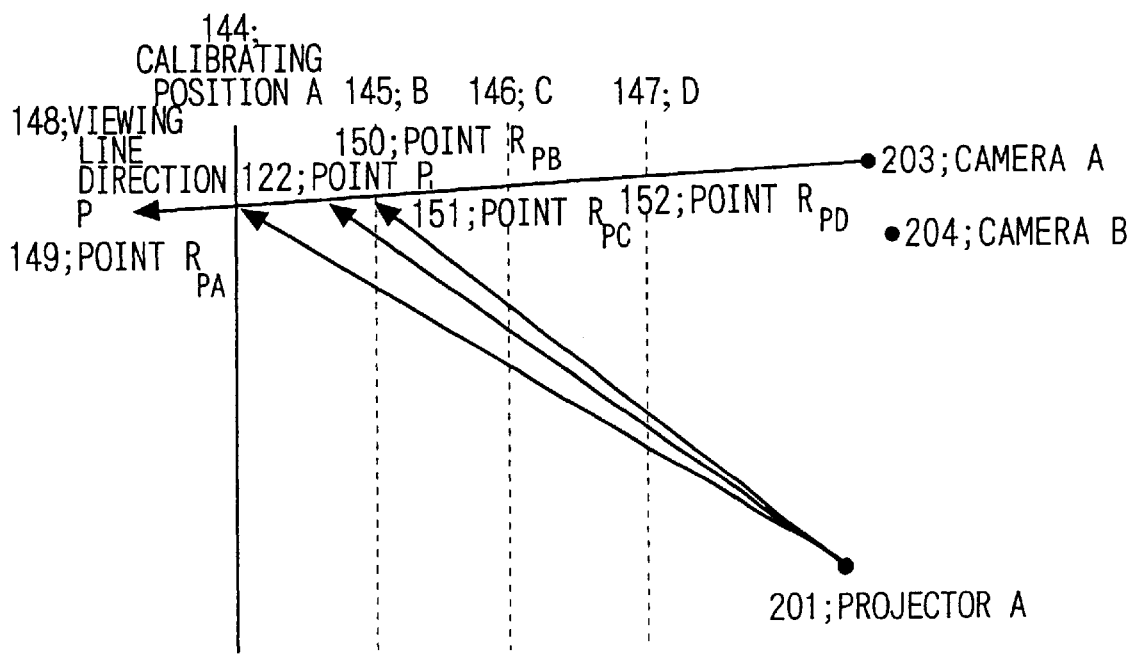

If, in the absolute phase conversion unit 221, the projected light pattern is deviated from the sinusoidal wave, or if high precision measurement in which minute deviation itself poses a problem is required, the present invention can be executed by exploiting the technique explained with reference to FIGS. 15(*a*) and 15(*b*) to 17, in such a manner as to correct the deviation from the equation (9) stating the relationship between the ideal phase and the grating Period.

Figure 9:
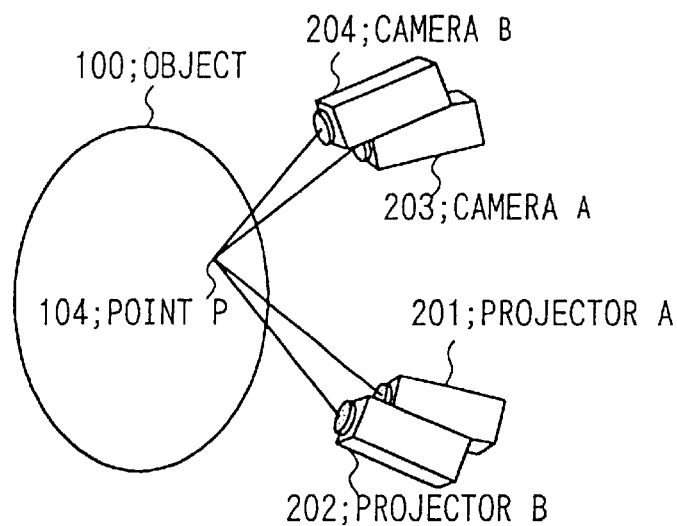
FIG. 9 illustrates a manner of measurement in the third embodiment of the present invention.

FIG. 8 shows, in a block diagram, a third embodiment of a three-dimensional shape measurement apparatus according to the present invention. FIG. 9 illustrates a state of light projection and a state of an object and cameras in the present third embodiment.

A light projector A201 and a light projector B202, projecting light patterns having spatially sinusoidal luminance distribution, are fed with light projector A control signal 1 and with the light projector B control signal 2, respectively, to shift phase values of sinusoidal light patterns by $2\pi/4$ each time in meeting with the control signals. The cameras A203 and B204 are fed with a camera A control signal 3 and with a camera B control signal 4, respectively, to retrieve images in meeting with these control signals to output the camera A output signal 5 and the camera B output signal 6.

The light projector/camera control unit 253 repeats the processing of outputting the light projector A control signal 1, light projector B control signal 2, camera A control signal 3 and the camera B control signal 4, shifting a phase value of the sinusoidal light pattern projected from the light projector A201 by $2\pi/4$ and shooting an image by the cameras A203 and B204, four times in total, whilst performing processes of shifting a phase value of a sinusoidal light pattern projected from the light projector B202 by $2\pi/4$ and shooting the image by the cameras A203 and B204, four times in total.

Simultaneously, the light projector/camera control unit 253 outputs a camera A output control signal 7 and a camera B output control signal 8, to change over the outputting destination of the cameras A203 and B204. A light projector/camera control unit 253 also outputs a phase calculation control signal 14 to switch between the images taken, set by set, by the set of the light projector A201, B202 and the cameras A203, B204 to control the phase calculation or to output and calculate a three-dimensional coordinate calculation control signal 33 to control a three-dimensional shape to be calculated.

An image memory A-A 206 is fed with the camera A output signal 5 to sequentially record images taken with the sinusoidal light pattern of different phases projected from the light projector A201 to output the recorded images as image signals A-A 9. Similarly, an image memory A-B 207 is fed with the camera A output signal 5 to sequentially record images taken with the sinusoidal light pattern of different phases projected from the light projector B202 to output the recorded images as image signals A-B 10.

An image memory B-A 208 is fed with the camera B output signal 6 to sequentially record images taken with the sinusoidal light pattern of different phases projected from the light projector A201 to output the recorded images as image signals B-A 11. Similarly, an image memory B-B 207 is fed with the camera B output signal 6 to sequentially record images taken with the sinusoidal light pattern of different phases projected from the light projector B202 to output the recorded images as image signals B-B 12.

A phase calculation unit 210 is fed with one of image signals A-A 9, A-B 10, B-A 11 and B-B 12, switched by a phase calculation control signal 14, to calculate phase values in accordance with the above equation (6), from pixel to pixel, from set of images taken with the sinusoidal light patterns of different phases, to output calculated phase values as a phase signal 13.

A phase storage memory A-A 211 is fed with the phase signal 13, controlled by the phase calculation control signal 14, to record a phase value calculated from the image signal A-A 9, to output a calculated phase value as a phase signal A-A 15.

A phase storage memory A-B 212 is fed with the phase signal 13, controlled by the phase calculation control signal 14, to record a phase value calculated from the image signal A-B 10, to output a calculated phase value as a phase signal A-B 16.

A phase storage memory B-A 213 is fed with the phase signal 13, controlled by the phase calculation control signal 14, to record a phase value calculated from the image signal B-A 11, to output a calculated phase values as a phase signal B-A 17.

The phase storage memory B-B 214 is fed with the phase signal 13, controlled by the phase calculation control signal 14, to record a phase value calculated from the image signal B-B 12, to output a calculated phase value as a phase signal B-B 18.

An absolute phase determination unit A-A/B-A 215 is. fed with a phase signal A-A 15 and a phase signal B-A 17 to determine absolute phase values for pixel positions, the absolute phase of which can be determined, to output resulting signals as an absolute phase signal A-A(A-A/B-A) 20 and as an absolute phase signal B-A(A-A/B-A) 21.

An absolute phase determination unit A-B/B-B 219 is fed with a phase signal B-B 18 and a phase signal A-B 16 to determine absolute phase values for pixel positions, an absolute phase of which can be determined, to output resulting signals as an absolute phase signal A-B(A-B/B-B) 28 and as an absolute phase signal B-B(A-B/B-B) 29.

Since the above two absolute phase determination units use a set of a sole light projector and two cameras, in determining the absolute phase, processing can be done in the same way as in the case of the absolute phase determination unit of the first embodiment described above.

An absolute phase determination unit (determiner) 216 is fed with the phase signal A-A 15 and the phase signal A-B 16 as inputs to determine absolute phase values on pixel positions, an absolute phase of which can be determined, to output resulting signals as an absolute phase signal A-A(A-A/A-B) 22 and as an absolute phase signal A-B(A-A/A-B) 23.

An absolute phase determining unit 220 is fed with the phase signal B-A 17 and the phase signal B-B 18 as inputs to determine absolute phase values on pixel positions, an absolute phase of which can be determined, to output resulting signals as an absolute phase signal B-A(B-A/B-B) 30 and as an absolute phase signal B-B(B-A/B-B) 31.

Since the above two absolute phase determination units use a set of two light projectors and a sole camera, in determining the absolute phase, processing can be done in the same way as in the case of the absolute phase determination unit of the second embodiment described above.

An absolute phase determination unit A-A/B-B 217 is fed with the phase signal A-A 15 and the phase signal B-B 18 as inputs to determine absolute phase values on pixel positions, an absolute phase of which can be determined, to output resulting signals as an absolute phase signal A-A(A-A/B-B) 24 and as an absolute phase signal B-B(A-A/B-B) 25.

An absolute phase determination unit A-B/B-A 218 is fed with the phase signal A-B 16 and with the phase signal B-A 17 as inputs to determine absolute phase values on pixel positions, an absolute phase of which can be determined, to output resulting signals as an absolute phase signal A-B(A-B/B-A) 26 and an absolute phase signal B-A(A-B/B-A) 27.

Figure 10A:
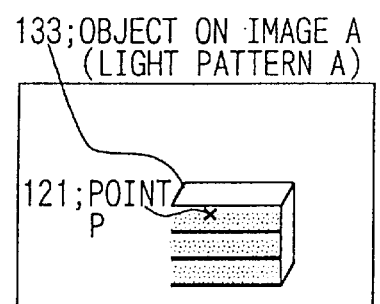
FIGS. 10(a)–10(c) illustrate an absolute phase determining method in the third embodiment of the present invention.
Figure 10B:
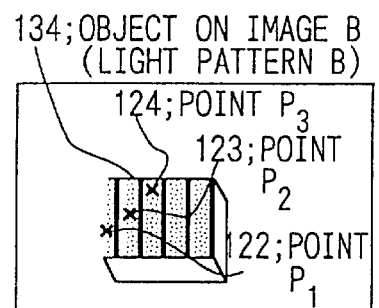
Figure 10C:
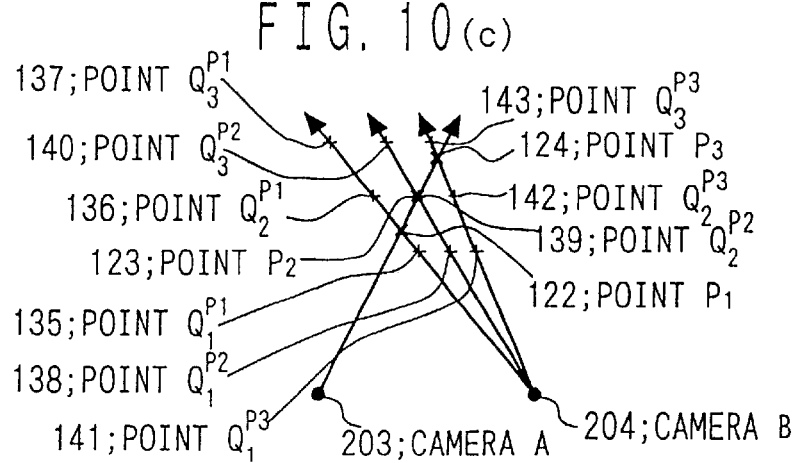
Figure 11:
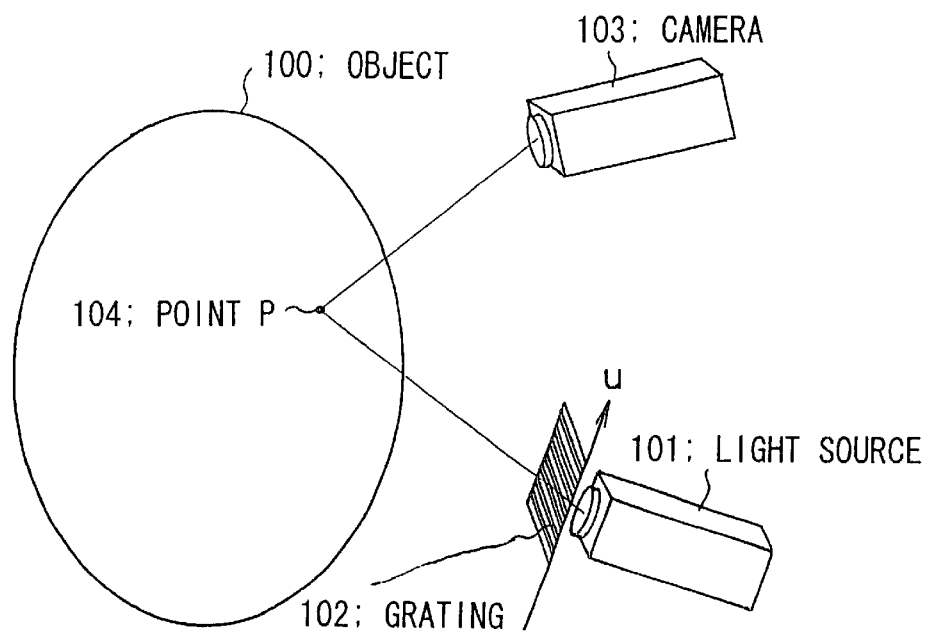
FIG. 11 illustrates a manner of measurement in the first embodiment of the present invention.
Figure 12:
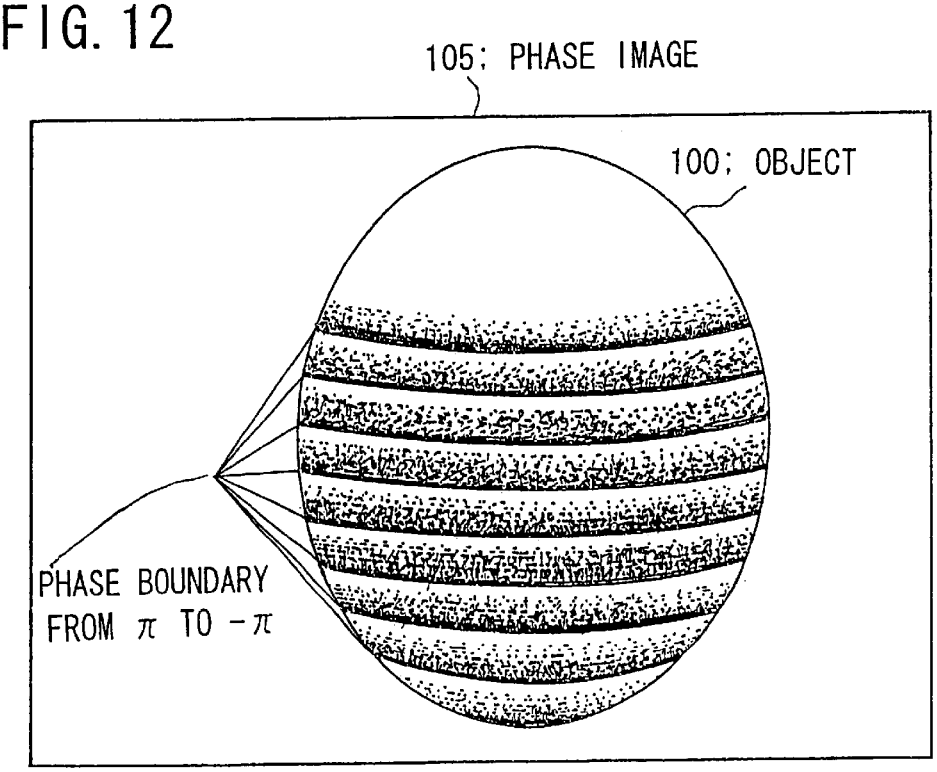
FIG. 12 shows an example of a measured phase image.

FIGS. 10(a)–10(c) illustrate a method for determining an absolute phase, in which an object 133 on an image A (light pattern A) and an object B (light pattern B) have been captured on the image A (light pattern A) 131 taken by the camera A203 with projecting the light pattern by the light projector A201 and on the image B (light pattern B) 133 taken by the camera B204 with projecting the light pattern by the light projector B202, respectively.

A point on the object 134 on the image A (light pattern A), that is a point P119 on a three-dimensional coordinate position, is found discretely as points $P_1$122, $P_2$123 and $P_3$124, as shown in FIG. 10(c), as a spatial position which is of the same phase value when the phase of the light pattern projected from the light projector A201 is wrapped to a phase range of from $-\pi$ to $\pi$.

Respective points $P_i$ (i=1, 2, 3) corresponding to points Pi as seen from the camera B204 are points $Q^{pj}_k$ (j, k=1, 2, 3) 135 to 143 from the phase of a light pattern illuminated from the light projector B202. If a sole point coincides as to a three-dimensional coordinate position between the points $P_i$ and $Q^{pj}_k$, the point P can be determined uniquely. This enables three-dimensional coordinate positions of the point P to be determined so that an absolute phase of light pattern projected may be determined. A coincidence of three-dimensional coordinate positions can be verified by a following equation (13):

$$|P_i - Q_k^{P_j}| \le \varepsilon \quad (13)$$

where $\varepsilon$ is a pre-set threshold value, becoming true.

By repeating the above-described absolute phase determining processing for the entire points on the image A (light pattern A) 131, absolute phases. of plural pixels can be determined in each of the image A (light pattern A) 131 and an image B (light pattern B) 132.

An absolute phase determination unit A-A/B-B 217 outputs an absolute phase determining pixel on the image A (light Pattern A) 131 and its absolute phase on the image A (light pattern A) 131 as an absolute phase signal A-A(A-A/B-B) 24 and those on the image B (light Pattern B) 132 as an absolute phase signal B-B(A-A/B-B) 25.

Similarly, an absolute phase determination unit A-B/B-A 218 outputs an absolute phase determining pixel and its absolute phase on the image A (light pattern B) as an absolute phase signal A-B(A-B/B-A) 26 and those on the image B (light pattern A) as an absolute phase signal B-A(A-B/B-A) 27. This enables absolute phase determination, that is measurement of an absolute three-dimensional shape measurement, which have hitherto been thought to be impossible if automatic processing is to be used.

An absolute phase conversion unit 221 is fed with a phase signal and an absolute phase signal, as switched by a three-dimensional coordinate calculation control signal 33, and converts a phase value of a pixel position in the phase signal, an absolute phase of which has not been obtained, in reference to the absolute phase signal, into an absolute phase in the same way as in the first embodiment described above.

The inputs to the absolute phase conversion unit 221 are as follows:

(a) a set of a phase signal A-A 15, and absolute phase signals A-A(A-A/B-A) 20, A-A(A-A/A-B) 22 and A-A (A-A/B-B) 24, (b) a set of a phase signal A-B 16, and absolute phase signals A-B(A-A/A-B) 23, A-B(A-B/B-A) 26 and A-B (A-B/B-B) 28, (c) a set of a phase signal B-A 17, and absolute phase signals B-A(A-A/B-A) 21, B-A(A-A/B-A) 27 and B-A (B-A/B-B) 30, and (d) a set of a phase signal B-B 18, and absolute phase signals B-B(A-A/B-B) 25, B-B(A-B/B-B) 29 and B-B (B-A/B-B) 31.

A pixel an absolute phase of which has been obtained is verified by the logical product (AND-operation) of entire absolute phase signals and outputs as an absolute phase conversion signal 32. This enables an automatic phase connection processing, hitherto thought to be difficult, to be executed in a stable manner.

A three-dimensional coordinate conversion unit (3D COORD. CONVERTER) 222 is fed with an absolute phase conversion signal 32 and a three-dimensional coordinate calculation control signal 33, as inputs. If an absolute phase is one found from the phase signal A-A 15, the three-dimensional coordinate conversion unit 222 converts the absolute phase into three-dimensional coordinate values by relative positions of the light projector A201 and the camera A203 or parameters consistent with (according to) internal structures of the light projector A201 and the camera A203 to output a resulting signal as a three-dimensional coordinate signal 34. Similarly, if an absolute phase is one found from the phase signal A-B 16, the three-dimensional coordinate conversion unit 222 converts the absolute phase into three-dimensional coordinate values by relative positions of the light projector B202 and the camera A203 or parameters consistent with internal structures of the projector B202 and the camera A203 to output a resulting signal as an three-dimensional coordinate signal 34. If an absolute phase is one found from the phase signal B-A 17, the three-dimensional coordinate conversion unit 222 converts the absolute phase into three-dimensional coordinate values by relative positions of the light projector A201 and the camera B204 or parameters consistent with the internal structure thereof to output the resulting signal as the three-dimensional coordinate signal 34.

If an absolute phase is one found from the phase signal B-B 18, a three-dimensional coordinate conversion unit 222 converts the absolute phase into the three-dimensional coordinate values, using the relative position of the light projector B202 and the camera B204 and parameters consistent with internal structures of the light projector B202 and the camera B204, to output a resulting signal as a three-dimensional coordinate signal 34.

A three-dimensional coordinate storage memory 223 stores a three-dimensional shape information (data) by the set of the light projector A201 and the camera 203, as obtained by the three-dimensional coordinate conversion unit 222, to incidentally output the information as an three-dimensional coordinate signal A-A 35.

Similarly, a three-dimensional coordinate storage memory 224 stores a three-dimensional shape information by the set of the light projector B202 and the camera A203, to incidentally output the information as a three-dimensional coordinate signal A-B 36.

Similarly, a three-dimensional coordinate storage memory B-A 225 stores a three-dimensional shape information by the set of the light projector A201 and the camera B204, to incidentally output the information as an three-dimensional coordinate signal B-A 37.

Similarly, a three-dimensional coordinate storage memory B-B 226 stores a three-dimensional shape information by the set of the light projector B202 and the camera B204 to incidentally output the information as a three-dimensional coordinate signal B-B 38.

A three-dimensional coordinate synthesis unit (3D COORD. SYNTHESIZER) 227 is fed with the three-dimensional coordinate signals A-A 35, A-B 36, B-A 37 and B-B 38 to synthesize two shape information to output a resulting synthesized three-dimensional coordinate signal 39. This gives results of measurement of a three-dimensional shape with a reduced dead angle.

In the present embodiment, the configuration of the light projectors A201, B202 or the cameras A203, B204 may be modified as in the first embodiment described above. In the foregoing description, the quantity (interval) of phase shifting is $2\pi/4$, the number of times of imaging (shooting) is four and the phase calculation method is the above equation (6). However, according to the present invention it is only sufficient if a phase value can be calculated, as in the first and second embodiments described above. Also, according to the present invention, an amplitude A(x) of the sinusoidal wave can be calculated in the phase calculation unit 210 to output only the phase value with a higher amplitude than a pre-set threshold value, that is a phase value of higher reliability.

The absolute phase determination unit A-A/B-A 215, A-B/B-B 219 may be modified in structure as in the absolute phase determination unit in the above-described first embodiment. Similarly, the absolute phase determination unit A-A/A-B 216, B-A/B-B 220 may be modified in structure as in the second embodiment described above.

The absolute phase determination unit A-A/B-B 217 verifies whether or not the point of coincidence of the three-dimensional coordinate value between point $P_i$ (i=1, 2, 3) 122 to 124 in the point P on the image A (light pattern A) 131 and the point $Q^{pj}_k$ 135 to 143 on the image B (light pattern B) 132 geometrically corresponding to the point $P_i$ can be determined uniquely. However, the role of the image A (light pattern A) 131 and the image B (light pattern B) 132 may also be reversed. Moreover, by combining the two, an absolute phase decision may be carried out more reliably. The coincidence verification process may also be executed by comparing three-dimensional coordinate values rather than the equation (13). The same may be the of the absolute phase determination unit A-B/B-A 218.

The absolute phase conversion unit 221 may be modified in structure as in the first and second embodiments described above. Although the set of a phase signal A-A 15, and absolute phase signals A-A(A-A/B-A) 20, A-A(A-A/A-B) 22 and A-A(A-A/B-B) 24, the set of a phase signal A-B 16, and absolute phase signals A-B(A-A/A-B) 23, A-B(A-B/B-A) 26 and A-B(A-B/B-B) 28, and the set of a phase signal B-B 17, and absolute phase signals B-A(A-A/B-A) 21, B-A(A-B/B-A) 27 and B-B(B-A/B-B) 30, and the set of a phase signal B-B 18, and absolute phase signals B-B(A-A/B-B) 25, B-B(A-B/B-B) 29 and B-B(B-A/B-B) 31 are processed as inputs, it is sufficient if only required set or sets are processed.

Although three absolute phase signals are grouped together as a set and processed with a logical product (AND-operation), these may also be processed with a logical sum. Alternatively, a necessary number of the absolute phase signals may also be used, instead of three.

Although two cameras and two light projectors are used in the third embodiment, three or more each of the light projectors and cameras may also be used. The numbers of the light projectors and the cameras may also differ from each other.

If, in the third embodiment, the light pattern projected is deviated from the sinusoidal wave, or if high precision measurement in which minute deviation itself poses a problem is required, the present invention can be executed by exploiting the technique explained with reference to FIGS. 15(a) and 15(b) to 17, in such a manner as to correct the deviation from the equation (9) by way of which the relationship between the ideal phase and the grating (lattice) period has been illustrated.

The meritorious effects of the present inventions are summaraized as follows.

According to the present invention, as described above, following three problems in a three-dimensional shape measurement apparatus by a phase shifting method:

(1) dead angle;

(2) determination of the absolute phase value; and (3) reliable phase connection processing;

which were not solved in the conventional method, are solved and executed automatically, thus realizing a practical three-dimensional shape measurement apparatus.

Moreover, according to the present invention, (4) it is possible to compensate the deviation from the light pattern from the ideal sinusoidal wave or triangular wave to release the requirements for machining precision of the measurement apparatus to realize an inexpensive structure or high precision measurement performance.

In this disclosure, there are shown and described only the preferred embodiments of the invention, but as aforementioned, it is to be understood that the invention is capable of use in various other combinations and environments and is capable of changes and modifications within the scope of the invention concept as expressed herein.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A method for measuring a three-dimensional shape comprising the steps of:

(a) projecting a light pattern having spatially striped luminance distribution on an object being measured, from light projection means, while phase-shifting the light pattern;

(b) scanning said object illuminated with said light pattern while phase-shifting the light pattern from at least two different directions by cameras to output first and second image data;

(c) deriving first and second initial phase images from a series of said first and second image data, respectively;

(d) finding a set of corresponding three-dimensional coordinate positions from an initial phase of a target pixel, in said first initial phase image, based on a position of said light pattern projection and a first scanning position of said first image;

(e) finding a set of pixel positions corresponding to said set of three-dimensional coordinate positions in said second initial phase image based on a position of the light pattern projection and a second scanning position of said second image, having reference to initial phases of the respective pixel positions, comparing the initial phases to an initial phase of the target pixel in said first initial phase image, and verifying whether or not a corresponding pixel position having a same initial phase can be uniquely determined;

(f) finding a three-dimensional coordinate position based on the uniquely determined pixel position to determine an absolute value of an initial phase of a corresponding pixel in said first and second initial phase images;

(g) repeating the steps (d) to (f) for entire pixels of said first initial phase image;

(h) converting said first and second initial phase images into first and second absolute phase images in reference to the absolute value of an initial phase of said light pattern; and (i) finding a three-dimensional coordinate position of said object being measured in each pixel, based on the absolute phase in each pixel of said first and second absolute phase images, the projection position of said light pattern and the scanning positions of said first and second images.

2. The method for measuring a three-dimensional shape as defined in claim 1
wherein
said step (f) of finding the three-dimensional coordinate position from the initial phase image comprises sub-steps of
(1) finding, based on the projecting position of said light pattern and on said first scanning position, a set of candidates of first three-dimensional coordinate positions, from the initial phase of the target pixel in aid first initial phase picture;
(2) finding a set of pixel positions corresponding to a set of said first three-dimensional coordinate positions, in said second initial phase image, based on said second scanning position, comparing, in reference to an initial phase of each of the pixel positions, the resulting initial phase to the initial phase of the target pixel in said initial phase picture, to verify whether or not a position of a corresponding pixel having a same initial phase can be uniquely determined;
(3) finding a set of candidates of corresponding second three-dimensional coordinate positions from an initial phase of a uniquely determined pixel in said second initial phase image based on the projecting position of said light pattern and the second scanning position;
(4) finding a set of pixel positions corresponding to said set of second three-dimensional coordinate positions in said initial phase image based on said first scanning position, and comparing, in reference to the initial phase of the respective pixel positions in said second initial phase image, the initial phase to the initial phase of the uniquely determined pixel in said second initial phase image, to verify whether or not a position of the corresponding pixel having a same initial phase can be uniquely determined;
(5) finding a three-dimensional coordinate position from the pixel position uniquely determined in said steps (2), and (4) to determine an absolute value of the initial phase of a corresponding pixel in said first and second initial phase images, respectively; and
(6) repeating the steps (1) to (5) for the entire pixels of said first initial phase image.

3. The method for measuring a three-dimensional shape as defined in claim 1
wherein
said object being measured is scanned by cameras from three or more different directions.

4. A method for measuring a three-dimensional shape comprising the steps of:

(a) projecting first and second light patterns, having spatially striped luminance distribution, by light projection means, from two different directions, while phase-shifting the light pattern;

(b) illuminating said first light pattern, while phase shifting the first light pattern, for scanning an object being measured by a first camera, illuminating the second light pattern, while phase shifting the second light pattern for scanning said object being measured by a second camera;

(c) deriving first and second initial phase images from the first and second images captured by first and second cameras with said first and second light patterns being projected;

(d) finding a s e t of corresponding three-dimensional coordinate positions from the initial phase of the target pixel in said first initial phase image, based on the to projection position of said first light pattern and the scanning position;

(e) having reference to a set of possible phase values, from a projection position of said second light patten and a corresponding set of three-dimensional coordinate position candidates, and comparing an initial phase of said target pixel in said second initial phase image to verify whether or not a same initial phase can be determined uniquely;

(f) determining absolute values of the initial phases of said first and second patterns from the uniquely determined three-dimensional coordinate positions;

(g) repeating the steps of from (d) to (f) for the entire pixels of said initial phase image;

(h) converting the first and second initial phase images into images of first and second absolute phases in reference to the absolute values of the initial phases of said light patterns, respectively; and (i) finding a three-dimensional coordinate position in each pixel of said object being measured, based on the absolute phase in each pixel of said first and second absolute phase images, projection positions of said two light patterns and the image photographing positions.

5. The method for measuring a three-dimensional shape as defined in claim 4 wherein said step (f) determining the absolute position of the initial phase from an initial phase image comprises sub-steps of:

(1) finding a set of corresponding three-dimensional coordinate position candidates from the initial phase of the target pixel of said first initial phase image, based on the projection position of said first light pattern and the scanning position;

(2) having reference to a set of possible phase values, from an illumination position of said second light pattern and the first set of three-dimensional coordinate position candidates, and comparing the phase values with the initial value of said target pixel in said second initial phase image to verify whether or not the coincident initial phase can be determined uniquely;

(3) finding a second set of corresponding three-dimensional coordinate position candidates from the initial phases of the target pixel in said second initial phase image based on the projection position of said second initial light pattern and the scanning position;

(4) having reference to a set of possible phase values, from an illumination position of said first light pattern and the second set of three-dimensional coordinate position candidates, and comparing the phase values with the initial value of said target pixel in said first initial phase image to verify whether or not the coincident initial phase can be determined uniquely;

(5) determining absolute values of the initial phases of the two light patterns from the three-dimensional coordinate positions uniquely determined from said steps (2) and (4); and (6) repeating-the steps (1) to (5) for the entire pixels of said first initial phase image.

6. The method for measuring the three-dimensional shape as defined in claim 4 further comprising the steps of:

projecting a light pattern, having spatially striped luminance distribution, by light projection means, on said object being measured, from three or more different directions, while phase-shifting the light pattern.

7. A method for measuring a three-dimensional shape comprising the steps of:

(a) projecting first and second light patterns, having spatially striped luminance distribution, by light projection means, from two different directions, on an object being measured, while phase-shifting the light patterns;

(b) illuminating said first light pattern, while phase shifting the first light pattern to scan an image of said object by first and second cameras, followed by illuminating the second light pattern, while phase shifting the second light pattern, to scan the object by said first and second cameras from two different directions in a similar manner;

(c) deriving first and second initial phase images, respectively, from series of the first and second image data captured by said first and second cameras with said first light pattern from two directions;

(d) deriving third and fourth initial phase images from third and fourth images, respectively, captured by said first and second cameras with said second light pattern, from respective two directions;

(e) finding a first set of corresponding first three-dimensional coordinate position candidates, from the initial phase of the target pixel in said first initial phase image obtained from said first scanning position by said first light pattern, based on the projecting position of said first light pattern and said first scanning position;

(f) finding a set of corresponding pixel positions of the first set of the three-dimensional coordinate position candidates in a fourth initial phase image obtained from the second scanning position by said second light pattern, based on said second scanning position, to find a second set of three-dimensional coordinate position candidates from the initial phases of said set of corresponding pixels;

(g) comparing said sets of the first and second three-dimensional coordinate position candidates to verify whether or not overlapping coordinate points can be determined uniquely;

(h) determining absolute values of the initial phases of said first and second light patterns from the uniquely determined three-dimensional coordinate positions;

(i) repeating the steps of from (e) to (h) for the entire pixels of said first initial phase image;

(j) converting said first to fourth initial phase images to said first to fourth absolute phase images, in reference to the absolute values of the initial phases of said light patterns, respectively; and (k) finding a three-dimensional coordinate position of the object being measured in each pixel based on the absolute phase in each pixel of said first to fourth absolute phase images, projecting positions of said first and second light patterns and on the first and second scanning positions.

8. The method for measuring a three-dimensional shape as defined in claim 7, wherein said step (h) of determining the absolute value of the initial phase from the initial phase image comprises sub-steps of:

(1) finding a first set of corresponding three-dimensional coordinate position candidates from the initial phase of the target pixel in the first initial phase image obtained from the first scanning position by said first light pattern, based on the projection position of said first light pattern and said first scanning position;

(2) finding a set of corresponding pixel positions of said set of three-dimensional coordinate position candidates in a fourth initial phase image obtained from said second scanning position by said second light pattern, based on said second scanning position, to find a set of second three-dimensional coordinate position candidates from the initial phase of said set of corresponding pixels;

(3) comparing said first and second sets of three-dimensional coordinate position candidates to verify whether or not an overlapping coordinate point can be determined uniquely;

(4) finding a third set of corresponding coordinate position candidates from the initial phase of pixel corresponding to the uniquely determined three-dimensional coordinate position, based on the second scanning position;

(5) finding a set of corresponding pixel positions of said set of the third three-dimensional coordinate position candidates in said first initial phase image obtained from said second scanning positions, by said second light pattern, based on said first scanning posit i on, to find a fourth set of the coordinate position candidates from the initial phase of said set of corresponding pixels;

(6) comparing the sets of said third and fourth three-dimensional coordinate position candidates to verify whether or not an overlapping coordinate point can be determined uniquely;

(7) determining absolute values of the initial phases of said first and second light patterns from the uniquely determined three-dimensional coordinate position; and (8) repeating the steps (1) to (7) for the entire pixels of said initial phase image.

9. The method for measuring a three-dimensional shape as defined in claim 7 wherein
said step (h) of determining an absolute value of the initial phase from an initial phase image comprises sub-steps of:
(1) a step of finding a set of corresponding three-dimensional coordinate position candidates from the initial phase of the target pixel in said first initial phase image, based on the projection position of said first light pattern and on said first scanning position;
(2) finding a set of pixel positions corresponding to said set of three-dimensional coordinate positions, in said second initial phase image obtained from said second scanning position by said first light pattern, based on sa id second scanning position, and comparing, in reference to respective initial phases, the initial phases to the initial phase of the target pixel in said first initial phase image to verify whether or not the corresponding pixel position having the same initial phase can be uniquely determined;
(3) finding a three-dimensional coordinate position from the uniquely determined pixel position to determine the absolute value of the initial phase of the corresponding pixel in said initial phase image; and
(4) repeating the steps (1) to (3) for the entire pixels of said initial phase image.

10. The method for measuring a three-dimensional shape as defined in claim 7,
wherein
said step (h) of determining an absolute value of the initial phase from an initial phase image comprises sub-steps of:
(1) finding a first set of corresponding three-dimensional coordinate position candidates from the initial phase of a target pixel in said first initial phase image, based on the project ion position of said first light pattern and on said first scanning position;
(2) finding a set of pixel positions corresponding to said first set of three-dimensional coordinate positions, in said second initial phase image obtained from said second scanning position by said first light pattern, based on said second scanning position, and comparing, in reference to respective initial phases, the initial phases to the initial phase of the target pixel in said first initial phase image to verify whether or not the corresponding pixel position having the same initial phase can be determined uniquely;
(3) finding a second set of corresponding three-dimensional coordinate position candidates from the initial phase of the uniquely determined pixel in said second initial phase image, based on the projection position of said first light pattern and sa id second scanning position;
(4) finding a set of pixel positions corresponding to said second set of three-dimensional coordinate positions, in said first initial phase image obtained from said first scanning position by said first light pattern, based on said first scanning position, and comparing, in reference to respective initial phases, the initial phases to the initial phase of the uniquely determined pixel in said second initial phase image to verify whether or not the corresponding pixel position having the same initial phase can be uniquely determined;
(5) finding a three-dimensional coordinate position from the pixel position uniquely determined by said two steps (2) and (4) to determine the absolute value of the initial phase of the corresponding pixel in said initial phase image; and
(6) repeating the steps (1) to (5) for the entire pixels of said initial phase image.

11. The method for measuring a three-dimensional shape as defined in claim 7
wherein
said step (h) of determining an absolute value of the initial phase from an initial phase image comprises sub-steps of:
(1) finding a set of corresponding three-dimensional coordinate position candidates from the initial phase of a target pixel in said first initial phase image, based on the projection position of said first light pattern and on said first scanning position;
(2) having reference to a set of possible phase values, from the project ion position of said second light pat tern and said set of three-dimensional coordinate positions, and comparing the phase values to the initial phase of the target pixel in a third initial phase image obtained from said first scanning position by said second light pattern to verify whether or not a coincident initial phase can be uniquely determined;
(3) determining an absolute value of the initial phase of the corresponding pixel in said initial phase image from the uniquely determined three-dimensional coordinate positions; and
(4) repeating the steps from (1) to (3) for the entire pixels of said first initial phase image to determine the absolute value of the initial phase.

12. The method for measuring a three-dimensional shape as defined in claim 7
wherein
said step (h) of determining an absolute value of the initial phase from an initial phase image comprises sub-steps of:
(1) a step of finding a first set of corresponding three-dimensional coordinate position candidates from the initial phase of a target pixel in said first initial phase image, based on the projection position of said first light pattern and on said first scanning position;
(2) having reference to a set of possible phase values, from the projection position of said second light pattern and said first set of three-dimensional coordinate position candidates, and comparing the phase values to the initial phase of the target pixel in a third initial phase image obtained from said first scanning position with said second light pattern to verify whether or not a coincident initial phase can be determined uniquely;
(3) finding a second set of corresponding three-dimensional coordinate position candidates, from the initial phase of the target pixel in said third initial phase image, based on the projection position of said second light pattern and on said first scanning position;
(4) having reference to a set of possible phase values, from the projection position of said first light pattern and said second set of three-dimensional coordinate position candidates, and comparing the phase values to the initial phase of said target pixel in said first initial phase image obtained from said first scanning position with said first light pattern to verify whether or not a coincident initial phase can be determined uniquely;

(5) determining an absolute value of the initial phase of the corresponding pixel in said initial phase image from the three-dimensional coordinate positions uniquely determined by said steps (2) and (4); and (6) repeating the above steps (1) to (5) for the entire pixels of the first initial phase image.

13. The method for measuring a three-dimensional shape as defined in claim 7
wherein
said step (h) of determining an absolute value of the initial phase from an initial phase image is a combination of a plurality of steps of determining the absolute value of the initial phase.

14. The method for measuring a three-dimensional shape as defined in claim 7 further comprising the step of projecting a light pattern having spatially striped luminance distribution from at least three different directions, respectively, on said object under measurement while phase shifting said light pattern.

15. The method for measuring a three-dimensional shape as defined in claim 7 further comprising the step of imaging an object under measurement from three or more different directions.

16. The method for measuring a three-dimensional shape as defined in claim 1
wherein
the projected light pattern is sinusoidal.

17. A three-dimensional measurement apparatus comprising:

(a) a light projection unit for projecting a light pattern having a spatially striped luminance distribution on an object being measured, receiving a light projection control signal, while phase shifting the light pattern responsive to said light projection control signal;

(b) first and second cameras each receiving a camera control signal as an input and formulated for scanning an image of said object under measurement responsive to said camera control signal to output image signals as a first and second camera output signal, respectively;

(c) first and second image storage memories for storing the image data captured by said first and second cameras, responsive to said first and second camera control signals, to output image data as a first and second image signal, respectively;

(d) a phase calculation unit receiving one of said first and second image signals selected by a switch by a phase calculation control signal, and calculating an initial phase value from pixel to pixel from a series of images of the received image signals to output calculated phase values as a first and second phase signal, respectively;

(e) first and second phase storage memories receiving said first and second phase signals for recording the phase values of said first and second phase signals, respectively, to output the phase values as first and second phase signals;

(f) an absolute phase determination unit receiving said first and second phase signals, finding a set of corresponding three-dimensional coordinate position candidates from an initial phase of a target pixel in said first phase signal, based on positions of said light projection unit and said first camera, finding a set of pixel positions corresponding to said set of three-dimensional coordinate position candidates in said second phase signal, based on said second camera position, and comparing in reference to the respective initial phases, the initial phases with the initial phase of the target pixel in said first initial phase signal to verify whether or not a corresponding pixel position having the same initial phase can be uniquely determined, finding a three-dimensional coordinate position from the uniquely determined pixel position, repeating the processing for determining a absolute value of the initial phase of the target pixel in said first and second phase signals for the entire pixels of said first chase signal, and outputting a first absolute phase signal in association with the first phase signal and outputting a second absolute phase signal in association with the second phase signal;

(g) an absolute phase conversion unit receiving said first or second absolute phase signal and said first or second phase signal, as switched by a three-dimensional coordinate calculation control signal, to perform the processing of determining absolute phase of a pixel in said first or second phase signals, the absolute phase of said pixel being not determined yet, so that a phase difference from an absolute phase of an ambient pixel, the absolute phase of which has at ready been set, will become smaller, repeating said processing for the entire pixels of said first or second phase signal switched by said three-dimensional coordinate calculation signal, and for outputting the results as a first or second absolute phase conversion signal, respectively;

(h) a three-dimensional coordinate conversion unit receiving said first or second absolute phase conversion signal, as switched by said three-dimensional coordinate calculation control signal, converting the input signal into three-dimensional coordinate values based on positions of said light projection unit and said first or second camera for outputting the three-dimensional coordinate values as said first or second three-dimensional coordinate values;

(i) first and second three-dimensional coordinate storage memories receiving said first or second three-dimensional coordinate values, respectively, for recording three-dimensional coordinate values corresponding to said first and second cameras, and for outputting the three-dimensional coordinate values as first or second three-dimensional coordinate values;

(j) a three-dimensional coordinate synthesis unit receiving said second three-dimensional coordinate signals for complementing reciprocally lacking data by way of synthesizing data to output synthesized three-dimensional coordinate signals; and (k) a control unit outputting said light projection unit control signal, said first and second camera control signals, said phase calculation control signal and the three-dimensional coordinate calculation control signal; imaging a light pattern projected from the light projection unit while phase shifting the light pattern; and controlling input/output of phase calculation and input/output of three-dimensional coordinate calculation.

18. The three-dimensional shape measurement apparatus as defined in claim 17
wherein
said absolute phase determination unit comprises first means for receiving said first and second phase signals and a target pixel position signal, as input, finding a first set of corresponding three-dimensional coordinate position candidates from an initial phase of the target pixel in said first phase signal, based on positions of said light projection unit and said first camera, finding a set of pixel positions corresponding to said first set of three-dimensional coordinate position candidates in said second phase signal, based on a position of said second camera, comparing, in reference to the respective initial phases, the initial phases with the initial phase of the target pixel in said first phase signal, to verify whether or not the position of the corresponding pixel having a coincident initial phase can be determined uniquely, and for outputting the pixel position and the initial phase of said pixel on said second phase signal can be output as a uniquely determined pixel signal;

second means for receiving said first and second base signals and said uniquely determined pixel signal, finding a second set of corresponding three-dimensional coordinate position candidates from the pixel position and the initial phase of said uniquely determined pixel signal in said second phase signal, based on the position of said light projection unit and the position of said second camera, finding a set of pixel positions corresponding to the second set of three-dimensional coordinate positions in said first phase signal, comparing in reference to the respective initial phases, the initial phases to the initial phase of the uniquely determined pixel in said second phase signal to verify whether or not the position of the corresponding pixel having the same initial phase can be determined uniquely;

finding a three-dimensional coordinate position from said pixel position in case where the corresponding pixel position has been determined uniquely by said two verifying operations;

determining an absolute value of the initial phases of the target pixels in said first and second phase signals and for outputting a first absolute phase signal and a second absolute phase signal in association with the first and second phase signals, respectively; and third means for sequentially scanning the entire pixels of said first phase signal to output a position signal of the target pixel.

19. The three-dimensional shape measurement apparatus as defined in claim 17 further comprising:

cameras for imaging an object from three or more different directions.

20. A three-dimensional shape measurement apparatus comprising:

(a) first and second light projection units receiving first and second light project ion unit control signals and for projecting first and second light patterns having spatially striped luminance distribution to an object under measurement from two different directions while phase shifting the light patterns responsive to said first and second light projection unit control signals;

(b) a camera receiving a camera control signal as an input and formulated for scanning said object under measurement responsive to said camera control signal to output an image signal as a camera output signal;

(c) first and second image storage memories receiving said camera output signal selected through a switch as by said camera output control signal for recording a string of images captured by said camera with said first and second light patterns to output the images as first and second phase signals;

(d) a phase calculation unit receiving said first or second imaging signals, switched by a phase calculation control signal, as input, and calculating initial phase values from pixel to pixel from the image string to output calculated initial phase values as a phase signal;

(e) first and second phase storage memories receiving said phase signal, allotted by said phase calculation control signal, and recording phase values calculated from the first and second image signals, to output the phase values as first and second phase signals;

(f) an absolute phase determination unit receiving said first and second phase signals, finding a set of corresponding three-dimensional coordinate position candidates from the initial phase of the target pixel in said first phase signal, based on the positions of the first light projection unit and the camera, having reference to a set of possible phase values from the position of the second light projection unit and the set of the three-dimensional coordinate position candidates, to verify whether or not the coincident initial phase can be determined uniquely, determining absolute value of the initial phase of the first and second light patterns from the uniquely determined three-dimensional coordinate position, and repeating the above processing of determination of the absolute values of the initial phases of the two light patterns from the uniquely determined three-dimensional coordinate position for the entire pixels of said first phase signal, to output the first and second absolute phase signals in association with the first phase signal and with the second phase signal, respectively;

(g) an absolute phase conversion unit receiving said first or second absolute phase signal and said first or second phase signal, as switched by a three-dimensional coordinate calculation control signal, as input, for determining an undetermined absolute phase of a pixel in the first or second phase signal, such that an absolute phase difference from an ambient pixel, the absolute phase of which has already been determined, will become smaller, and repeating this processing for the entire pixels of said first or second phase signal, to output the absolute phase as a first or second absolute phase conversion signal;

(h) a three-dimensional coordinate conversion unit receiving the first or second absolute phase conversion signal, switched by the three-dimensional coordinate calculation control signal, for converting the signal into a three-dimensional coordinate value based on the first or second light projection unit and the camera position, to output the coordinate values as first or second three-dimensional coordinate signal;

(i) first and second coordinate storage memories receiving said first or second three-dimensional coordinate signal (A or B) as input, for recording three-dimensional coordinate values corresponding to the first and second light projection unit and for outputting the coordinate values as first or second three-dimensional coordinate signal;

(j) a three-dimensional coordinate synthesis unit receiving said first and second three-dimensional coordinate signals as input for complementing or interpolating reciprocally lacking data for synthesis to output a synthesized signal as a synthesized three-dimensional coordinate signal; and (k) a control unit outputting said first and second light projection unit control signals, camera control signal, camera output control signal, phase calculation control signal and the three-dimensional coordinate calculation control signal, imaging the object under measurement while switching the first and second light project ion units under phase shifting, switching the camera output, controlling the input/output phase calculation and controlling the input/output of the three-dimensional coordinate calculation.

21. The three-dimensional shape measurement apparatus as defined in claim 20
wherein
said absolute phase determining unit (g) comprises:
(1) first means for receiving said first and second phase signals and with a target pixel position signal, as input, finding a first set of corresponding three-dimensional coordinate position candidates from the initial phase of the target pixel in said first phase signal, based on the positions of said first light projection unit and said camera, having reference to a set of possible phase values from said light projection unit and said set of first three-dimensional coordinate position candidates, comparing the phase values with the initial phase of the target pixel in said second phase signal, and verifying whether or not the coincident initial phase can be determined uniquely to output the pixel position of the pixel on said second phase signal as a uniquely determined pixel signal;
(2) second means for receiving said first and second phase signals and with said uniquely determined pixel signal, as input, finding a second set of corresponding three-dimensional coordinate position candidates from the initial phase of the target pixel in said second phase signal, based on the positions of said second light projection unit and said camera, having reference to a set of possible phase values from said light projection unit and said set of second three-dimensional coordinate position candidates, comparing the phase values with the initial phase of the target pixel in said first phase signal, verifying whether or not the coincident initial phase can be determined uniquely, determining an absolute value of the initial phase of the two light patterns from the uniquely determined three-dimensional coordinate positions in case where the initial phases have been determined uniquely, and outputting a first absolute phase signal and a second absolute phase signal in association with the first and second phase signals, respectively; and
(3) third means for sequentially scanning the entire pixels of said first phase signal to output a target pixel position signal.

22. The three-dimensional shape-measurement apparatus as defined in claim 20 further comprising:
a plurality of light projection units for projecting a light pattern having spatially striped luminance distribution on an object under measurement, from three or more different directions, while phase shifting the light pattern.

23. A three-dimensional shape measurement apparatus comprising:
(a) first and second light projection units A, B receiving first and second light projection means control signals A, B for projecting first and second light patterns having spatially striped luminance distribution onto an object under measurement while phase shifting the light patterns in keeping with said first and second light projection unit control signals A, B;

(b) first and second cameras A, B receiving first and second camera control signals A, B, scanning an object under measurement from two different directions in keeping with said first and second camera control signals and for outputting images of the object as first and second camera output signals A, B;

(c) first to fourth image storage memories receiving first and second camera output signals A and B, changed over by a camera output control signal, recording string of images captured by the first and second cameras with first and second light patterns, by a combination of said first light projection unit with said first camera, a combination of said second light projection unit with said first camera, a combination of said first light projection unit with said second camera and a combination of said second light projection unit with said second camera, and outputting images as first to fourth image signals A-A, A-B, B-A and B-B;

(d) phase calculating units receiving said first to fourth image signals A-A, A-B, B-A and B-B, changed over by a phase calculation control signal, to compute initial phase values from the image string from pixel to pixel to output calculated initial phases as a phase signal;

(e) first to fourth phase storage memories receiving said phase signals changed over by the phase calculation control signal to record phase values calculated from the first to fourth image signals A-A, A-B, B-A and B-B to output calculated phase values as the first to fourth image signals A-A, A-B, B-A and B-B;

(f) an absolute phase determination unit receiving said first and fourth phase signals A-A and B-B as input; finding a first set of corresponding three-dimensional coordinate position candidates from an initial phase of a target pixel in said phase signal A-A obtained from the position of the first camera A by a light pattern of said first light projection unit A based on the position of the first light projection unit and the first camera A, finding a set of corresponding pixel positions of the first three-dimensional coordinate position candidates in said phase signal B-B obtained from a position of the second camera B by the light pattern of the second light projection unit B based on the position of said second camera B, finding a set of second three-dimensional coordinate position candidates from the initial phase of the set of the corresponding pixels, comparing said set of the first three-dimensional coordinate position candidates and the set of the second coordinate position candidates, to verify whether or not an overlapping coordinate points can be uniquely determined, determining absolute values of the initial phases of the first and second light patterns from the uniquely determined three-dimensional coordinate positions, and repeating the above steps for the entire pixels of said phase signal A-A to output an absolute phase signal A-A in association with the phase signal A-A and to output an absolute phase signal B-B in association with the phase signal B-B;

(g) an absolute phase conversion unit receiving said absolute phase signals A-A or B-B and with the phase signal A-A or B-B, changed over by a three-dimensional coordinate calculation control signal, as input, determining the absolute phase of pixels, the absolute phase of which in the phase signals is indeterminate, so that an absolute phase difference from the absolute value of ambient pixels, the absolute phase of which has already been determined, repeating the above steps for the entire pixels of the phase signal A-A or B-B and outputting the resulting absolute phases as absolute phase conversion signals A-A or B-B;

(h) a three-dimensional coordinate conversion unit receiving the absolute phase conversion signals A-A or B-B as input signal, changed over by three-dimensional coordinate calculation control signal, and converting the input signal into three-dimensional coordinate value based on the positions of the light projection unit A and the camera A or the light projection unit B and the camera B;

(i) first and second three-dimensional coordinate storage memories A-A, B-B receiving said three-dimensional coordinate signal A-A or B-B as input for recording three-dimensional coordinate values associated with said light project ion unit A and the camera A or with the light projection unit B and the camera B, to output a three-dimensional coordinate signal A-A or B-B;

(j) a three-dimensional coordinate synthesis unit receiving said first and second three-dimensional coordinate signals A-A, B-B as input for complementing/interpolating lacking data for synthesis to produce and output the resulting signal as a synthesized three-dimensional coordinate signal; and (k) a light projection unit/camera control unit for outputting said first and second light projection unit control signals, said first and second camera control signals, phase calculation control signal and the three-dimensional coordinate calculation control signal for imaging a light pattern while phase shifting the light pattern to control the inputting/outputting of the phase calculation and three-dimensional coordinate calculation.

24. A three-dimensional shape measurement apparatus comprising:

(a) first and second light projection units A, B receiving first and second light project ion unit control signals A, B for projecting a light pattern having spatially striped luminance distribution from two different directions on an object under measurement while phase shifting the light pattern responsive to said first and second light projection unit control signals;

(b) first and second cameras A, B receiving first and second camera control signals A, B as input, scanning an image of an object under measurement from two different directions responsive to said first and second camera control signals and outputting the resulting signals as first and second camera output signals A, B;

(c) first to fourth image storage memories receiving the first and second camera output signals, as switched by a camera output control signal, recording a string of images captured by first and second cameras with two light patterns, by a combination of said first light projection unit with said first camera, a combination of said second light projection unit with said first camera, a combination of said first light projection unit with said second camera and a combination of said second light projection unit with said second camera, and outputting the images as first to fourth image signals A-A, A-B, B-A and B-B;

(d) a phase calculating unit receiving said first to fourth image signals A-A, A-B, B-A and B-B, changed over by a phase calculation control signal, to compute initial phase values from the image string from pixel to pixel to output calculated initial values as a phase signal;

(e) first to fourth phase storage memories receiving said phase signals as switched over by the phase calculation control signal to record phase values calculated from the first to fourth image signals A-A, A-B, B-A and B-B to output the calculated phase values as the first to fourth phase signals A-A, A-B, B-A and B-B;

(f) an absolute phase conversion unit which comprises:

(f1) a first absolute phase determination unit receiving said phase signals A-A and B-A as input, determining the absolute phase value as to a pixel position, the absolute phase of which can be determined, to output the absolute phase values as absolute phase signals A-A(A-A/B-A) and absolute phase values B-A(A-A/B-A);

(f2) a second absolute phase determination unit receiving said phase signals A-B and B-B as input, determining the absolute phase value as to a pixel position, the absolute phase of which can be determined, to output the absolute phase values as absolute phase signals A-B(A-B/B-B) and absolute phase values B-B(A-B/B-B);

(f3) a third absolute phase determination unit receiving said phase signals A-A and A-B as input, determining the absolute phase value as to a pixel position, the absolute phase of which can be determined, to output the absolute phase values as absolute phase signals A-A(A-A/A-B) and absolute phase values A-B(A-A/A-B);

(f4) a fourth absolute phase determination unit receiving said phase signals B-A and B-B as input, determining the absolute phase value as to a pixel position, the absolute phase of which can be determined, to output the absolute phase values as absolute phase signals B-A(B-A/B-B) and absolute phase values B-B(B-A/B-B);

(f5) a fifth absolute phase determination unit receiving said phase signals A-A and B-B as input, to output an absolute phase determining pixel and its absolute phase on an image A (light pattern A) as an absolute phase signal A-A(A-A/B-B) for a pixel position, and to output the absolute phase determining pixel and the absolute phase on an image B (light pattern B) as an absolute phase signal B-B(A-A/B-B), which respect to pixels the absolute phase of which can be determined; and (f6) a sixth absolute phase determination unit receiving said phase signals A-B and B-A as input, to output an absolute phase determining pixel and its absolute phase on an image A (light pattern B) as an absolute phase signal A-B(A-B/B-A) for a pixel position and to output an absolute phase determining pixel and an absolute phase on an image B (light pattern A) as an absolute phase signal B-A(A-B/B-A), with respect to pixels the absolute phase of which can be determined;

(f7) said absolute phase conversion unit receiving phase signals and the absolute phase signal, both changed over by the three-dimensional coordinate calculation control signal as input, said absolute phase conversion unit converting a phase value of a pixel position in the phase signal, the absolute phase of which in the phase signal has not been acquired into an absolute phase, in reference to the absolute phase signal;

(f8) said absolute phase conversion unit receiving an input signal formulated by:
a set of a phase signal A-A and absolute phase signals A-A(A-A/B-A), A-A(A-A/A-B) and A-A(A-A/B-B), a set of a phase signal A-B and absolute phase signals A-B(A-A/A-B), A-B(A-B/B-A) and A-B(A-A/B-B), a set of a phase signal B-A and absolute phase signals B-A(A-A/B-A), B-A(A-B/B-A) and B-A(B-A/B-B), and/or a set of a phase signal B-B and absolute phase signals B-B(A-A/B-B), B-B(A-B/B-B) and B-B(B-A/B-B), said absolute phase conversion unit verifying a pixel, for which the absolute phase has been acquired, by a logical product of the entire absolute phase signals and outputting as an absolute phase conversion signal;

(g) a three-dimensional coordinate conversion unit receiving the absolute phase conversion signal and the three-dimensional coordinate calculation control signal as input, (i) sa id three-dimensional coordinate conversion unit converting the absolute phase, if the absolute phase is one found from the phase signal A-A, into a three-dimensional coordinate value by parameters corresponding to a relative position between the first light projection unit A and the first camera A and to an internal structure, to output the three-dimensional coordinate value as a three-dimensional coordinate signal;

(ii) said three-dimensional coordinate conversion unit converting the absolute phase, if the absolute phase is one found from the phase signal A-B, into a three-dimensional coordinate value by parameters corresponding to a relative position between the second light project ion unit and the first camera A and to the internal structure to output the three-dimensional coordinate value as a three-dimensional coordinate signal;

(iii) said three-dimensional coordinate conversion unit converting the absolute phase, if the absolute phase is one found from the phase signal B-A, into a three-dimensional coordinate value by parameters corresponding to the relative position between the second light project ion unit and the second camera B and to the internal structure, to output the three-dimensional coordinate value as a three-dimensional coordinate signal; and (iv) said three-dimensional coordinate conversion unit converting the absolute phase, if the absolute phase is one found from the phase signal B-B, into a three-dimensional coordinate value by parameters corresponding to the relative position between the second light projection unit and the second camera B and to the internal structure, to output the three-dimensional coordinate value as a three-dimensional coordinate signal;

(h) a first three-dimensional coordinate storage memory for storing three-dimensional shape information by a set of the first light projection unit A and the first camera, obtained by the three-dimensional coordinate conversion unit, for outputting a three-dimensional coordinate signal A-A;

(i) a second three-dimensional coordinate storage memory for storing three-dimensional shape information by a set of the second light project ion means A and the first camera, obtained by the three-dimensional coordinate conversion unit, for outputting a three-dimensional coordinate signal A-B;

a third three-dimensional coordinate storage memory for storing three-dimensional shape information by a set of the second light projection unit B and the first camera A, obtained by the three-dimensional coordinate conversion unit, for outputting a three-dimensional coordinate signal B-A;

(k) a fourth three-dimensional coordinate storage memory for storing three-dimensional shape information by a set of the second light projection means B and the second camera B, obtained by the three-dimensional coordinate conversion unit, for outputting a three-dimensional coordinate signal B-B;

(l) a three-dimensional coordinate synthesis unit receiving the three-dimensional coordinate signals A-A, A-B, B-A and B-B as input for synthesizing four shape information to output synthesized information as a synthesized three-dimensional coordinate signal; and (m) a control unit for outputting the first and second light projection unit control signals, first and second camera control signals phase calculation control signals and the three-dimensional coordinate calculation control signals to image, scan a light pattern while phase shifting the light pattern and for controlling the inputting/outputting of the phase calculation and of the three-dimensional coordinate calculation.

25. The three-dimensional shape measurement apparatus as defined in claim 24 wherein said first and second absolute phase determination units perform a processing which is decision of the absolute phase in a set of one light projection unit and two cameras; and wherein said third and fourth absolute phase determination units perform a processing which is decision of the absolute phase in a set of two light projection units and one camera.

26. The three-dimensional shape measurement apparatus as defined in claim 23 wherein said absolute phase determining determination unit comprises first, second and third absolute phase determination means;

(1) said first absolute phase determination means receiving said phase signals A-A and B-B and a target pixel position signal, as input, finding a first set of corresponding three-dimensional coordinate position candidates from an initial phase of a target pixel in said phase signals A-A obtained from the position of the first camera A by the light pattern of said first light projection unit A, based on the positions of said first light projection unit A and said first camera A, finding a set of corresponding pixel positions of the first set of three-dimensional coordinate position candidates in said phase signal B-B obtained from the position of said second camera B, by a light pattern of said second light projection unit B, based on the position of said second camera B, finding a second set of three-dimensional coordinate position candidates from an initial phase of the set of the corresponding pixel positions, comparing the sets of the first and second three-dimensional coordinate posit ion candidates to verify whether or not as overlapping coordinate point can be determined uniquely; and outputting the pixel position and the initial phase on said phase signal B-B as a uniquely determined pixel signal;

(2) with said second absolute phase determination means, said second absolute phase receiving said phase signals A-A and B-B and said uniquely determined pixel signals as input, finding a third set of corresponding three-dimensional coordinate position candidates from the initial phase of a pixel corresponding to the uniquely determined three dimensional coordinate position by the light pattern of said second light projection unit B based on the position of said second camera B, finding a set of corresponding pixel positions of the third set of three-dimensional coordinate position candidates on said phase signal A-A obtained from the position of the first camera A by said light pattern of the first light projecting unit A, finding a fourth set of three-dimensional coordinate position candidates from the initial phase of the set of corresponding pixels, comparing the third and fourth sets of three-dimensional coordinate position candidates to verify whether or not overlapping coordinate points can be determined uniquely; and determining, if the overlapping coordinate points have been determined uniquely by the above two verification operations, absolute value of the initial phase of two light patterns from the uniquely determined three-dimensional coordinate position;

said second absolute phase determination means outputting the absolute phase signals A-A and B-B in association with the phase signals A-A and B-B, respectively; and (3) said third absolute phase determination means sequentially scanning the entire pixels of said phase signal A-A to output a target pixel position signal.

27. The three-dimensional shape measurement apparatus as defined in claim 23 wherein said absolute phase determination unit receiving said phase signals A-A and B-A as input, finds a set of corresponding three-dimensional coordinate position candidates from the initial phase of the target pixel in said phase signal A-A, based on the posit ion of said first light projection unit A and said first camera A, finds a set of corresponding pixel posit ions corresponding to said set of three-dimensional coordinate positions in said phase signal B-A obtained from the position of said second camera B from the light pattern of the first light projection unit A, based on the position of said second camera B, refers to the respective initial phases, compares the initial phase with the initial phase of the target pixel in said phase signal A-A to verify whether or not the corresponding pixel position having the same initial phase can be determined uniquely, finds a three-dimensional coordinate position by the uniquely determined pixel position and determines an absolute value of the initial phase of the target pixel; the above steps are repeated for the entire pixels of the phase signals A-A; said absolute phase determining unit outputting the absolute phase signals B-A and B-A in association with the phase signals A-A and B-B.

28. The three-dimensional share measurement apparatus as defined in claim 23 wherein said absolute phase determination unit comprises:

(1) first means for receiving said phase signals A-A and B-A and with a target pixel position signal as input, finds a first set of corresponding three-dimensional coordinate position candidates from the initial phase of the target pixel in said phase signal A-A, based on the posit ion of said first light projection unit A and said first camera A, finds a set of corresponding pixel posit ions corresponding to said first set of three-dimensional coordinate positions in said phase signal B-A obtained from the position of said second camera B from the light pattern of the first light projection unit A based on the position of said second camera B, refers to the respective initial phases, and compares the respective initial phases of the target pixel in said phase signal A-A, to verify whether or not the corresponding pixel position having the same initial phase can be uniquely determined to output the pixel position of said pixel on said phase signal B-A and the initial phase as a uniquely determined, pixel signal;

(2) second means for receiving said phase signal A-A and B-A and with the uniquely determined pixel signal as input, finding a second set of corresponding three-dimensional coordinate position candidates from the initial phase of the target pixel in said phase signal B-A, finding a set of corresponding pixel positions corresponding to said second set of three-dimensional coordinate positions in said phase signal A-A obtained from the position of said second camera A from the light pattern of the first light projection unit A based on the position of said first camera A, referring to the respective initial phases, comparing the respective initial phases with the initial phase of the uniquely determined pixel in said phase signal B-A, to verify whether or not the corresponding pixel position having the same initial phase can be determined uniquely, finding a three-dimensional coordinate position from corresponding the pixel position if such pixel position has been determined uniquely, and for determining the absolute value of the initial phase of the target pixel in said phase signals A-A and B-A to output absolute phase signals A-A and B-A in association with the phase signals A-A and B-A; and (3) third means for sequentially scanning the entire pixels of said phase signal A-A to output a target pixel position signal.

29. The three-dimensional share measurement apparatus as defined in claim 23 wherein said absolute phase determination unit receiving said phase signals A-A and A-B to find a set of corresponding three-dimensional coordinate position candidates from the initial phase of the target pixel in the phase signal A-A, based on the position of said first light projection unit A and said first camera A, refers to a set of possible phase values from the position of said second light projection unit B and said set of three-dimensional coordinate position candidates, compares the phase values to the initial phase of the target pixel in the phase signal A-B obtained from the position of said first camera A by the light pattern of said second light projection unit B to verify whether or not the coincident initial phase can be determined uniquely, and determines an absolute value of the initial phase of the target pixel from the uniquely determined three-dimensional coordinate position; said absolute phase determining unit repeating the above steps for the entire pixels of the phase signals A-A to output an absolute phase signal A-A and A-B in association with the phase signal A-A and A-B.

30. The three-dimensional shape measurement apparatus as defined in claim 23 wherein said absolute phase determination unit comprises;

(1) first means for receiving said phase signals A-A and A-B and a target pixel position signal to find a first set of corresponding three-dimensional coordinate position candidates from the initial phase of the target pixel in the phase signal A-A, based on the positions of said first light projection means A and said first camera A, referring to a set of possible phase values from the position of said second light projection unit B and said first set of three-dimensional coordinate position candidates, and comparing the phase values to the initial phase of the target pixel in the phase signal A-B obtained from the position of said first camera A by the light pattern of said second light projection unit B to verify whether or not the coincident initial phase can be determined uniquely to output the pixel position and the initial phase of said pixel on said phase signal A-B and the initial phase as a uniquely determined pixel signal;

(2) second means for receiving said phase signals A-A and A-B and the uniquely determined pixel signal to find a second set of corresponding three-dimensional coordinate position candidates from the initial phase of the target pixel in the phase signal A-B, based on the position of said second light projection means B and said first camera A, referring to a set of possible phase values from the position of said second light projection unit A and said second set of three-dimensional coordinate position candidates, comparing the phase values to the initial phase of the target pixel in the phase signal A-A obtained from the position of said first camera A by the light pattern of said first light projection unit A to verify whether or not the coincident initial phase can be determined uniquely; determining absolute value of the initial phase of the two light patterns from the three-dimensional coordinate position uniquely determined by said two verifying operations, to output the absolute phase signals A-A and A-B in association with the phase signals A-A and A-B, respectively; and (3) third means for sequentially scanning the entire pixels of said phase signal A-A to output a target pixel position signal.

31. The three-dimensional shape measurement apparatus as defined in claim 23
wherein
said absolute phase determination unit comprises combination of two or more of the absolute value determination units of the initial phase.

32. The three-dimensional shape measurement apparatus as defined in claim 23 further comprising:
means for projecting a spatially striped luminance distribution on an object under measurement from three or more different directions while phase shifting the light pattern.

33. The three-dimensional shape measurement apparatus as defined in claim 23 further comprising:
a plurality of cameras for scanning the object from three or more different directions.

34. The three-dimensional shape measurement apparatus as defined in claim 16 wherein
the light pattern projected is sinusoidal.

35. A computer program product carried on a computer readable medium, said program product being configured to execute a processing in program-controlled data processing apparatus which controls projecting a spatially striped luminance distribution on an object under measurement from different directions while phase shifting the light pattern, scanning said object under measurement, illuminated by said light pattern while phase shifting the light pattern, from two different directions by first and second cameras to obtain image data and for measuring a three-dimensional shape of said object under measurement from said image data,
said processing comprising the steps of:
(a) deriving first and second initial phase images from first and second series of image data taken by cameras from said two different directions;
(b) finding a set of corresponding three-dimensional coordinate position candidates from an initial phase of a target pixel in said first initial phase image based on a projection position of said light pattern and on a first scanning position;
(c) finding a set of pixel positions corresponding to the set of said three-dimensional coordinate positions in said second initial phase image based on a second scanning position and comparing, in reference to respective initial phases, the initial phases with the initial phase of a target pixel in said first initial phase image to verify whether or not the corresponding pixel positions having the same initial phase can be determined uniquely;
(d) finding a three-dimensional coordinate position based on the uniquely determined pixel position to determine absolute values of the initial phases of the target pixels in said first and second initial phase images;
(e) repeating at least three of the steps (a) to (d) for the entire pixels of said first initial phase image;
(f) converting said first and second initial phase images to first and second absolute phase images, in reference to the absolute value of the initial phase of said light pattern; and
(g) finding a three-dimensional coordinate position of said object under measurement in each pixel based on the absolute phase in each pixel of said first and second absolute phase images, on said light pattern projection positions, and on the scanning positions of said first and second absolute phase images.

36. The computer program product as defined in claim 35 wherein said step (d) of determining the absolute value of the initial phase from an initial phase image comprises sub-steps of:
(1) finding a first set of corresponding three-dimensional coordinate position candidates from the initial phase of the target pixel in said first initial phase image based on the light pattern projection position and on the first scanning position;
(2) finding a set of pixel positions corresponding to said first set of three-dimensional coordinate positions in said second initial phase image based on said second scanning position and comparing, in reference to respective initial phases, the initial phases with the initial phase of the target pixel in said first initial phase image to verify whether or not the corresponding pixel position having the same initial phase can be determined uniquely;
(3) finding a second set of corresponding three-dimensional coordinate position candidates from the initial phase of the uniquely determined pixel in said second initial phase image based on the light pattern projection position and the second scanning position;
(4) finding a set of pixel positions corresponding to said second set of three-dimensional coordinate positions in said first initial phase image based on said first scanning position and comparing, in reference to respective initial phases, the respective initial phases with the initial phase of the uniquely determined pixel in said second initial phase image to verify whether or not the corresponding pixel position having the same initial phase can be determined uniquely; and (5) finding a three-dimensional coordinate position from the uniquely determined pixel position by said sub-steps (2) and (4) to determine absolute values of the initial phases of target pixels in said first and second initial phase images; and (6) performing control to repeat the sub-steps (1) to (5) for the entire pixels of said first initial phase image.

37. A computer program product carried on a computer readable medium, said program product being configured to execute a processing in a program-controlled data processing apparatus adapted for measuring the three-dimensional shape of an object under measurement from data obtained on illuminating on said object under measurement first and second light patterns having spatially striped luminance distribution from first and second light projection units from two different directions, while phase-shifting the light patterns, imaging said object under measurement by a camera on illuminating said first light pattern thereon while shifting the first light pattern and on imaging said object under measurement by imaging means on illuminating said second light pattern thereon while shifting the second light pattern, said processing comprising the steps of:

(a) deriving first and second initial phase images from first and second image strings taken from said two different directions, respectively;

(b) finding a set of corresponding three-dimensional coordinate position candidates from an initial phase of a target pixel in said first initial phase image based on a projection position of said light pattern and on a first scanning position;

(c) having reference to a set of possible phase values from the illuminating position of the second light pattern and the set of three-dimensional coordinate position candidates and comparing these phase values with the initial phase of the target pixel in said second initial phase image to verify whether or not the coincident initial phase can be determined uniquely;

(d) determining absolute values of the initial phases of the two light patterns from the unique y determined three-dimensional coordinate positions;

(e) performing control to repeat the steps (a) to (d) for the entire pixels of the first initial phase image;

(f) converting said first and second initial phase images to first and second absolute phase images while having reference to the absolute value of the initial phase of the light pattern; and (g) finding three-dimensional coordinate positions of said object under measurement in respective pixels based on the absolute phase in the respective pixels of said first and second absolute phase images, projection positions of said two light patterns and on the scanning position.

38. The computer program product as defined in claim 37 wherein said step (d) of determining the absolute value of the initial phase from the initial phase image comprises the sub-steps of:

(1) finding a first set of three-dimensional coordinate position candidates from the initial phase of a target pixel in said first initial phase image based on the projection position of said first light pattern and on the scanning position;

(2) having reference to a set of possible phase values from the illuminating position of said second light pattern and the set of the first three-dimensional coordinate position candidates, and comparing the phase values to the initial phase of said target pixel in said second initial phase image to verify whether or not the same initial phase can be determined uniquely;

(3) finding a second set of corresponding three-dimensional coordinate position candidates from the initial phase of a target pixel in said second initial phase image based on the projection position of said second light pattern and on the scanning position;

(4) having reference to a set of possible phase values from the illuminating position of said first light pattern and the set of the second three-dimensional coordinate position candidates, and comparing the phase values to the initial phase of said target pixel in said first initial phase image to verify whether or not the same initial phase can be determined uniquely;

(5) determining the initial phases of the two light patterns from the three-dimensional coordinate positions uniquely determined by said sub-steps (2) and (4); and (6) performing control to repeat the sub-steps (1) to (5) for the entire pixels of said first initial phase image.

39. A computer program product carried on a computer readable medium, said program product being configured to execute a processing in a program-controlled data processing apparatus adapted for measuring the three-dimensional shape of an object under measurement from data obtained on illuminating on said object under measurement first and second light patterns having spatially striped luminance distribution from first and second light projection units from two different directions, while phase-shifting the light patterns, scanning said object under measurement by first and second cameras with illuminating said first light pattern thereon while shifting the first light pattern and on imaging said object under measurement by said first and second cameras on illuminating said second light pattern thereon while shifting the second light pattern, said processing comprising:

(a) deriving first and second initial phase images from first and second image strings taken by said first light pattern from two directions;

(b) deriving third and fourth initial phase images from third and fourth image strings taken by said first light pattern from two directions;

(c) finding a first set of corresponding three-dimensional coordinate position candidates from an initial phase of a target pixel in said first initial phase image obtained from the first scanning position by the first light pattern based on the projection position of said first light pattern and said first scanning position (d) finding a set of corresponding pixel positions of the first set of first three-dimensional coordinate position candidates in the fourth initial phase image obtained from the second scanning position by the second light pattern; based on said second scanning position to find a set of second three-dimensional coordinate position candidates from the initial phase of the set of corresponding pixel positions;

(e) comparing the first and second sets of three-dimensional coordinate position candidates to each other to verify whether or not an overlapping coordinate points can be determined uniquely;

(f) determining absolute values of the initial phases of the two light patterns from the uniquely determined three-dimensional coordinate positions;

(g) repeating the steps of (c) to (f) for the entire pixels of said first initial phase image (h) converting first to fourth initial phase images to first to fourth absolute phase images, while having reference to the absolute value of the initial phase of said light pattern; and (i) finding a three-dimensional coordinate position in each pixel of said object under measurement based on the absolute phase in each pixel of said first to fourth absolute phase images, projection position of said two light patterns and on the scanning positions.

40. The computer program product as defined in claim 39 wherein the step (f) of determining the absolute value of the initial phase from the initial phase image comprises the sub-steps of:

(1) finding a first set of corresponding three-dimensional coordinate position candidates from the initial phase of a target pixel in a first initial phase image obtained from the first scanning position by said first light pattern based on the projection position of said first light pattern and on the first scanning position;

(2) finding a set of corresponding pixel positions from a first set of three-dimensional coordinate position candidates in an initial phase image obtained from the second scanning position by said second light pattern to find a second set of corresponding three-dimensional coordinate position candidates from the initial phase of said set of the corresponding pixels;

(3) comparing said sets of the first and second three-dimensional coordinate position candidates to verify whether or not overlapping coordinate points can be determined uniquely;

(4) finding a third set of corresponding coordinate position candidates from the initial phase of a pixel corresponding to the uniquely determined three-dimensional coordinate position, based on a second scanning position;

(5) finding a third set of corresponding three-dimensional coordinate position candidates in the first initial phase image obtained from said second scanning position from said second light pattern based on said first scanning position to find a fourth set of three-dimensional coordinate position candidates from the initial phase of said set of the corresponding pixels;

(6) comparing the third and fourth sets of the three-dimensional coordinate position candidates to verify whether or not the overlapping coordinate points can be determined uniquely;

(7) determining absolute values of initial phases of two light patterns from the uniquely determined three-dimensional coordinate positions; and (8) repeating the sub-steps of (1) to (7) for the entire pixels of said first initial phase image.

41. The computer program product as defined in claim 39 wherein the step (f) of determining the absolute value of the initial phase from the initial phase image comprises the sub-steps of:

(1) finding a set of corresponding three-dimensional coordinate position candidates from the initial phase of a target pixel in said first initial phase image based on the projection position of the first light pattern and on the first scanning position;

(2) finding a set of pixel positions corresponding to said set of the three-dimensional coordinate positions in a second initial phase image obtained from the second scanning position by the first light pattern based on the second scanning position and comparing in reference to respective initial phases, the respective initial phases with the initial phase of a target pixel in said initial phase image to verify whether or not the corresponding pixel positions having the same initial phase can be determined uniquely;

(3) finding a three-dimensional coordinate position by the uniquely determined pixel position to determine an absolute value of the initial phase of a target pixel in said initial phase image; and (4) repeating the sub-steps (1) to (3) for the entire pixels of said first initial phase image.

42. The computer program product as defined in claim 39 wherein the step (f) of determining the absolute value of the initial phase from the initial phase image comprises the sub-steps of:

(1) finding a first set of corresponding three-dimensional coordinate position candidates from the initial phase of a target pixel in said first initial phase image based on the projection position of the first light pattern and on the first scanning position;

(2) finding a set of pixel positions corresponding to said first set of the three-dimensional coordinate positions in a second initial phase image obtained from the second scanning position by the first light pattern based on the second scanning position, and comparing, in reference to respective initial phases, the respective initial phases with the initial phase of a target pixel in said initial phase image to verify whether or not the corresponding pixel positions having the same initial phase can be determined uniquely;

(3) finding a second set of corresponding three-dimensional coordinate position candidates from the initial phase of the uniquely determined pixel in said second initial phase image based on the projection position of said first light pattern and said second scanning position;

(4) finding a set of pixel positions corresponding to said second the coordinate position candidates in a first initial phase image obtained from the first scanning position by said first light pattern based on the first scanning position, and comparing, in reference to respective initial phases, the respective initial phases with the initial phase of the uniquely determined pixels in said second initial phase image to verify whether or not the corresponding pixel positions having the same initial phase is determined uniquely;

(5) finding three-dimensional coordinate positions by pixel position uniquely determined by said sub-steps (2) and (4) to determine an absolute value of the initial phase of a target pixel in said initial phase image; and (6) performing control to repeat the sub-steps (1) to (5) for the entire pixels of said initial phase image.

43. The computer program product as defined in claim 39 wherein the step (f) of determining the absolute value of the initial phase from the initial phase image comprises the sub-steps of:

(1) finding a set of corresponding three-dimensional coordinate position candidates from the initial phase of a target pixel in said first initial phase image based on the projection position of said first light pattern and on said first scanning position;

(2) having reference to a set of possible phase values from the illuminating position of said second light pattern and a set of three-dimensional coordinate position candidates, and comparing the phase values with the initial phase of said target pixel in a third initial phase image obtained by a second light pattern from a first scanning position to verify whether or not the same initial phase can be determined uniquely;

(3) determining an absolute value of the initial phase of a target pixel in said initial phase image from the uniquely determined three-dimensional coordinate position; and (4) repeating the sub-steps (1) to (4) for the entire pixels in said first initial phase image.

44. The recording medium as defined in claim 39 wherein the step (f) of determining the absolute value of the initial phase from the initial phase image comprises the sub-steps of:

(1) finding a first set of corresponding three-dimensional coordinate position candidates from the initial phase of a target pixel in said first initial phase image based on the projection position of said first light pattern and on said first scanning position;

(2) having reference to a set of possible phase values from the illuminating position of said second light pattern and the first set of three-dimensional coordinate position candidates, and comparing the phase values with the initial phase of said target pixel in a third initial phase image obtained by the second light pattern from the first scanning position to verify whether or not the same initial phase can be determined uniquely;

(3) finding a second set of corresponding three-dimensional coordinate position candidates from the initial phase of a target pixel in said third initial phase image based on the projection position of said second light pattern and on said first scanning position;

(4) having reference to a set of possible phase values from the illuminating position of said first light pattern and the second set of three-dimensional coordinate position candidates and comparing the phase values with the initial phase of said target pixel in the first initial phase image obtained by the first light pattern from a first scanning position to verify whether or not the same initial phase can be determined uniquely;

(5) determining the absolute value of the initial phase of a target pixel in said initial phase image from the three-dimensional coordinate position uniquely determined by said sub-steps (2) and (4); and (6) performing control to repeat the sub-steps (1) to (5) for the entire pixels of said first initial phase image.

45. The three-dimensional shape measurement method as defined in claim 1 wherein
the projected light pattern is substantially triangular in shape.

46. The three-dimensional shape measurement method as defined in claim 1
wherein
in each of the three-dimensional spatial coordinate positions, the absolute coordinate positions of which are previously known, the absolute phase value is measured and used in calculating the corresponding coordinate positions from the initial phase.

47. The three-dimensional shape measurement method as defined in claim 17 wherein
the projected light pattern is of a triangular function in shape.

48. The three-dimensional shape measurement method as defined in claim 17
wherein
in each of the three-dimensional spatial coordinate positions, the absolute coordinate positions of which are previously known, the absolute phase values are measured and stored in storage memory, said absolute phase values being used in calculating the corresponding three-dimensional coordinate positions from the initial phase.

49. The computer program product as defined in claim 35 wherein
the projected light pattern is sinusoidal in shape.

50. The computer program product as defined in claim 35 wherein
the projected light pattern is substantially triangular in shape.

51. The computer program product as defined in claim 35 wherein
in each of the three-dimensional spatial coordinate positions, the absolute coordinate positions of which are previously known, the absolute phase value is measured and used in calculating the corresponding coordinate positions from the initial phase.

52. A three-dimensional shape measurement apparatus comprising:

light projector means for projecting light patterns having spatially striped luminance distribution to an object under measurement with shifting phases of said light patterns;

image data acquisition means for scanning said object under measurement to acquire an image data of said object to output an digital image signal;

image storage means for storing said digital image data, in accordance with a configuration and an orientation of said light projector means image and said data acquisition means to output images as phase signals;

phase calculation means for calculating initial phase values from pixel to pixel from said phase signals to output the calculated initial phase values;

absolute phase determination means receiving said phase signals, finding a set of corresponding three-dimensional coordinate position candidates from the initial phase of the target pixel in said phase signal, verifying whether or not the coincident initial phase can be determined uniquely, determining the absolute value of the initial phase of the light patterns from the uniquely determined three-dimensional coordinate position, outputting absolute phase signals in association with directions of said light patterns projected and image scanning;

three-dimensional coordinate conversion means for converting said phase signal from said absolute phase determination means into a three-dimensional coordinate value; and three-dimensional coordinate synthesis means for complementing reciprocally lacking data for synthesis to output the synthesized signal as a synthesized three-dimensional coordinate signal.

53. A three-dimensional shape measurement apparatus defined in claim 52 wherein said light projector means comprising a light projection unit or a plurality of light projection units, and said image data acquisition means comprising a camera or a plurality of cameras, a configuration of said light projector means and said image data acquisition means being selected from the group consisting of a combination of a light projection unit with a plurality of cameras, a combination of a plurality of light projection units with a camera, a plurality of light projection units with a plurality of cameras.

54. The three-dimensional shape measurement method as defined in claim 47.

* * * * *